US011890782B2

(12) United States Patent
Strobel et al.

(10) Patent No.: US 11,890,782 B2
(45) Date of Patent: Feb. 6, 2024

(54) MIXING SYSTEMS HAVING DISK ASSEMBLIES

(71) Applicant: Vermeer Manufacturing Company, Pella, IA (US)

(72) Inventors: Andy Strobel, Knoxville, IA (US); Nathan Meyer, Knoxville, IA (US); Thor Anderson, Monroe, IA (US); Conner Converse, Oskaloosa, IA (US); James W. Skinner, Pella, IA (US)

(73) Assignee: Vermeer Manufacturing Company, Pella, IA (US)

(*) Notice: Subject to any disclaimer, the term of this patent is extended or adjusted under 35 U.S.C. 154(b) by 180 days.

(21) Appl. No.: 17/334,221

(22) Filed: May 28, 2021

(65) Prior Publication Data

US 2021/0379797 A1 Dec. 9, 2021

Related U.S. Application Data

(60) Provisional application No. 63/201,163, filed on Apr. 15, 2021, provisional application No. 63/118,193,
(Continued)

(51) Int. Cl.
*B28C 5/42* (2006.01)
*B28C 5/00* (2006.01)
(Continued)

(52) U.S. Cl.
CPC .......... *B28C 5/4282* (2013.01); *B01F 27/115* (2022.01); *B01F 27/73* (2022.01);
(Continued)

(58) Field of Classification Search
CPC ..... B28C 5/4282; B28C 5/003; B28C 5/1238; B28C 7/10; B28C 7/0477; E02F 3/8816;
(Continued)

(56) References Cited

U.S. PATENT DOCUMENTS 617,197 A 1/1899 Smith
1,592,231 A * 7/1926 Stroder ................ B01D 47/085 261/92
(Continued)

FOREIGN PATENT DOCUMENTS

CN 210145867 U 3/2020
DE 102010023268 A1 12/2011
(Continued)

OTHER PUBLICATIONS https://www.youtube.com/watch?v=NM0YeQUjyl4, ASTM C143 Standard Test Method for Slump of Hydraulic Cement Concrete, HeidelbergCement Group, Jun. 28, 2018.
(Continued)

*Primary Examiner* — Charles Cooley
(74) *Attorney, Agent, or Firm* — Armstrong Teasdale LLP

(57) ABSTRACT

Mixing systems that include a mixer housing and one or more disk assemblies for mixing and processing materials is disclosed. The disks rotate to mix an additive into the material and to carry agglomerated solids toward a discharge of the mixing system. The disks may have a plurality of fingers or lobes which extend from a central portion of the disks.

34 Claims, 72 Drawing Sheets

Related U.S. Application Data filed on Nov. 25, 2020, provisional application No. 63/035,453, filed on Jun. 5, 2020.

(51) Int. Cl.

| | |
|---|---|
| ***B28C 5/12*** | (2006.01) |
| ***E02F 3/88*** | (2006.01) |
| ***E02F 3/90*** | (2006.01) |
| ***B01F 27/73*** | (2022.01) |
| ***B01F 27/115*** | (2022.01) |

(52) U.S. Cl.

CPC ............ *B28C 5/003* (2013.01); *B28C 5/1238* (2013.01); *E02F 3/8816* (2013.01); *E02F 3/90* (2013.01)

(58) Field of Classification Search

CPC ..... E02F 3/90; E02F 3/902; E02F 7/06; B01F 23/53; B01F 23/56; B01F 27/071; B01F 27/1151; B01F 27/1152; B01F 27/1155; B01F 27/731; B01F 33/26; B01F 33/5021; B01F 33/5023; B01F 35/51; B01F 35/53; B01F 35/71705; B01F 35/71775; B01F 35/7548; B01F 27/73; B01F 27/115; B01F 23/36

USPC ........... 366/315–317, 156.1–158.4, 101–107

See application file for complete search history.

(56) References Cited

U.S. PATENT DOCUMENTS

| | | | | |
|---|---|---|---|---|
| 2,145,374 | A | 1/1939 | Salerni | |
| 2,156,333 | A | 5/1939 | Cross et al. | |
| 2,225,973 | A | 12/1940 | Brown et al. | |
| 2,397,818 | A | 4/1946 | Tausch | |
| 2,576,283 | A | 11/1951 | Chaney | |
| 2,919,898 | A | 1/1960 | Marwil et al. | |
| 3,090,602 | A * | 5/1963 | Benton | B01F 27/73 366/229 |
| 3,289,775 | A | 12/1966 | Stone | |
| 3,766,997 | A | 10/1973 | Heilhecker et al. | |
| 4,281,934 | A | 8/1981 | Krause et al. | |
| 4,509,696 | A | 4/1985 | Donaldson | |
| 4,560,281 | A | 12/1985 | Harris et al. | |
| 4,634,535 | A | 1/1987 | Lott | |
| 4,797,080 | A | 1/1989 | Wanninger | |
| 4,882,054 | A | 11/1989 | Derrick et al. | |
| 5,236,093 | A | 8/1993 | Marrs | |
| 5,295,317 | A | 3/1994 | Perrott | |
| 5,358,738 | A | 10/1994 | Sawka | |
| 5,450,966 | A | 9/1995 | Clark et al. | |
| 5,887,973 | A * | 3/1999 | Åhman | B01F 33/406 366/315 |
| 6,213,227 | B1 | 4/2001 | Dietzen | |
| 6,213,629 | B1 * | 4/2001 | Bringfors | B01F 27/115 366/172.1 |
| 6,250,478 | B1 | 6/2001 | Davis | |
| 6,296,124 | B1 | 10/2001 | Zubrägel | |
| 6,453,584 | B1 | 9/2002 | Buckner | |
| 6,460,706 | B1 | 10/2002 | Davis | |
| 6,470,605 | B1 | 10/2002 | Gilman et al. | |
| 6,517,733 | B1 | 2/2003 | Carlson | |
| 6,551,655 | B2 | 4/2003 | White et al. | |
| 6,988,568 | B2 | 1/2006 | Buckner | |
| 7,004,332 | B2 | 2/2006 | Davis | |
| 7,306,057 | B2 | 12/2007 | Strong et al. | |
| 7,337,860 | B2 | 3/2008 | McIntyre | |
| 7,523,570 | B2 | 4/2009 | Pobihushchy | |
| 7,690,445 | B2 | 4/2010 | Perez-Cordova | |
| 8,172,740 | B2 | 5/2012 | El Dorry et al. | |
| 8,561,803 | B2 | 10/2013 | Fallon | |
| 8,613,360 | B2 | 12/2013 | Carr | |
| 8,695,804 | B2 | 4/2014 | Bennington, II et al. | |
| 9,073,104 | B2 | 7/2015 | Burnett et al. | |
| 9,079,188 | B2 | 7/2015 | Culver | |
| 9,662,599 | B2 | 5/2017 | Sewell et al. | |
| 10,053,830 | B2 | 8/2018 | Buckner | |
| 10,259,011 | B2 | 4/2019 | Klassen | |
| 10,393,435 | B2 | 8/2019 | Squires et al. | |
| 10,399,017 | B2 | 9/2019 | Sewell et al. | |
| 10,507,443 | B2 | 12/2019 | Pullman et al. | |
| 11,111,743 | B2 | 9/2021 | Ross et al. | |
| 11,173,432 | B2 | 11/2021 | Sewell et al. | |
| 11,185,803 | B2 | 11/2021 | Sewell et al. | |
| 2002/0122350 | A1 * | 9/2002 | White | B01F 35/71705 366/326.1 |
| 2003/0136747 | A1 | 7/2003 | Wood et al. | |
| 2005/0242003 | A1 | 11/2005 | Scott et al. | |
| 2006/0086010 | A1 | 4/2006 | Jarnecke et al. | |
| 2007/0163927 | A1 | 7/2007 | Eia | |
| 2007/0278012 | A1 | 12/2007 | Smith | |
| 2009/0120846 | A1 | 5/2009 | Burnett | |
| 2010/0196129 | A1 | 8/2010 | Buckner | |
| 2013/0075344 | A1 | 3/2013 | Wade | |
| 2013/0248465 | A1 | 9/2013 | Sherwood | |
| 2018/0178253 | A1 | 6/2018 | Tuttle | |
| 2019/0015766 | A1 | 1/2019 | Hofland et al. | |
| 2019/0376743 | A1 | 12/2019 | Squires et al. | |
| 2021/0379797 | A1 * | 12/2021 | Strobel | B01F 35/71775 |
| 2022/0412044 | A1 * | 12/2022 | Keeley | E02F 3/902 |

FOREIGN PATENT DOCUMENTS

| | | | | |
|---|---|---|---|---|
| DE | 112012005006 | B4 | 9/2015 | |
| EP | 1776999 | A1 * | 4/2007 | B01F 7/00383 |
| EP | 3141693 | B1 | 3/2017 | |
| FR | 2815650 | A1 | 4/2002 | |
| GB | 2478150 | A | 6/2011 | |
| SU | 1456208 | A1 * | 2/1989 | |
| WO | WO-9616727 | A1 * | 6/1996 | B01F 13/0211 |
| WO | WO-9843729 | A1 * | 10/1998 | B01F 3/1221 |
| WO | 2008082424 | A | 7/2008 | |

OTHER PUBLICATIONS https://www.epa.gov/sites/production/files/2015-12/documents/9095b_0.pdf, SW-846 Test Method 9095B: Paint Filter Liquids Test, 1 page, Nov. 2004.

https://pronar-recycling.com/en/products/bebny-do-przesiewaczy/, Pronar MPB Tommel drums and Starscreen, available before Jun. 5, 2020.

https://backers.de/en/maschinen/starscreens.html, The starscreen machine from Backers, available before Jun. 5, 2020.

https://www.youtube.com/watch?v=85haB5Xq56M, Backers Soil Stabilisation, Apr. 22, 2016.

https://backers-screens.com/en/maschinen/screening-and-mixing-machine.html, Backers Screening and Mixing Machine, available before Jun. 5, 2020.

https://www.doppstadt.de/en/products/product-search/smart-mixing/, Doppstadt DM 215 E, available before Jun. 5, 2020.

https://metaflotech.com/dewatering-vs-solidification/ MetaFlo Technologies, Dewatering vs. Solidification, available before Jun. 5, 2020.

* cited by examiner

MIXING SYSTEMS HAVING DISK ASSEMBLIES

CROSS-REFERENCE TO RELATED APPLICATIONS

This application claims the benefit of U.S. Provisional Patent Application No. 63/035,453, filed Jun. 5, 2020, U.S. Provisional Patent Application No. 63/118,193, filed Nov. 25, 2020, and U.S. Provisional Patent Application No. 63/201,163, filed Apr. 15, 2021. Each of these applications is incorporated herein by reference in its entirety.

FIELD OF THE DISCLOSURE

The field of the disclosure relates to mixing systems and, in particular, mixing systems that include a disk assembly for mixing and processing materials.

BACKGROUND

Hydro-excavation vacuum systems direct pressurized water to an excavation site while removing cut earthen material and water (i.e., spoil material) by a vacuum system. The spoil material is removed by entraining the spoil material in an airstream generated by the vacuum system. Spoil material can vary in moisture content and structure (e.g., clay clumps, sand, silt, rocks, and the like) and may have various consistencies. In some cases the spoils are solid-like, with a thickened consistency. In some cases, the spoils may have a higher moisture content and may be classified as a liquid.

Liquid spoils are relatively expensive to dispose compared to solid spoil material. Tightened environmental regulations impose restricted disposal protocols for liquid waste. For example, liquid spoil material must be disposed of at designated waste treatment facilities and/or disposal stations that are properly equipped to process liquid waste. Furthermore, transporting liquid spoil material from the excavation site to a designated disposal location may present considerable challenges and requires specific equipment to prevent leakage of the liquid waste during transportation.

At least some spoil processing methods convert high moisture content spoil material into a material with a thickened, solid-like consistency. Conventionally, a solidifying additive (e.g., any additive that causes the mixture to thicken and/or increase in viscosity) is mixed with the high-moisture spoil material to create a more solid-like material. The spoil material is typically transferred to a separate mixing tank where the additive is mixed with the spoils.

A need exists for mixing systems that are capable of processing excavated spoil material by thickening the material to allow the material to be disposed of by protocols established for disposal of solid waste.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed toward a mixing system. The mixing system has a mixer housing, an inlet for introducing material into the mixer housing, and a plurality of disk assemblies disposed in the mixer housing. The mixer housing has a closed floor, front wall and first and second sidewalls. The mixer housing has a longitudinal axis that extends through the front wall and a discharge end of the mixer housing. The inlet is disposed toward the front wall of the mixer housing. Each disk assembly includes a rotatable shaft that extends from the first sidewall to the second sidewall and a plurality of disks connected to the rotatable shaft that rotate with the shaft. The mixing system has a discharge for discharging material from the mixer housing. The discharge is disposed toward the discharge end of the mixer housing.

Another aspect of the present disclosure is directed toward a mixing system for adding an additive to a slurry. The mixing system has a first section for mixing an additive into the slurry and a second section for removing larger sized material from the slurry. The first section includes a first section housing having a first section floor. The first section floor does not have an outlet formed therein from which material is removed from the mixing system. The first section includes one or more disk assemblies disposed in the first section housing. The disks rotate to mix additive into the slurry. The second section includes a second section housing including an inclined floor that angles downward from a mixing system discharge toward the first section floor. The second section includes one or more disk assemblies disposed in the second section housing. The disks are arranged to propel material from the first section, into the second section and through the discharge.

Another aspect of the present disclosure is directed toward a method for aggregating a slurry in a mixing system. The mixing system comprises a mixer housing having a front wall, a discharge opposite the front wall, and a floor that extends from the front wall to the discharge. A slurry is added to the mixer housing. A solidifying additive is also added to the mixer housing. A plurality of disks disposed in the mixer housing are rotated to mix the solidifying additive into the slurry. The disks have fingers or lobes that extend radially outward from a central axis of the disk. The solidifying additive causes the slurry to aggregate into particles. The disks cause a portion of the aggregated particles to be propelled toward the discharge and at least a portion of the slurry to be propelled toward the front wall.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
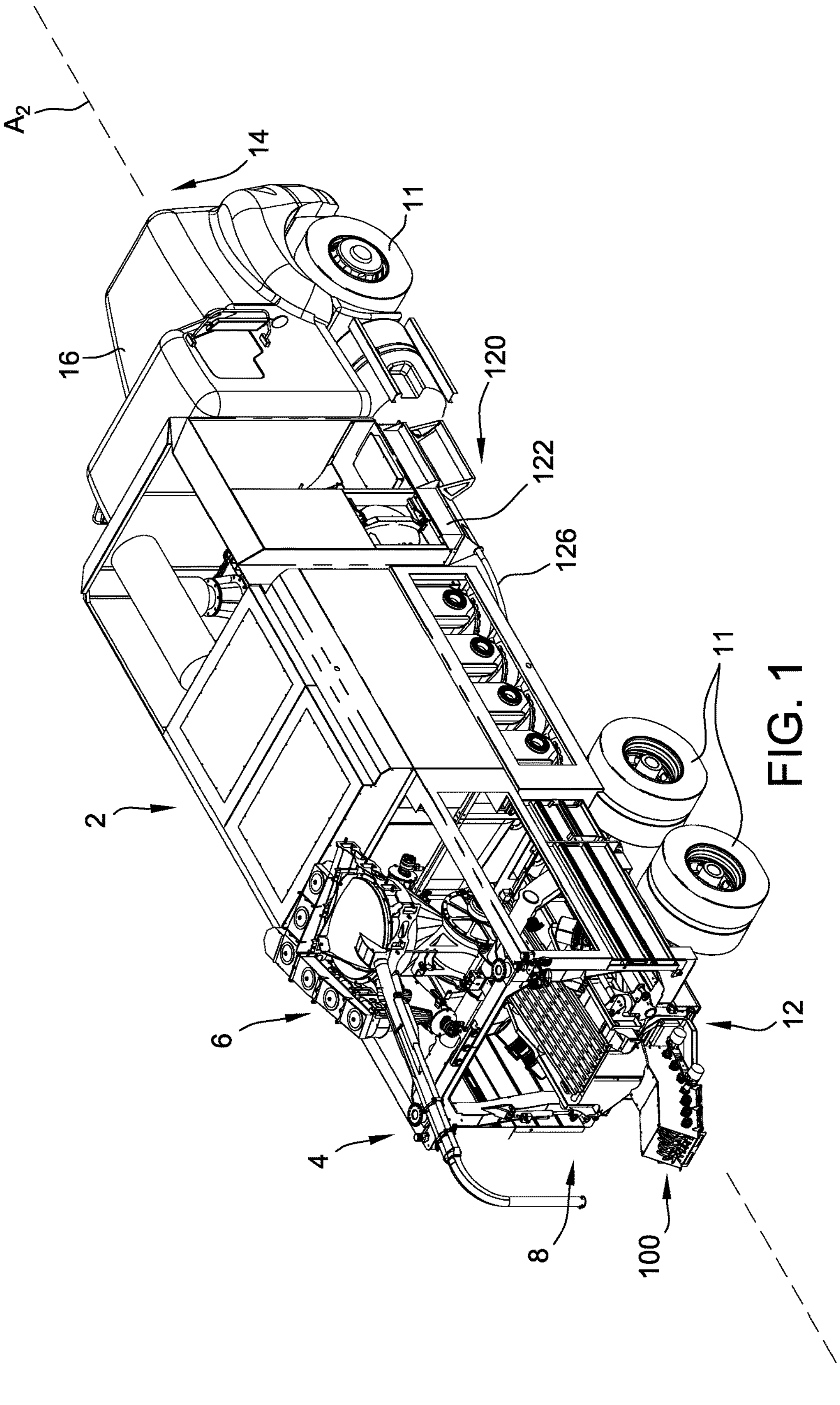
FIG. 1 is a perspective view of a mixing system supported by a mobile vacuum apparatus that includes a vacuum system, a separation system, and a dewatering system.

Provisions of the present disclosure relate to mixing systems 100 for processing materials. The mixing system 100 is suitable for processing spoil material (also referred to herein as "spoils") such as slurries generated during hydro vacuum excavation. While the system 100 is shown and described for processing spoil material generated during hydro vacuum excavation, it should be understood that the mixing system may be used to mix or convey other materials (e.g., solids generated during processing of drilling fluids).

In the illustrated embodiment, the mixing system 100 is supported by a mobile hydro excavation vacuum apparatus 2. An example mobile hydro excavation vacuum apparatus may include on-board processing (e.g., liquid-solid separation) of earthen material generated during excavation such as the apparatus shown and described in U.S. Patent Publication No. 2019/0015766, entitled "Cyclonic Separation Systems and Hydro Excavation Vacuum Apparatus Incorporating Same", which is incorporated herein by reference for all relevant and consistent purposes. The hydro excavation vacuum apparatus 2 is an example apparatus and the mixing system 100 may be used on other hydro excavation vacuum machines. The mixing system 100 may also be used on reclaimer systems (i.e., systems used for vacuuming and/or processing earthen material, but which do not include excavating functionality). Suitable apparatus also include apparatus which store and/or process drill cuttings. Further, while the mixing system 100 is shown and described as being supported by a mobile apparatus, in other embodiments the mixing system 100 is stationary (e.g., at a fixed location where materials are processed and the system 100 is secured by a supporting frame).

The illustrated hydro excavation vacuum apparatus 2 includes a high pressure excavation and vacuum system 4, a separation system 6, and a dewatering system 8. The hydro excavation vacuum apparatus 2 includes a chassis 10 which support the various components of the mixing system 100. Wheels 11 are connected to the chassis 10 to transport the hydro excavation vacuum apparatus 2. The hydro excavation vacuum apparatus 2 may be self-propelled (e.g., the hydro excavation vacuum apparatus 2 includes a dedicated motor that propels the apparatus) or in some embodiments, the hydro excavation vacuum apparatus 2 may be adapted to be towed by a separate vehicle. For example, the hydro excavation vacuum apparatus 2 may include a tongue and/or hitch coupler to connect to a separate towing vehicle. The hydro excavation vacuum apparatus 2 includes a rear 12, a front 14, and a longitudinal axis $A_2$ that extends through the front 14 and the rear 12 of the hydro excavation vacuum apparatus 2. The hydro excavation vacuum apparatus 2 includes a cab 16 arranged near the front 14. The mixing system 100 is supported by the chassis 10 substantially near the rear 12.

The hydro excavation vacuum apparatus 2 is used to excavate a site by directing high pressure water to cut earthen material. The spoils, including cut earthen material and water, is removed by a vacuum system 4 and processed on board of the hydro excavation vacuum apparatus 2 by the separation system 6 and the dewatering system 8 which are described further below. Spoil material that is processed may include, and without limitation, rocks, cut earthen material (e.g., small particulate such as sand to larger pieces of earth that are cut loose by the jet of high pressure water), and water used during excavation. The spoil material may have various ratios of liquid and solid materials such that spoil material that is processed has a wide-range of properties, e.g., consistencies, viscosities, and amounts of water. The terms used herein for material such as, for example, "spoils," "spoil material," "cut earthen material," "earthen slurry", and "water," should not be considered in a limiting sense unless stated otherwise.

Figures 3A, 3B:
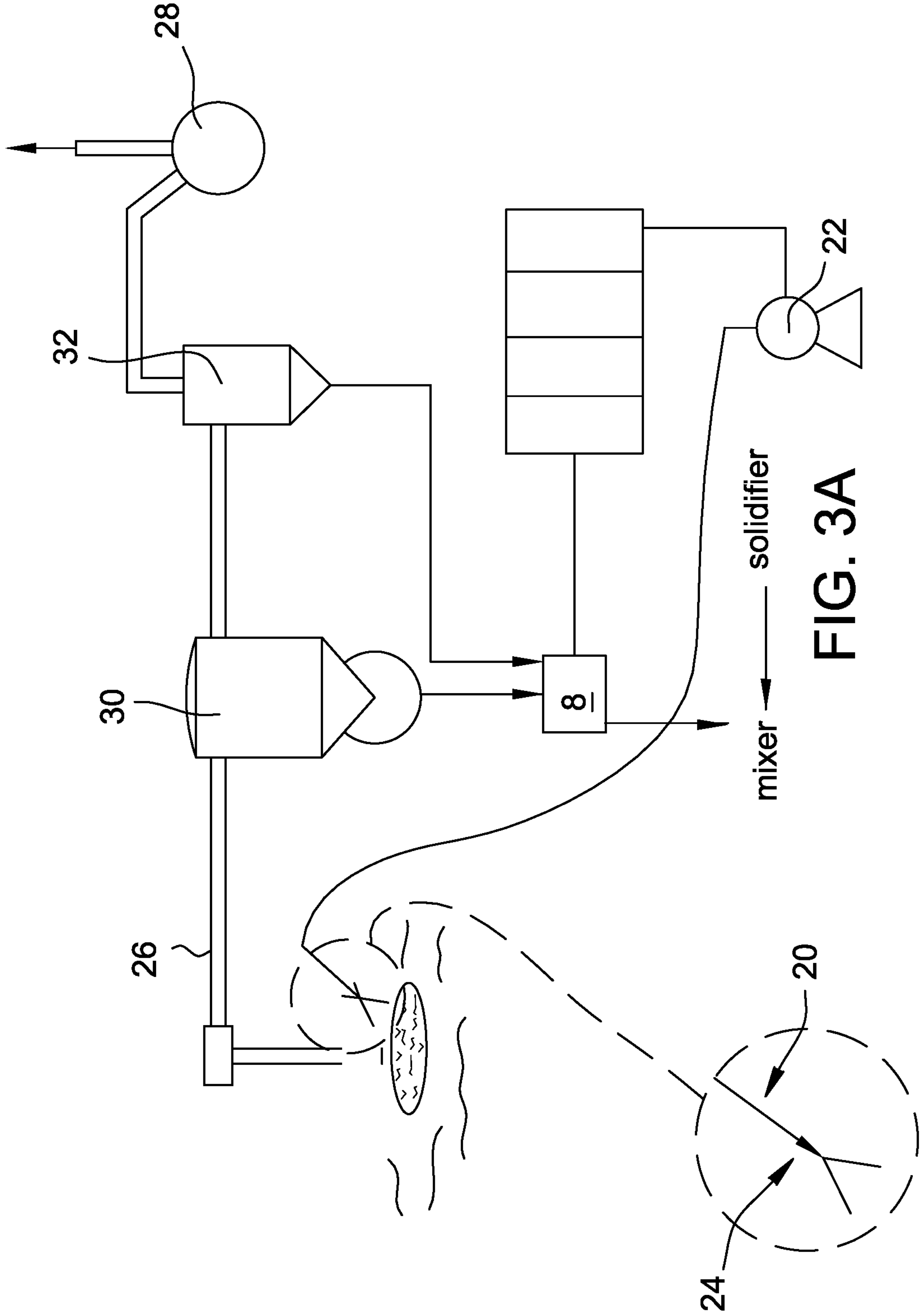
FIG. 3A is a schematic of water and air flow in the mobile vacuum apparatus.
FIG. 3B is a detailed schematic view of a wand and wand nozzle.

In reference to FIGS. 3A and 3B, the hydro excavation vacuum apparatus 2 includes a wand 20 that is used to direct pressurized water W towards earthen material at the excavation site, in order to cut the earthen material. The wand 20 is connected to an excavation fluid pump 22 that supplies water to the wand 20 (e.g., at a pressure of, for example, at least about 500 psi).

The vacuum system 4 of the hydro excavation vacuum apparatus 2 is used to remove spoil material from the excavation site. The vacuum system 4 includes a boom 26 that is capable of rotating about the hydro excavation vacuum apparatus 2 to arrange the boom 26 in proximity to the excavation site, such that the boom 26 is enabled to remove spoil material. The boom 26 includes a flexible portion that may be manipulated by an operator to direct the vacuum suction toward the excavation site.

The vacuum system 4 acts to entrain the cut earth and the water used to excavate the site in a stream of air. A blower or vacuum pump 28 pulls a vacuum through the boom 26 to entrain the material in the airstream. Air is discharged from the blower 28 after the material is removed from the air stream.

The airstream having water and cut earth entrained therein is pulled through the boom 26 and through a series of conduits and is pulled into a separation vessel 30 which removes at least a portion of cut earthen material and water from the airstream. Air exits one or more separation vessel air outlets and is introduced into cyclones 32 to remove additional spoil material (e.g., water, small solids such as sand, low density particles such as sticks and grass, and the like) not separated in the separation vessel 30. Material that collects in the bottom of the cyclones 32 is conveyed by a cyclone discharge pump or, alternatively, is gravity fed to the dewatering system 8 described below. In some embodiments, an airlock receives material from the separation vessel 30 and discharges the material through an airlock outlet.

The hydro excavation vacuum apparatus 2 may process the spoil material to separate water from the excavated spoil material. The spoil material may be introduced into the dewatering system 8 to separate the spoil material into the solid fraction (which may have a semi-liquid quality) and the liquid fraction. As described in further detail herein, the solid fraction may be further processed by the mixing system 100 on board the hydro excavation vacuum apparatus 2. The mixing system 100 processes the solid fraction to thicken the material until the solid fraction reaches the desired state (e.g., until the solid fraction may be classified as a "solid" for disposal purposes).

Figure 4:
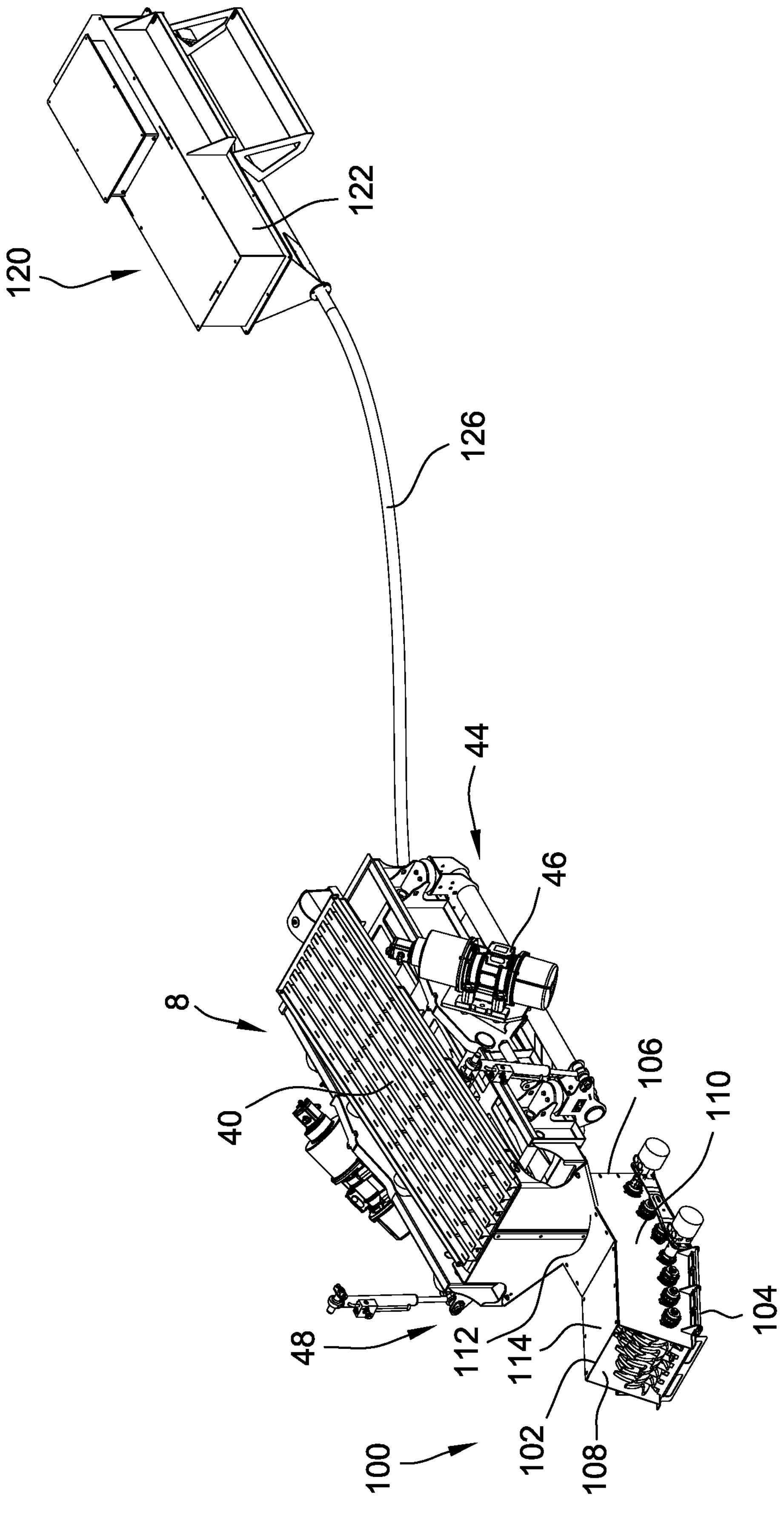
FIG. 4 is a perspective view of the mixing system, an additive feed system, and the dewatering system.

With reference to FIG. 4, the dewatering system 8 includes a pre-screen 40 that first engages material discharged from the outlet of the airlock (not shown). The pre-screen 40 has a plurality of slats with openings formed between slats through which material falls. The pre-screen 40 may have relatively large openings (e.g., at least about 0.5 inches) such that relatively large material is prevented from passing through the pre-screen 40. The pre-screen 40 may be adapted to withstand the impact of large stones and earthen material that are capable of being removed by the vacuum system 4. Example screens include screens that may be referred to by those of skill in the art as a "grizzly screener" or simply "grizzly." The pre-screen 40 may vibrate or, as in other embodiments, does not vibrate.

The dewatering system 8 includes a vibratory screen (not shown) that separates material that passes through the pre-screen 40 by size. The vibratory screen 42 has openings with a size smaller than the size of the openings of the pre-screen 40 (e.g., less than 250 micron). The vibratory screen 42 may be part of a shaker assembly 44 (more commonly referred to as a "shaker") that includes vibratory motors 46 that cause the screen to vibrate. As the screen vibrates, effluent falls through openings within the vibratory screen and particles that do not pass through the openings migrate to the discharge end 48 of the dewatering system 8. Liquid that passes through the vibratory screen 42 collects in a catchpan (not shown) and may be conveyed by a return water pump to a fluid storage and supply system. In other embodiments, the dewatering system 8 includes additional or alternative separation devices such as flat wire belt conveyors, centrifuges, hydrocyclones or the like.

Spoil material that reaches the discharge end 48 of the dewatering system 8 is introduced to the mixing system 100 as discussed in further detail herein. In other embodiments, the spoil material that reaches the discharge end 48 of the dewatering system 8 falls into a bin (not shown) and then the bin may then be used to transport the spoil material to the mixing system 100. In some other example embodiments, the spoil material that reaches the discharge end 48 of the dewatering system 8 may be transported to the mixing system 100 using a conveyor or any other suitable method.

In other embodiments, spoil material may be introduced to the mixing system 100 without first being processed in a dewatering system 8. For example, the spoil material may be introduced to the mixing system 100 after the separation system 6 removes at least a portion of the cut earthen material and water from the air stream.

As mentioned previously, spoil material that reaches the discharge end 48 of the dewatering system 8 (i.e., the "solid-fraction" discharged from the shaker assembly 44) and that enters the mixing system 100 may have a moisture-content and consistency that prevents the spoil material from being disposed using protocols suitable for spoils that have been classified as "solid", i.e., spoils having appropriate thickness and consistency. The appropriate thickness and consistency may alternatively be considered "stackable" or have properties quantifiable by the slump test or paint filter test described below. The consistency of the material may vary depending on the type of soil being processed. In some embodiments and as further described below, additive may selectively be added to the mixing system 100 depending on the consistency of the spoil material.

Figure 5:
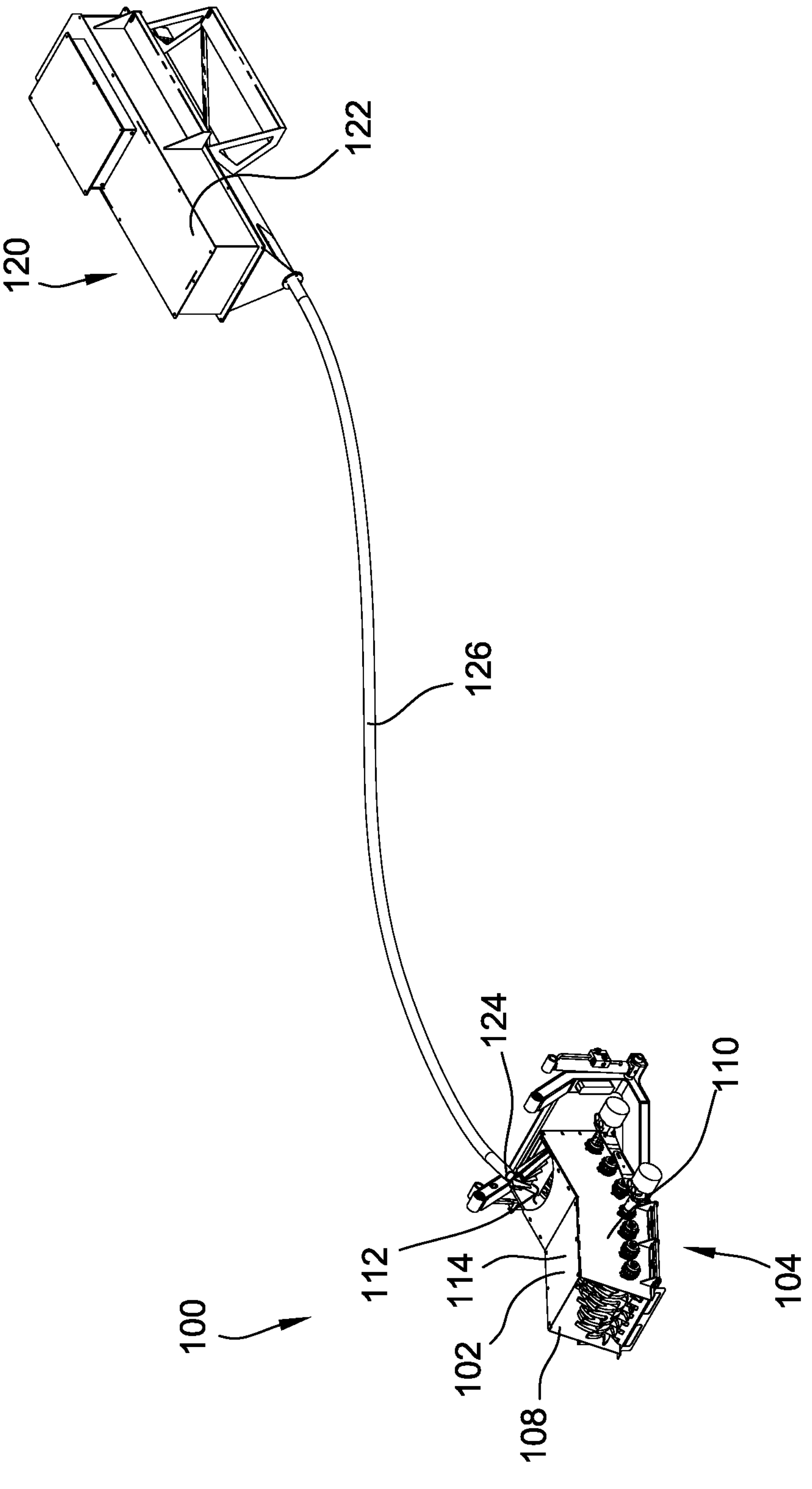
FIG. 5 is a perspective view of the mixing system and the additive feed system.

In reference to FIGS. 4 and 5, the mixing system 100 includes a mixer housing 102 having a floor 104, a front wall 106, and a first sidewall 108 and a second sidewall 110. The front wall 106, the first sidewall 108 and the second sidewall 110, extend generally perpendicular to the floor 104. The front wall 106 extends, generally perpendicular to and between the first sidewall 108 and the second sidewall 110. The first sidewall 108 and the second sidewall 110 are generally parallel to each other and are disposed on opposite sides of the floor 104.

In accordance with embodiments of the present disclosure, the floor 104 of the mixing system 100 may be "closed", i.e., generally the floor 104 does not include outlets for material processed within the mixing system 100 other than openings for clean-outs and the like and/or a single discharge disposed toward the discharge end of the system 100.

The mixing system 100 includes an inlet 112 for introducing earthen material into the mixer housing 102. The inlet 112 is disposed toward the front wall 106 of the mixer housing 102. The mixer housing 102 includes a cover 114 which defines at least a portion of the inlet 112. In other embodiments, the inlet 112 is defined between the first sidewall 108 and the second sidewall 110. The cover 114 extends generally perpendicular to and between the first and second sidewalls 108, 110.

The mixing system 100 includes an additive feed system 120 for adding a solidifying additive to the mixing system 100. The additive feed system 120 includes a feed vessel 122 that holds and stores a solidifying additive. The feed vessel 122 is coupled to the chassis 10 of the hydro excavation vacuum apparatus 2 in proximity to the cab 16.

Figure 2:
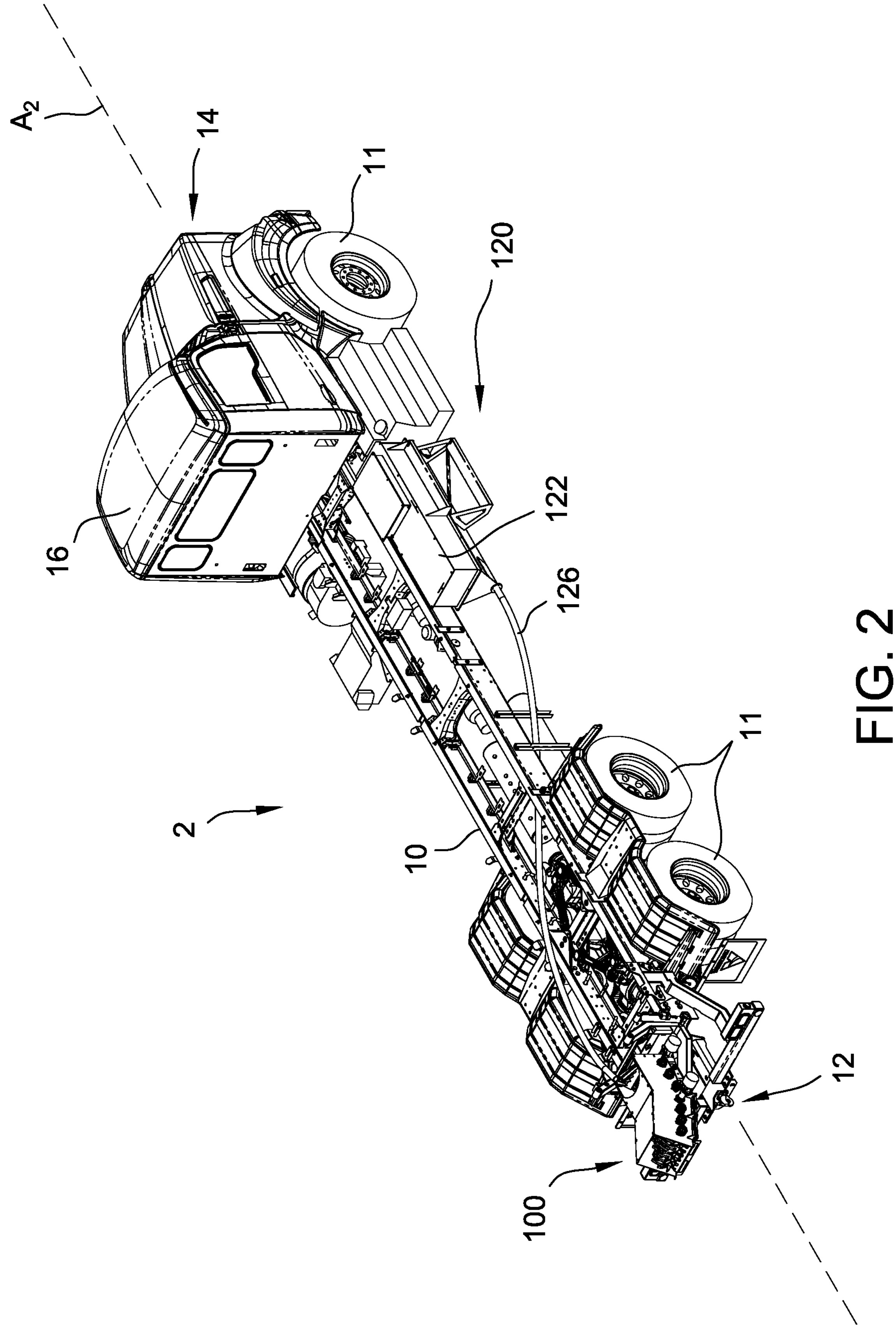
FIG. 2 is a perspective view of the mixing system supported by the mobile vacuum apparatus with the vacuum system, the separation system, and the dewatering system removed from the mobile vacuum apparatus.
Figure 6:
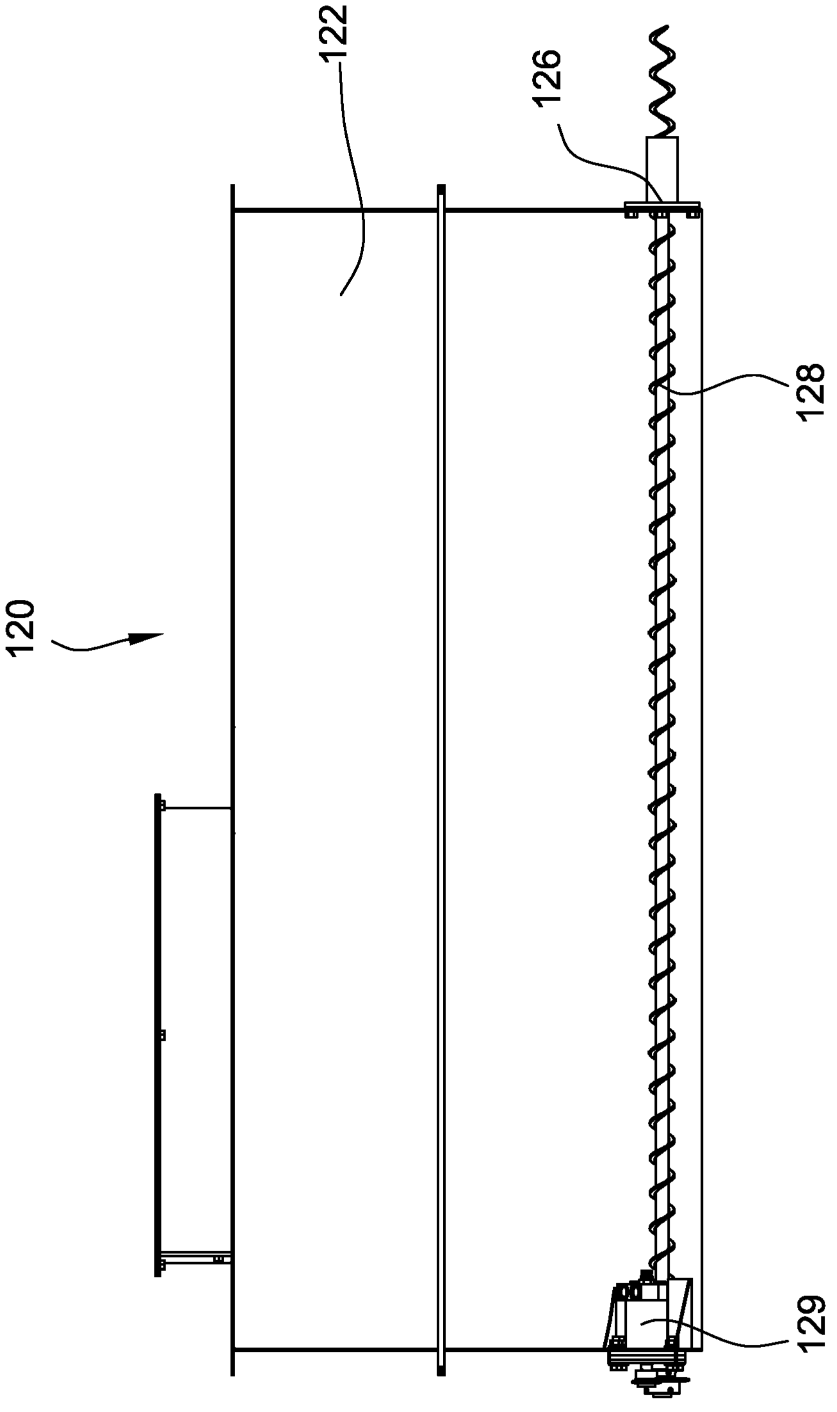
FIG. 6 is a side view of a feed vessel of the additive feed system.

The additive feed system 120 further comprises an additive discharge 124 at which the solidifying additive is added to the mixing system 100. The additive discharge 124 includes a tube 126 which extends between the feed vessel 122 and the inlet 112 of the mixer housing 102. The tube 126 is flexible and extends generally along the chassis 10 (FIGS. 1 and 2). The tube 126 includes a flexible auger 128 which is operably connected to a feed motor 129 (FIG. 6). The auger 128 is at least partially disposed within the tube 126 and the feed vessel 122. The flexible auger 128 may bend and flex with the tube 126. The feed motor 129 rotates the flexible auger 128 such that a metered amount of solidifying additive is conveyed from the feed vessel 122 along the tube 126 to the additive discharge 124 and is introduced into the mixer housing 102. The feed motor 129 may be coupled to a controller including a user interface which allows an operator to control and/or adjust the amount of additive introduced to the mixing system 100. The additive discharge 124 is disposed above the inlet 112 of the mixer housing 102. Accordingly, additive is introduced into the mixer housing 102 from the additive discharge 124 through the inlet 112 of the mixer housing 102.

The solidifying additive may be any suitable additive that solidifies (e.g., thickens and/or agglomerates) the earthen material. Generally, the additive when mixed with the earthen material enables the earthen material to better hold it shape. The additive may include, for example and without limitation, lime, cement, bentonite, and suitable combinations thereof.

As is known to persons skilled in the art, various test and/or standards may be employed to classify earthen material as either a solid or a liquid, for disposal purposes. In some example embodiments, these tests quantify the slump and/or stackability of the discharged material. For example and without limitation, slump tests may be outlined in ASTM C 143 entitled "Standard Test Method for Slump of Hydraulic-cement Concrete", AASSHTO T 119 entitled "Slump of Hydraulic Cement Concrete", or EPA SW-846 Test Method. 9095B entitled "Paint Filter Liquids Test", which are incorporated herein by reference for all relevant and consistent purposes. Other fluidic tests may be used to determine the liquidity of the earthen material. In some embodiments, after mixing, the solidifying additive thickens the spoil material such that it meets a criteria provided by the aforementioned tests, such the earthen material may be classified as solid and may be disposed of without restricted liquid spoil disposal protocols.

The mixing system 100 further includes a vane assembly 134 (FIGS. 8-9), also referred to herein as a "diffuser", arranged in proximity to the additive discharge 124 for spreading and/or diffusing the additive before the additive is introduced into the mixer housing 102. The illustrated diffuser 134 is an example and other diffuser designs may be used unless stated otherwise.

Figure 12:
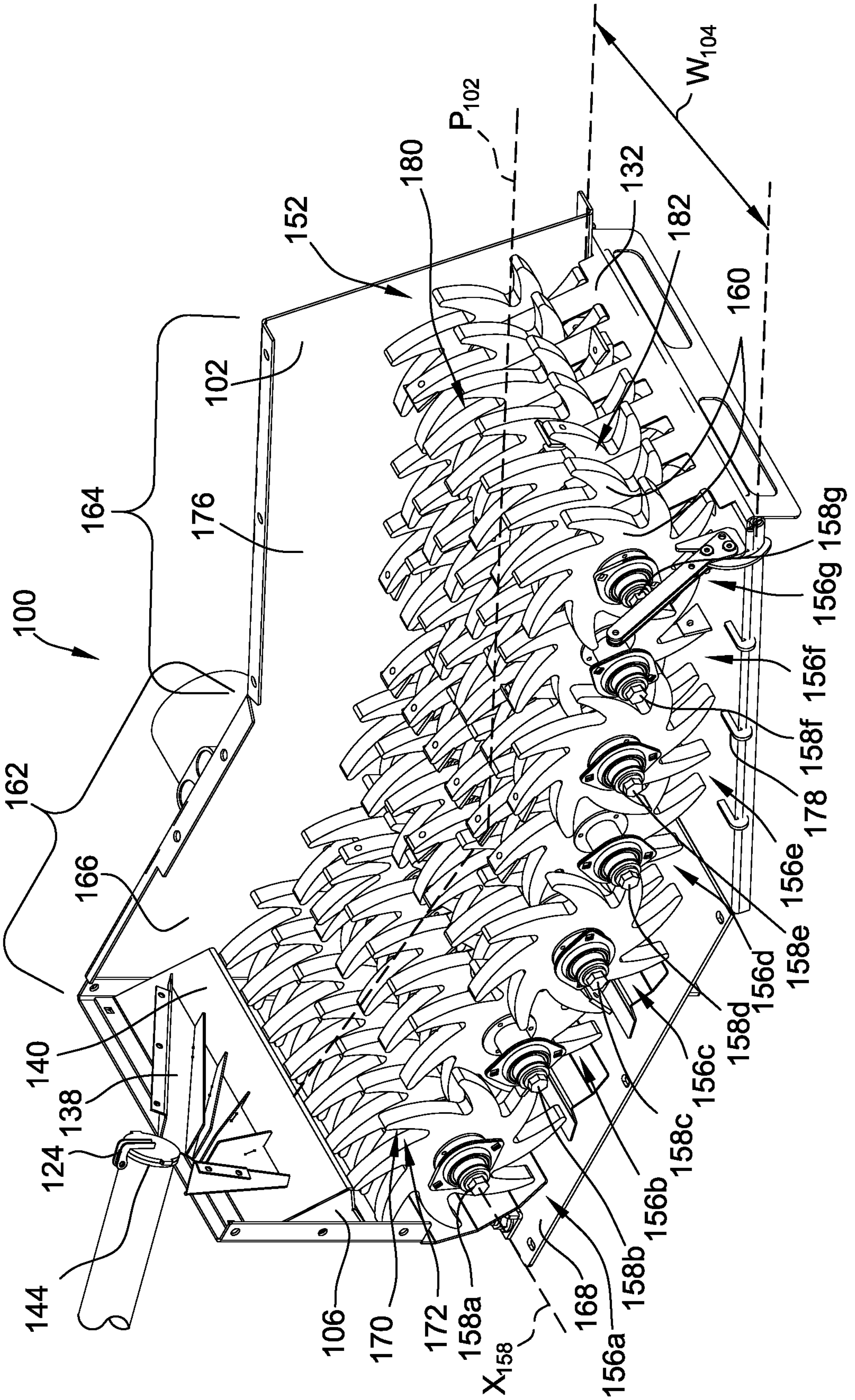
FIG. 12 is a perspective view of the mixing system.

The vane assembly 134 includes a plurality of vanes 136 which direct the additive from the additive discharge 124 and disperse the additive laterally across the inlet 112. The vanes 136 are arranged such that spaces between adjacent vanes 136 is smaller, in an area in proximity to the additive discharge 124, while the spaces between adjacent vanes 136 increases in a direction away from the additive discharge 124. The vane assembly 134 further includes a back plate 138 and an optional lower louver 140 (FIG. 12). The back plate 138 and the lower louver 140 direct additive in a forward direction, away from the front wall 106. In some example embodiments, the back plate 138 is eliminated and the front wall 106 of the mixer housing 102 acts as a back plate. The vane assembly 134 is coupled to the front wall 106 using any suitable methods, for example, rivets, bolts, and/or welding connections. In some example embodiments, the vane assembly 134 may be formed integrally with the front wall 106.

Figure 7:
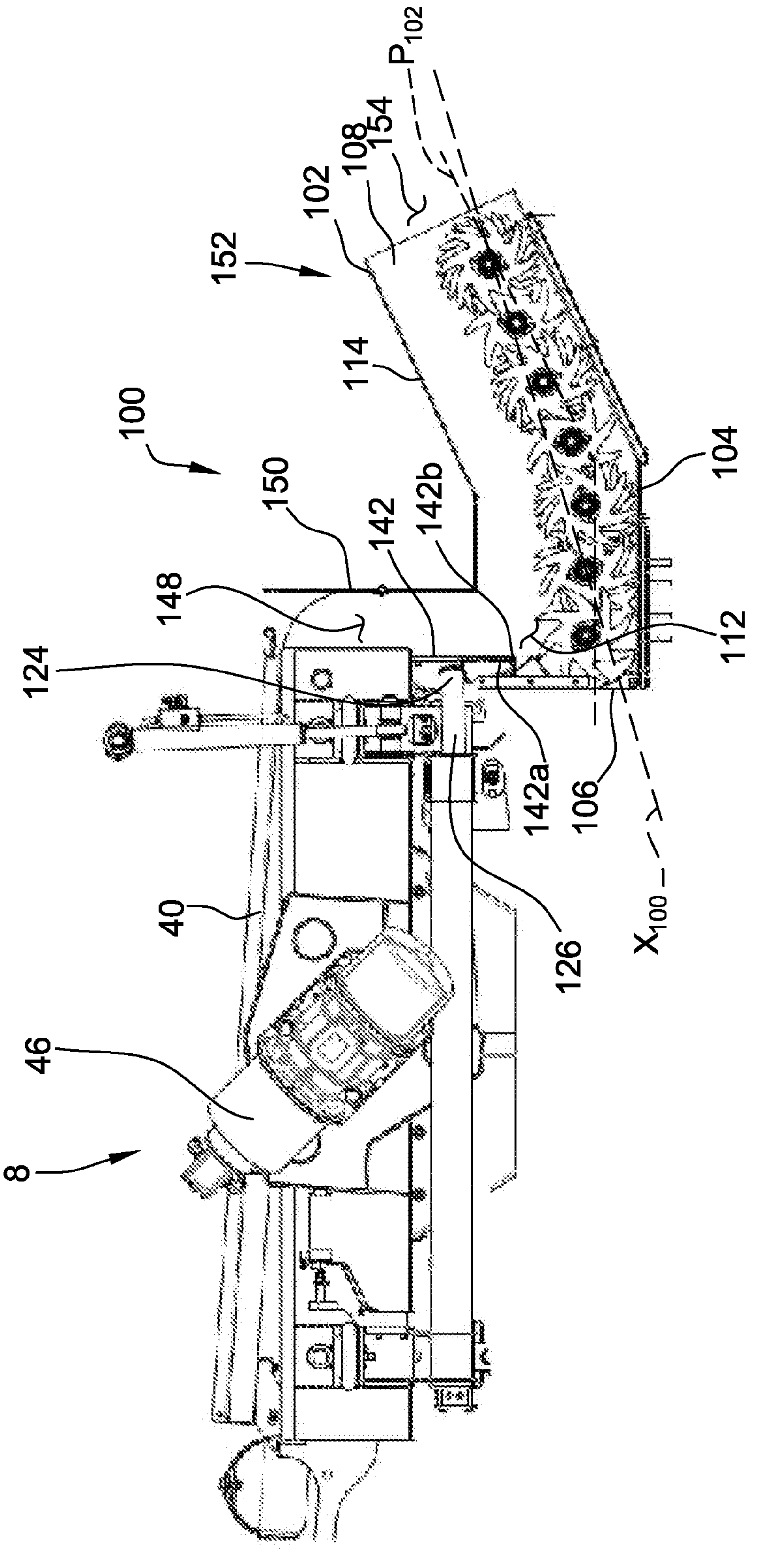
FIG. 7 is a side view of the mixing system and the dewatering system.

The mixing system 100 includes a first shield plate 142 (FIG. 7). The first shield plate 142 has an inner surface 142*a* and an exterior surface 142*b*. The first shield plate 142 extends in front of the vanes 136, such that the inner surface 142*a* faces that vanes 136 and the exterior surface 142*b* (i.e., the opposite surface) faces away from the vanes 136. The first shield plate 142 is generally parallel to the front wall 106. The additive discharge 124 is arranged between the back plate 138 and the first shield plate 142, such that the additive passes through the vane assembly 134 between the first shield plate 142 and the back plate 138 before contacting the first disk assembly 156*a* described below. The first shield plate 142 may also extend in front of the lower louver 140. The inner surface 142*a* of the first shield plate 142 limits how far forward the additive first engages the disk assembly 156*a*.

The additive discharge 124 includes a cap 144 (FIG. 12) that is rotationally coupled to the tube 126. The cap 144 may be hinged to the tube 126. The cap 144 covers the additive discharge 124 when additive is not introduced into the mixing system 100 and rotates out of the way by additive pushed by additive exiting the tube 126 during additive addition. The additive feed system 120 may further include a screen (not shown) that prevents large chunks of additive from entering the mixer housing 102.

The mixing system 100 also includes a spoil material feed system 146 for adding spoil material (e.g., an earthen slurry) to the mixing system 100. In this illustrated embodiment, the spoil material feed system 146 includes the dewatering system 8 (also referred to herein a shaker system) of the hydro excavation vacuum apparatus 2. The spoil material feed system 146 includes a solid fraction spoil material discharge 148 (FIG. 7), e.g., the discharge end 48 of the dewatering system 8, at which the solid fraction of the spoil material is added to the mixer housing 102. The spoil material discharge 148 is disposed in proximity to the inlet 112.

Referring again to FIG. 7, the mixing system 100 includes a second shield plate 150 in proximity to the spoil material discharge 148 of the spoil material feed system 146 to direct spoil material into the mixing system 100. The spoil material discharge 148 is arranged between the exterior surface 142*b* of the first shield plate 142 and the second shield plate 150, such that spoil material passes between the first shield plate 142 and the second shield plate 150 before engaging the first disk assembly 156*a*. The second shield plate 150 may be a flexible material, for example rubber, which allows the second shield plate 150 to flex and bend while absorbing the vibrations of the dewatering system 8.

The second shield plate 150 directs spoil material toward the mixing system 100 at the inlet 112. The first shield plate 142 separates the additive discharge 124 and the earthen material discharge 148, preventing mixing of the additive and the spoil material as they are both introduced into the mixer housing 102. The additive discharge 124 is disposed forward of the spoil material discharge 148 relative to the longitudinal axis $X_{100}$ of the mixing system 100. In other words, the additive is added to the mixer housing 102 closer to the front wall 106, compared to the spoil material.

Figure 13:
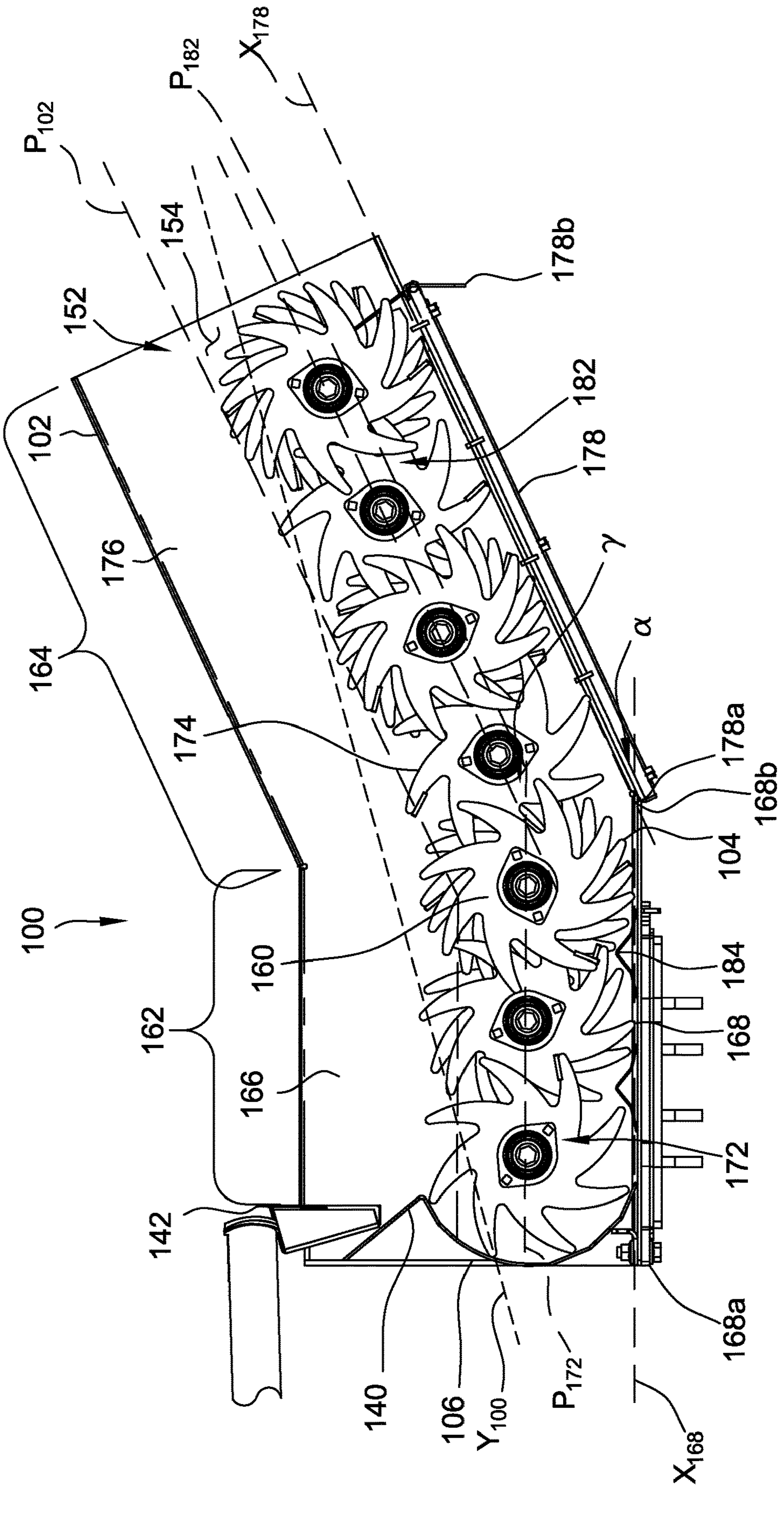
FIG. 13 is a side view of the mixing system.

Referring now to FIGS. 12-13, the mixing system 100 includes a flow path $P_{102}$ that extends generally from the front wall 106 towards a mixer discharge end 152 of the mixer housing 102. The path $P_{102}$ may extend generally along a longitudinal axis $Y_{100}$ of the mixing system 100 which extends from the front wall 106 to the mixer discharge end 152 of the mixer housing 102. The mixer housing 102 includes a mixer discharge 154 for discharging material. The mixer discharge 154 is disposed toward the discharge end 152 of the mixer housing 102.

The mixing system 100 includes a plurality of disk assemblies 156 (numbered from first disk assembly 156*a* to seventh disk assembly 156*g*)) disposed within the mixer housing 102. Each disk assembly 156 includes a rotatable shaft 158 (numbered from first rotatable shaft 158*a* to seventh rotatable shaft 158*g*) that extends from the first sidewall 108 to the second sidewall 110. Each of the rotatable shafts 158 includes a shaft axis $X_{158}$ about which the rotatable shaft 158 rotates. Each of the shaft axes $X_{158}$ of the plurality of rotatable shafts 158 is generally parallel to the other axes $X_{158}$. Each disk assembly 156 includes a plurality of disks 160 connected to the each of the rotatable shafts 158. The plurality of disks 160 are each coupled to the rotatable shafts 158, such that rotations of the rotatable shafts 158 result in rotation of the plurality of disks 160. The disks 160 rotate in a direction such that the upper portion of each disk 160 rotates toward the discharge 154 of the mixing system 100 and the bottom portion of each disk rotates toward the front wall 106 of the mixing system 100.

Figure 11:
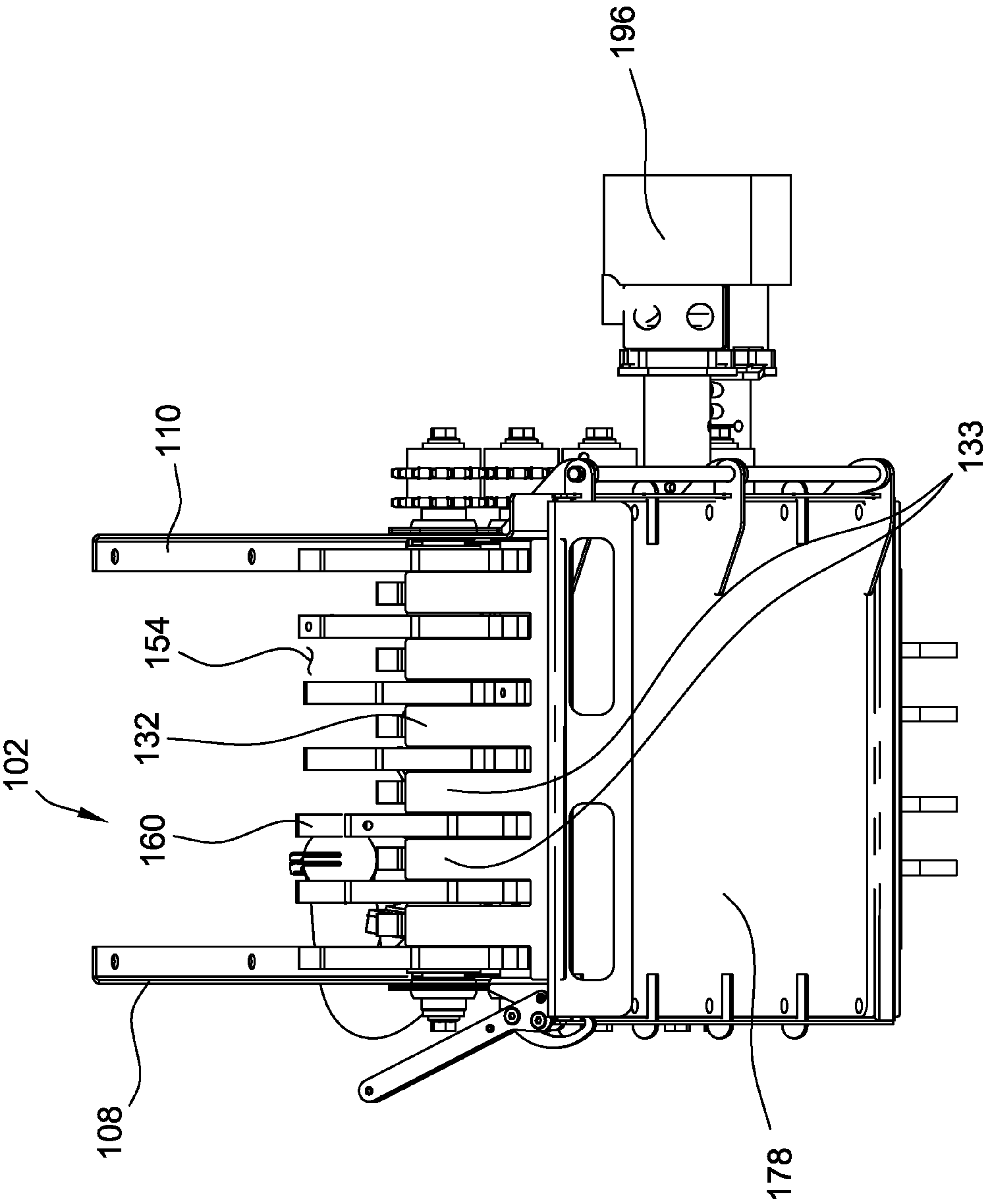
FIG. 11 is a rear view of the mixing system showing a mixer discharge.

Without being bound to any particular theory, the disks 160 act collectively to mix the spoil material (e.g., the solid fraction discharged from the dewatering system 8) and the solidifying additive in a lower portion of the mixing system 100 (e.g., below the shaft axis $X_{158}$) and carry larger, thickened material in the upper section of the mixing system 100 (e.g., above the shaft axis $X_{158}$ and/or above the disks 160). The solidifying additive may be metered into the mixing system 100 at a desired rate (or even not at all if the spoil material is sufficiently solid). The larger chunks of material do not fall through the disks 160 and are carried by the disks 160 to the discharge 150. Smaller, more fluidic material falls through the disks 160 and mixes with additive. This material aggregates into larger material and is conveyed upward on the disks 160 and toward the discharge 154. A discharge scraper 132 (FIGS. 11 and 12) is positioned at the discharge 154 of the mixing system 100 which promotes separation of material from the disks 160 at the discharge 154. The discharge scraper 132 includes one or more prongs 133 which extend, generally perpendicularly, from the second section floor 178 to at least the common plane $P_{182}$ such that a prong 133 is disposed between adjacent disks 160.

Referring now to FIG. 13, the disk assemblies 156 are divided into a first plurality 172 of disk assemblies 156 and a second plurality 182 of disk assemblies 156 (which may be referred to herein as a "first set 172" and "second set 182", respectively). At least a portion of the disks of the first set 172 of disk assemblies 156 are aligned such that a common plane $P_{172}$ runs through the shafts 158 of the first set 172 of disk assemblies 156. In addition, a least a portion of the disks of the second set 182 of disk assemblies are aligned such that a common plane $P_{182}$ runs through the shafts 158 of the second set 182 of disk assemblies.

In the illustrated embodiment, the mixing system 100 and housing 102 is divided into a first section 162 and a second section 164. The first section 162 includes a first section housing 166 having a first section floor 168. The first section 162 generally does not include an outlet formed therein from which material is removed from the mixing system 100 (e.g., other than a hatch or other opening that may be selectively opened and closed to provide access to the first section 162 for performing an operation, such as a cleaning or repairing operation). The first set 172 of disk assemblies 156 is arranged within the first section 162 of the mixing system.

The second section 164 of the housing 102 includes a second section housing 176 including an inclined floor 178 (also referred to herein as the second section floor 178) angled downward from the mixing system discharge 154 toward the first section floor 168. The second set 182 of disk assemblies is arranged within the second section 164.

Figure 19:
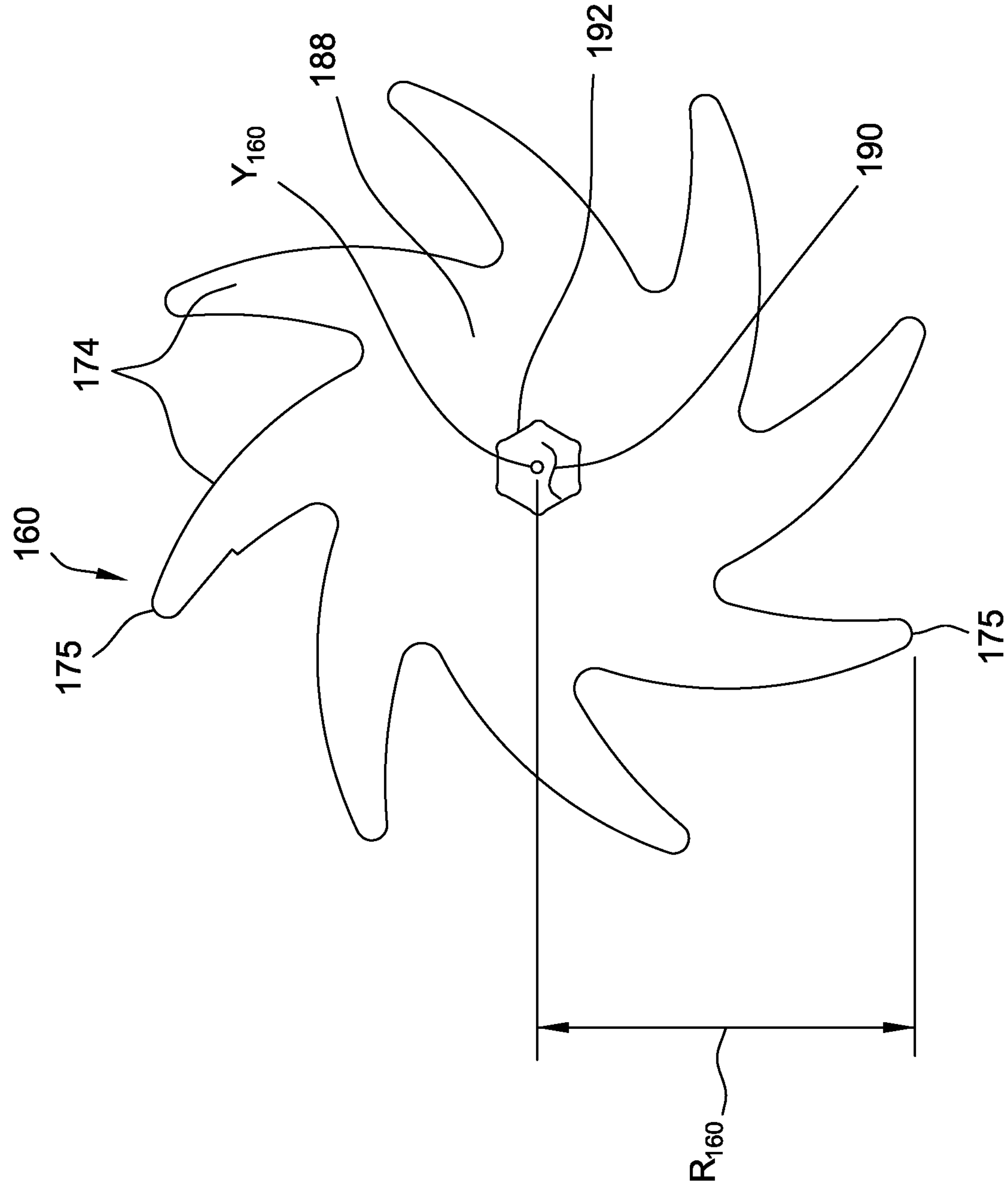
FIG. 19 is a side view of the disk.

Disks 160 of each disk assembly 156 each has fingers 174 that extend radially outward from a disk central axis $Y_{160}$ of the disks 160 (FIG. 19). Each finger 174 includes a distal fingertip 175. The disks 160 have a radius $R_{160}$ that extends between the disk central axis $Y_{160}$ to the distal fingertips 175. As shown in the illustrated embodiment, the disks 160 are identical. In other embodiments, at least some disks 160 have a different size or shape than other disks of the mixing system 100.

In this illustrated embodiment, the first set 172 of disk assemblies 156 includes at least one, at least two, or at least three rotatable shafts 158 that extend between the first sidewall 108 and the second sidewall 110, above the first section floor 168. At least three, at least four or at least five disks 160 are connected to each of the rotatable shafts 158 within the first section housing 166. The second set 182 of disk assemblies includes at least one, at least two or at least three rotatable shafts 158 that extend from the first sidewall 108 to the second sidewall 110 with at least three, at least four or at least five disks 160 being connected to each of the rotatable shafts 158 within the second section housing 176. The spacing between disks, number of disks per row, number of rows and the size of the disks of the first and second assemblies 162, 164 as described and shown herein are exemplary and other spacing, number of disks, number of rows and the size of the disks may be used unless stated differently (e.g., depending on desired size of agglomerated materials, size of mixer and the like).

Figure 14:
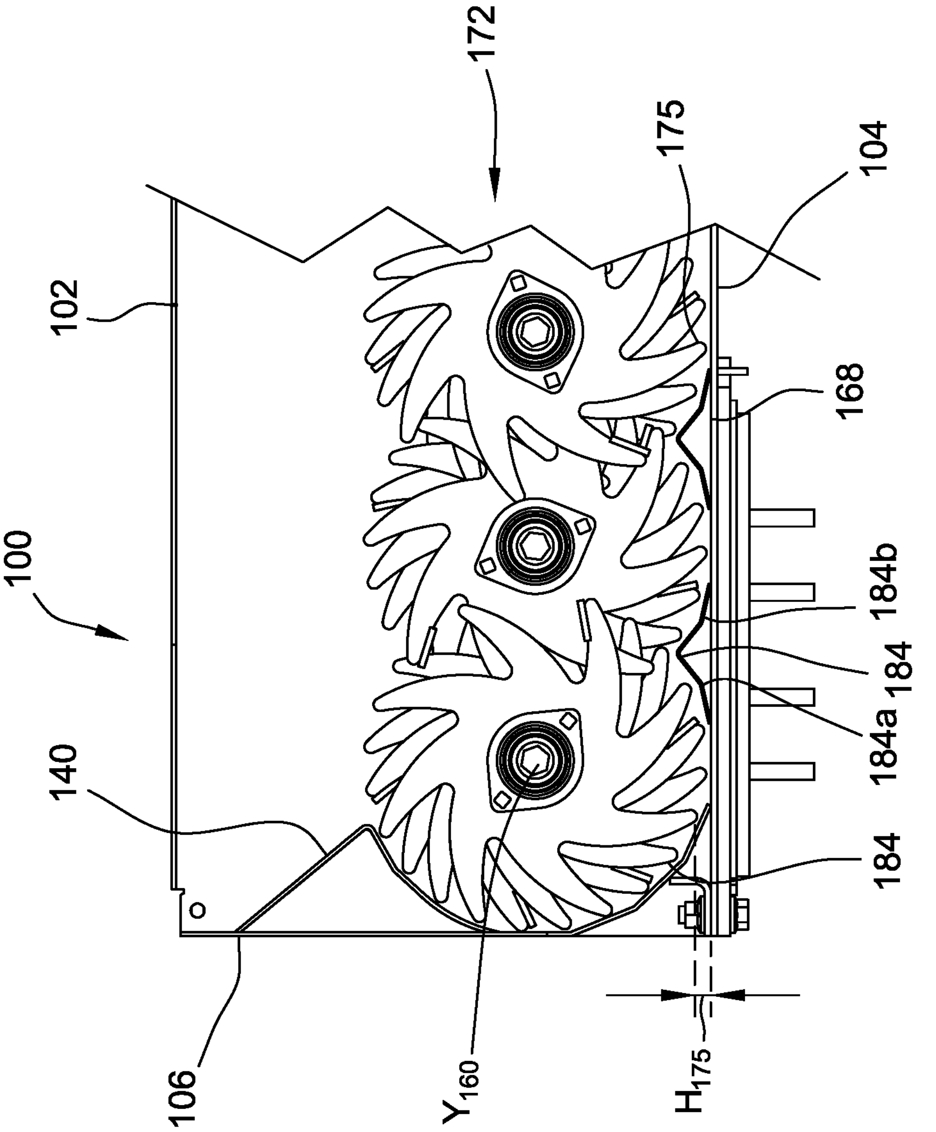
FIG. 14 is a detailed side view of the mixing system.
Figure 15:
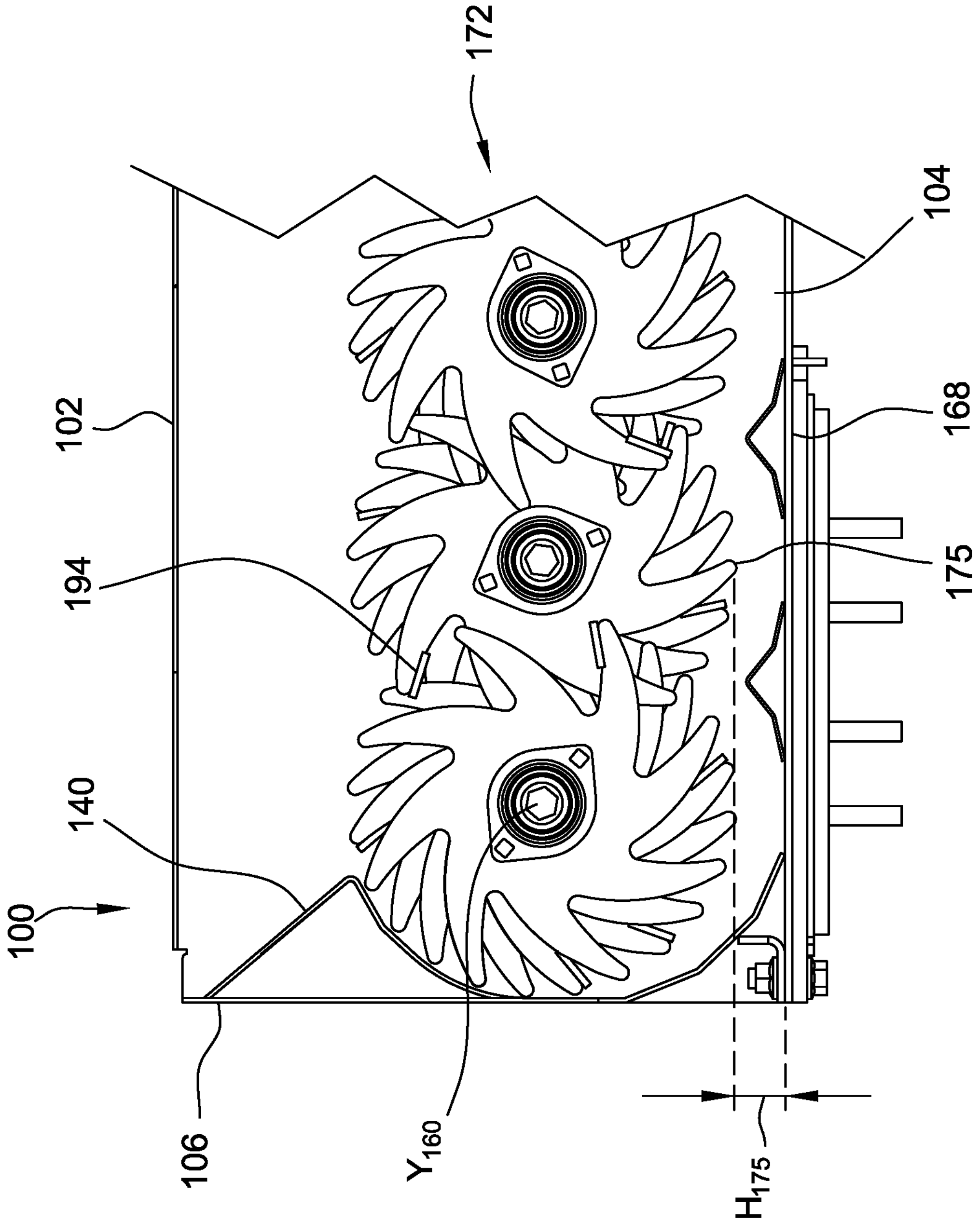
FIG. 15 is a detailed side view of another embodiment of a mixing system with the disk assembly arranged at a second distance from the floor.

Referring now to FIGS. 14 and 15, the disks 160 of the first set 172 of disk assemblies is arranged in proximity to the first section floor 168. The disks 160 are arranged such that the distal fingertips 175 are a distance of $H_{175}$ relative to the first section floor 168. The distance $H_{175}$ may be less than 0.5 times the radius $R_{160}$ of the disk 160 (FIG. 15) or, as in other embodiments, less than 0.33 times the radius $R_{160}$ of the disk 160, less than 0.25 times the radius $R_{160}$ of the disk 160 or less than 0.1 times the radius $R_{160}$ of the disk 160 (FIG. 14). In some embodiments, the distal fingertips 175 may reach and/or touch the first section floor 168.

The first and second sets 172, 182 of disk assemblies 156 are arranged to propel material from the first section 162 into the second section 164 and through the mixing system discharge 154. The disks 160 propel the material generally along the path $P_{102}$ from the front wall 106 to the discharge end 152. In the view depicted on FIG. 13, the disks rotate in a clockwise direction to propel the material along path $P_{102}$. The mixing system discharge 154 is the only outlet of the mixing system 100 through which processed material is discharged. At least a portion of the aggregated particles in the slurry are conveyed by the disks 160 to the discharge 154 and at least a portion of the slurry falls through the disks 160. More specifically, the disks 160 cause a portion of the aggregated particles to be propelled toward the discharge and at least a portion of the slurry to be propelled toward the front wall. The portion that falls to the second section floor 178 may flow down the second section floor 178 and returns to the first section housing 166.

The first section floor 168 and the second section floor 178 are connected together at the first section floor second end 168*b* and the second section floor first end 178*a*. The first section floor 168 and the second section floor 178 may be hinged and clamped together, may be formed integrally, or may be welded or fastened together in any other suitable manner.

Figure 20A:
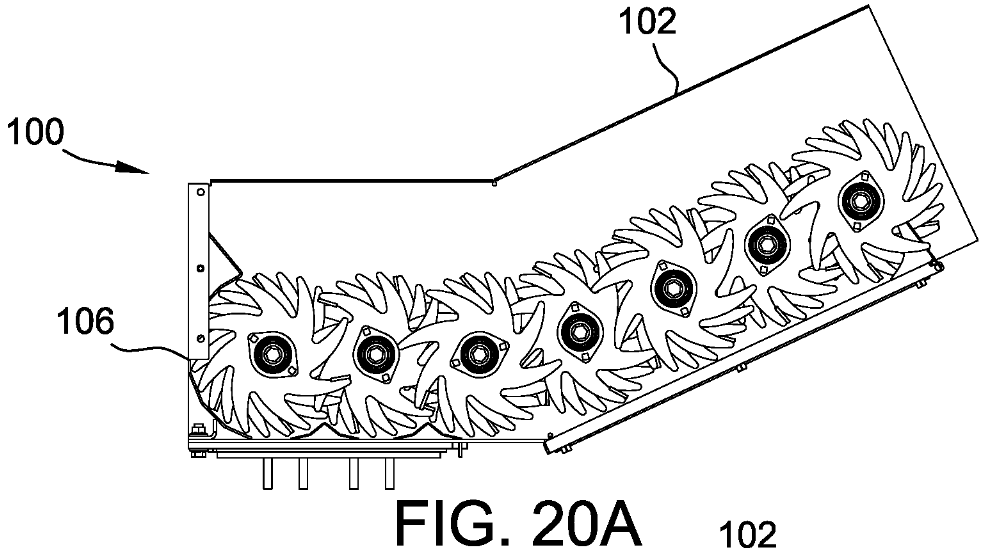
FIG. 20A is a side view of the mixing system.
Figure 20B:
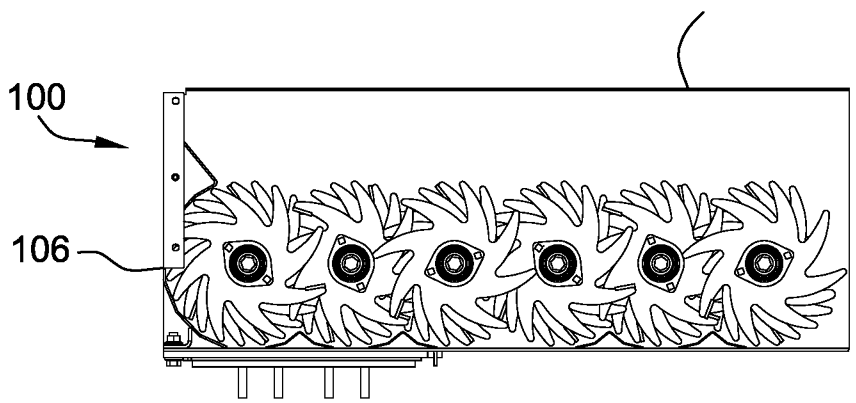
FIG. 20B is a side view of another embodiment of a mixing system.
Figure 20C:
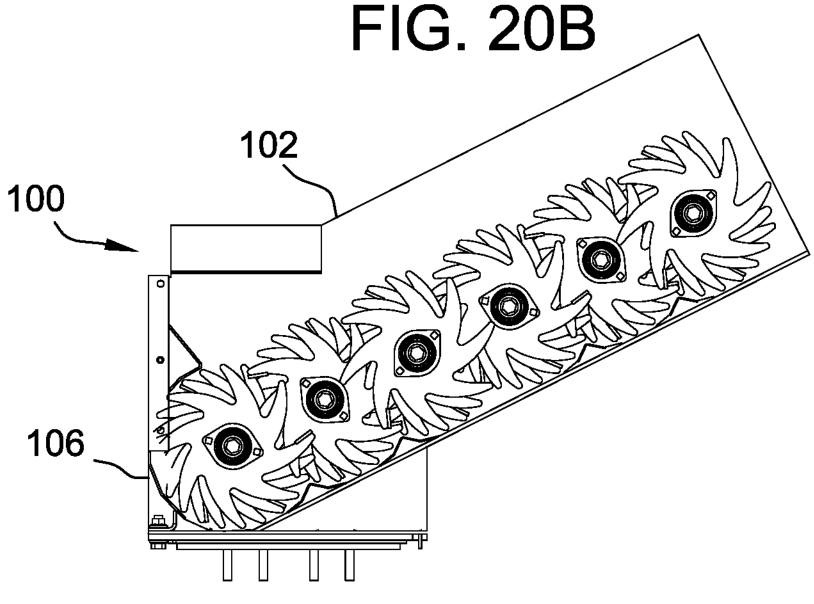
FIG. 20C is a side view of yet another embodiment of a mixing system.

The second section floor 178 extends from the first section floor 168 at an angle $\alpha$. The angle $\alpha$ may be between 5° and 60° or, as in other embodiments, between 5° to 45°, or between 5° and 30°. In yet other embodiments the angle is 0°. In other example embodiments, the first section floor 168 and the second section floor 178 may be arranged at any appropriate angle $\alpha$ that enables the mixing system 100 to function as described herein. Referring now to FIGS. 20B-C, in other example embodiments, the mixing system 100 is not divided into separate first and second sections that are angled relative to each other the disks are aligned such that a common plane runs through each of the shafts of the disk assembly. The mixing system 100 may be parallel to the ground (FIG. 20B) or sloped upward toward its discharge end (FIG. 20C).

Referring now to the embodiment illustrated in FIG. 12, the mixing system 100 has a consistent width $W_{104}$ with the width of the first section 162 being approximately the same as a width of the second section 164. In some other embodiments, the width changes and/or tapers along the length of the system 100.

Referring now to FIGS. 14 and 15, in the illustrated embodiment, the first section floor 168 includes a plurality of baffles 184 arranged in-between adjacent rotatable shafts 158. The baffles 184 are triangular in shape and extend upwards from the first section floor 168. The baffles 184 include a first surface 184*a* and a second surface 184*b* that directs spoil material and additive towards the disk assembly 156. In some example embodiments, the first and second surfaces 184*a*, 184*b* may be concaved. The baffles 184 extend substantially between the first sidewall 108 and second sidewall 110 and are generally parallel with the rotatable shafts 158. The baffles 184 prevent material from settling in space in-between adjacent rotatable shafts 158 that cannot be reached by the fingers 174 of the disks 160. In this illustrated embodiment, the second section floor 178 does not include the baffles 184. The second section floor 178 serves to direct more fluidic earthen material downwards towards the first section 162. The baffles 184 are coupled to the first section floor 168 using bolts or other suitable fasteners or are integral with the first section floor 168.

In reference to FIGS. 16-19, the plurality of disks 160 are arranged, along the length of the rotatable shaft 158 such that there is a distance $L_{160}$ between adjacent disks 160. The disks 160 are equally spaced along the length of the shaft 158, and a spacer 186 is disposed onto the shaft 158 between adjacent disks 160. The spacer 186 acts to maintain the arrangement of the plurality of disks 160 along the rotatable shaft 158. In some embodiments, the first and second sets 172, 182 of disk assemblies 156 include additional components, such as washers, that maintain the distance $L_{160}$ between the disks 160 arranged on the rotatable shafts 158.

Figure 18:
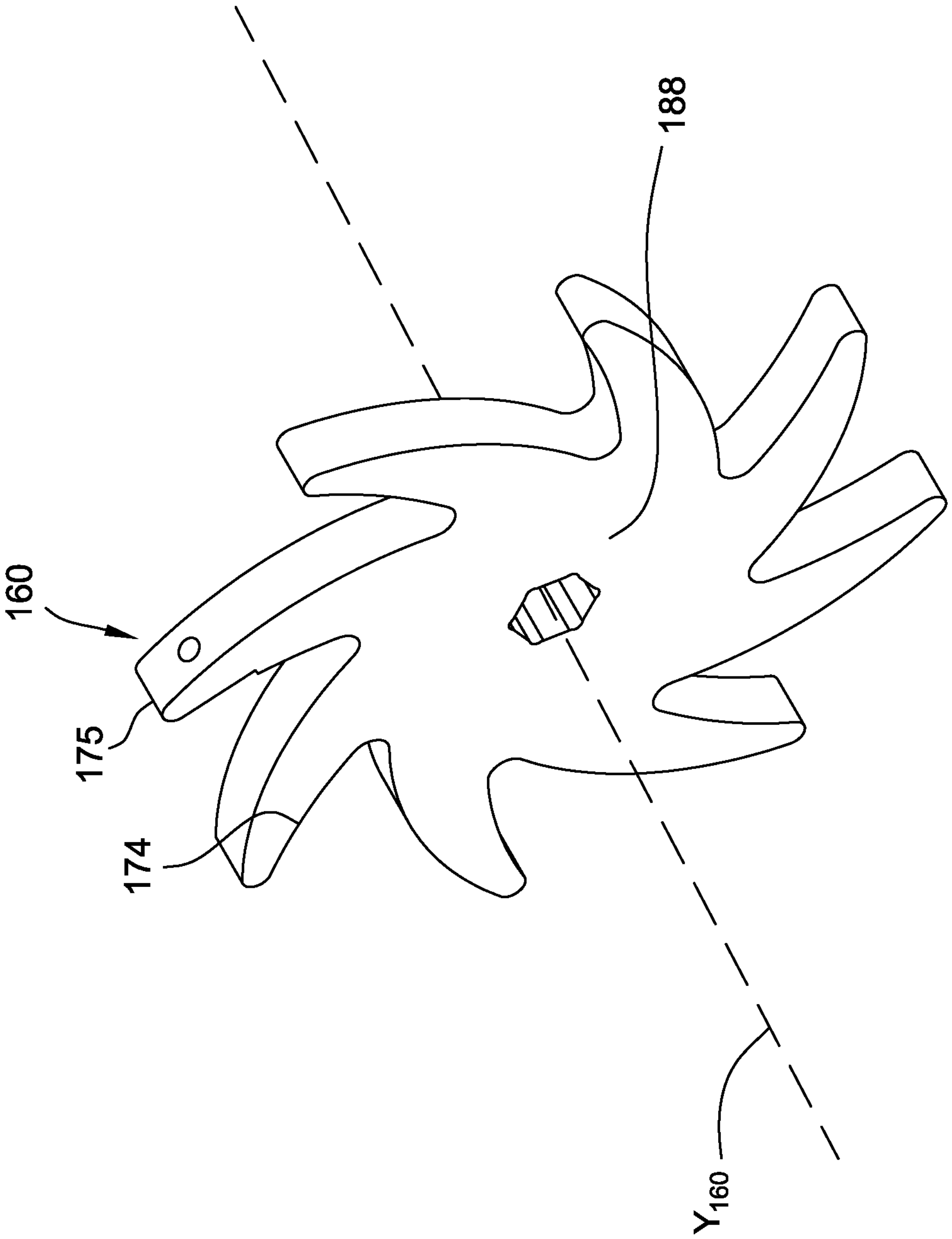
FIG. 18 is a perspective view of a disk.

Referring now to FIGS. 18 and 19, each of the plurality of disks 160 includes a central portion 188 and a plurality of the fingers 174 that extend radially outward from the central portion 188. The central portion 188 defines a disk opening 190 and the rotatable shaft 158 is disposed within this disk opening 190. A boundary 192 of the disk opening 190 is sized and shaped to mate with an outer surface of the rotatable shaft 158. The disk opening 190 is defined by a hexagonal boundary 192 and the rotatable shaft 158 includes a corresponding hexagonal shape which mates with the hexagonal boundary 192 of the disk opening 190.

In some other example embodiments, the plurality of disks 160 and the rotatable shafts 158 include retaining features, such as keyed features and/or an alignment pin that is used to couple the plurality of disks 160 to the rotatable shafts 158. In some example embodiments, the plurality of disks 160 are coupled to the rotatable shaft 158 using a friction fit, i.e., the disks are press and/or shrink fit onto the rotatable shaft 158.

Figure 16:
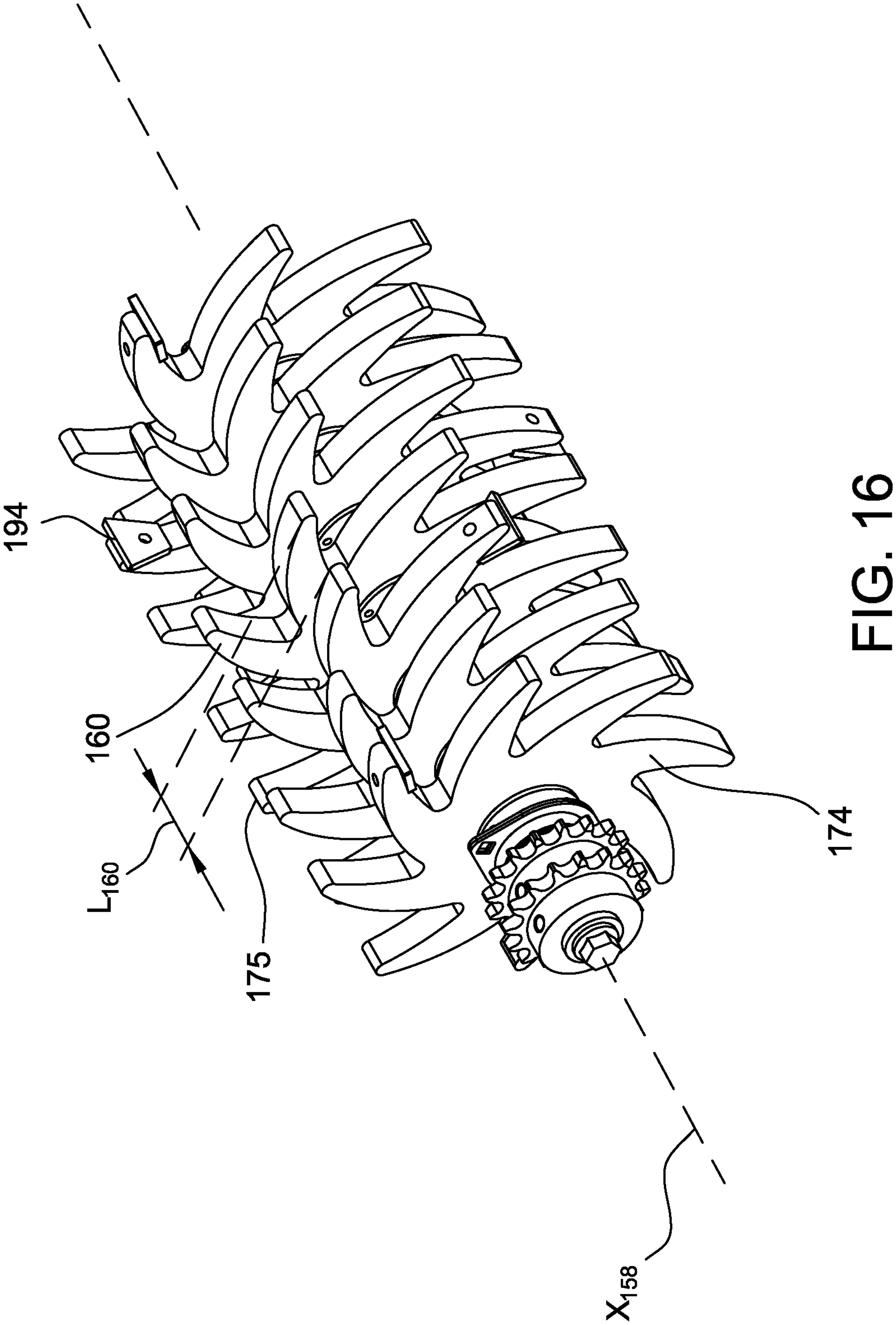
FIG. 16 is a perspective view of a row of disks mounted to a rotatable shaft of the disk assembly.
Figure 17:
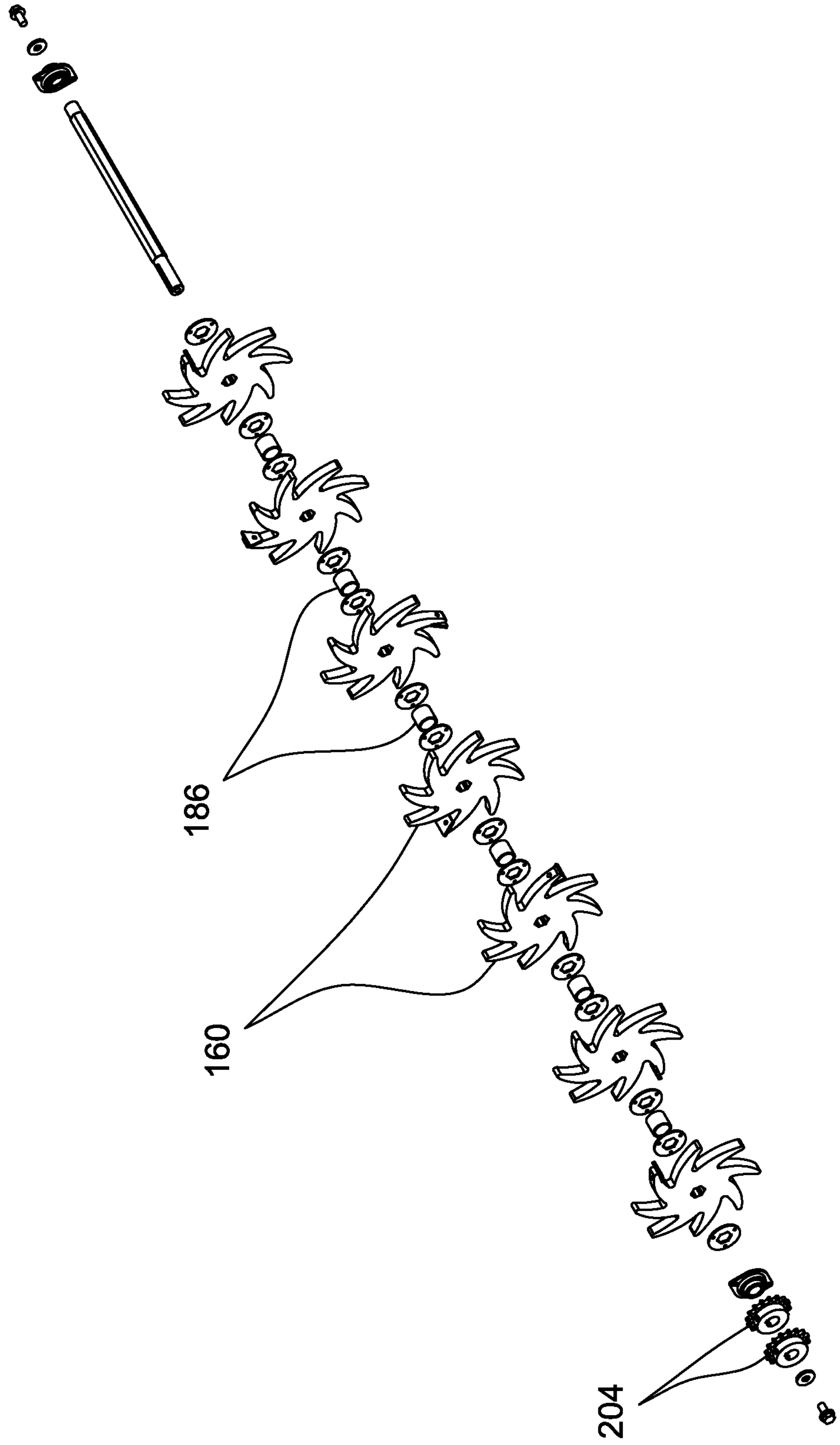
FIG. 17 is a perspective assembly view of the row of disks and rotatable shaft.

One of more disks 160 may include a disk scraper 194 coupled to a distal portion of the finger 174 (FIG. 16). The disk scrapers 194 may be coupled to the fingers 174 using bolts or any other suitable methods. The disk scrapers 194 may be used to cut or break up the spoil material and/or the additive. The disk scrapers 194 may also scrape spoil material and additive that is disposed on the first section floor 168. The disks 160 adjacent to the discharge scraper 132 do not include disk scrapers 194 to allow the fingers 175 to pass between the prongs 133.

Figure 8:
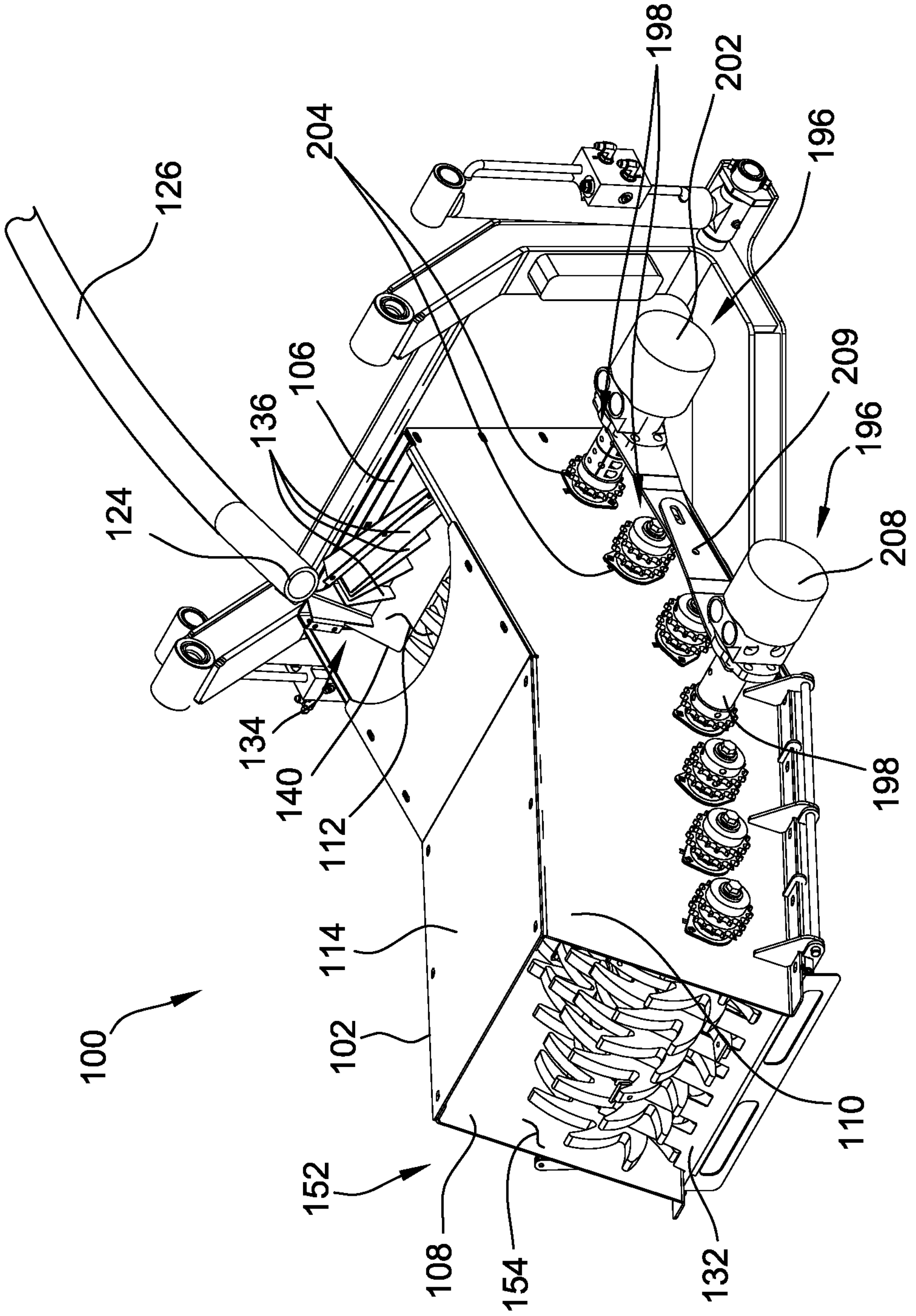
FIG. 8 is a perspective view of the mixing system showing an additive discharge of the additive feed system at which additive is added to the mixing system.

The plurality of rotatable shafts 158 are operably coupled with at least one disk motor 196 (FIG. 8). The disk motor 196 rotates each of the rotatable shafts 158 (FIG. 12), and likewise the disks 160, about the shaft axis $X_{158}$. The rotatable shafts 158 includes a drive section 198 (FIG. 8) that extends through an aperture formed on at least one of the first sidewall 108 and/or the second sidewall 110, such that the drive section 198 extends outside of the mixer housing 102 and may be operably connected to at least one of the disk motors 196.

In the first section 162 of the mixing system 100, a first motor 202 is coupled at least one of the drive sections 198 of a rotatable shaft 158. The second section 164 includes a second motor 208 that is operably coupled to at least one of the drive sections 198 of the shafts 158. Adjacent rotatable shafts 158 of each section 162, 164 are operably coupled together using chains 206 (not shown) connected between sprockets 204 disposed on the drive sections 198 of the shafts 158.

The first and the second motors 202, 208 may be used to control the rotational speeds of the first and second sets 172, 182 of disk assemblies 156, independently. In some example embodiments, the first motor 202 rotates the first set 172 at a first speed and the second motor 208 rotates the second set 182 at a second speed, different from the first speed. In some example embodiments, the first speed is less than the second speed. In some embodiments, the first motor 202 rotates the rotatable shafts 158 of the first set 172 of disk assemblies 156 in the range of 100-200 revolutions per minute (rpm) and the second motor 208 rotates the rotatable shafts 158 of the second set 182 of disk assemblies 156 in the range of 0-300 rpm.

In this illustrated embodiment, the first and second motors 202, 208 are hydraulic motors that may be connected in series or in parallel. Each of the first and second motors 202 and 208 includes a torque arm 209 to support the first and second motors 202 and 208. The first and second motors 202, 208 may be connected to a controller including a user interface that enables an operator to control and adjust the rotational speeds to of the first and second sets 172, 182 of disk assemblies 156 independent of one another. In other embodiments, the mixing system 100 may include any number of disk motors 196 enabling control of the rotational speeds of each of the disk assemblies 156. The aperture and/or the drive sections 198 which extends through the apertures on the mixer housing 102 may include sealing components which prevent leakage of the earthen material.

The mixing system 100 may be operated to selectively add additive to the spoil material. In some instances, the spoil material that enters the mixing system 100 is of sufficient quality (e.g., moisture content and/or thickness) that additive need not be added. In such instances, the additive system 120 is not operated (e.g., motor 129 is not powered) and additive is not added to the mixing system 100. Spoil material is conveyed through the system 100 without additive being introduced into the system 100. When it is desired to add additive, the additive feed system 120 is operated and additive is added to the mixer system 100 with spoil material. Both the additive and the spoil material are introduced into mixer housing 102 into the first section 162 and onto the first disk assembly 156*a*. As described previously, the additive discharge 124 is disposed forward of the spoil material discharge 148 along the longitudinal axis $X_{100}$, such that the additive reaches the disks 160, closer toward the front wall 106, compared to where the spoil material reaches the disks 160. The additive may pass through the spaces between the disks 160 and fall onto first section floor 168 or contact spoil material riding of the disks 160. The mixing of the additive and the earthen material generally occurs within the first section 162, below the common plane $P_{172}$. As described previously, the additive causes the spoil material to thicken and aggregate into particles which are carried toward the second section 164. In the second section 164, larger material continues to be carried by the disks 160 and moves toward the mixing system discharge 154. Smaller material falls to the second section floor 178 and may move toward the first section 162 to be further mixed with additive.

Figure 21A:
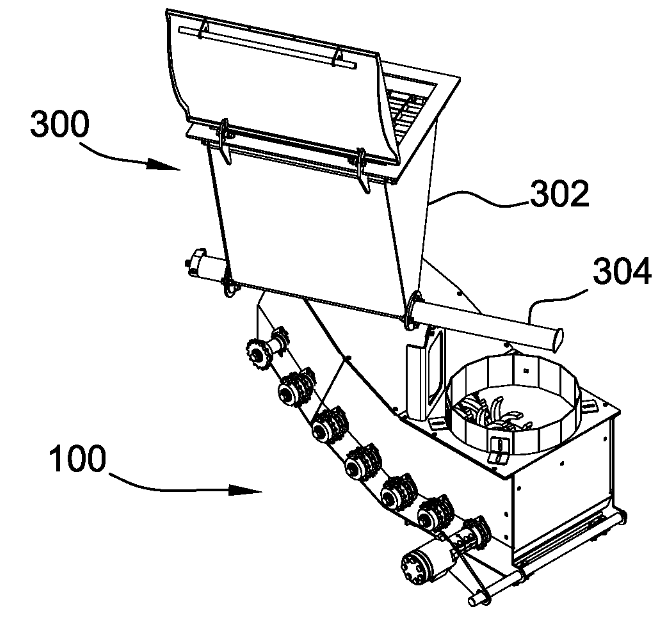
FIG. 21A is a perspective view of the mixing system and another embodiment of an additive feed system.
Figure 21B:
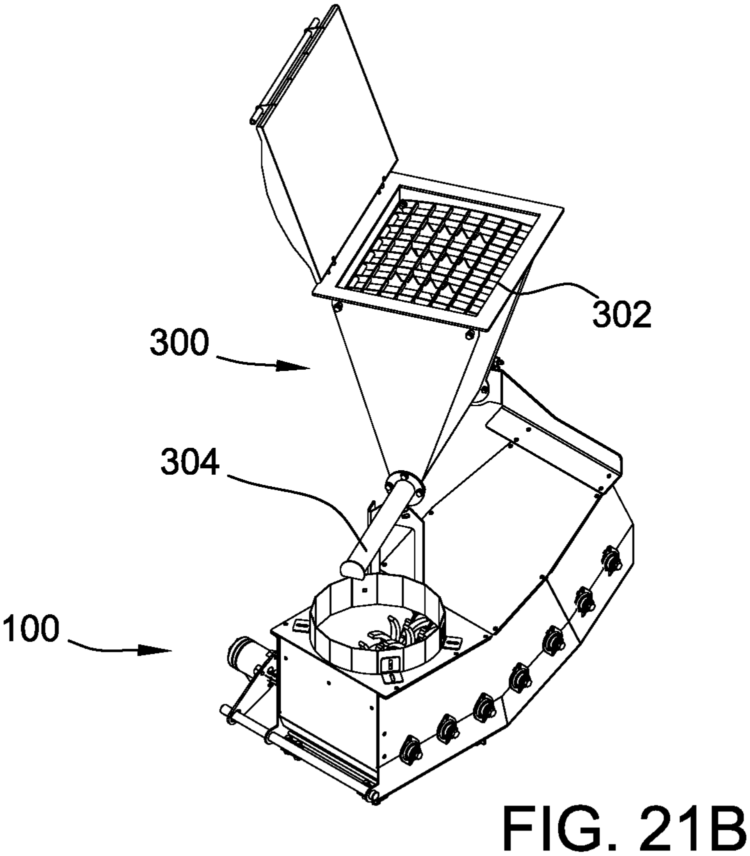
FIG. 21B is a perspective view of the mixing system and the additive feed system of FIG. 21A.
Figure 22:
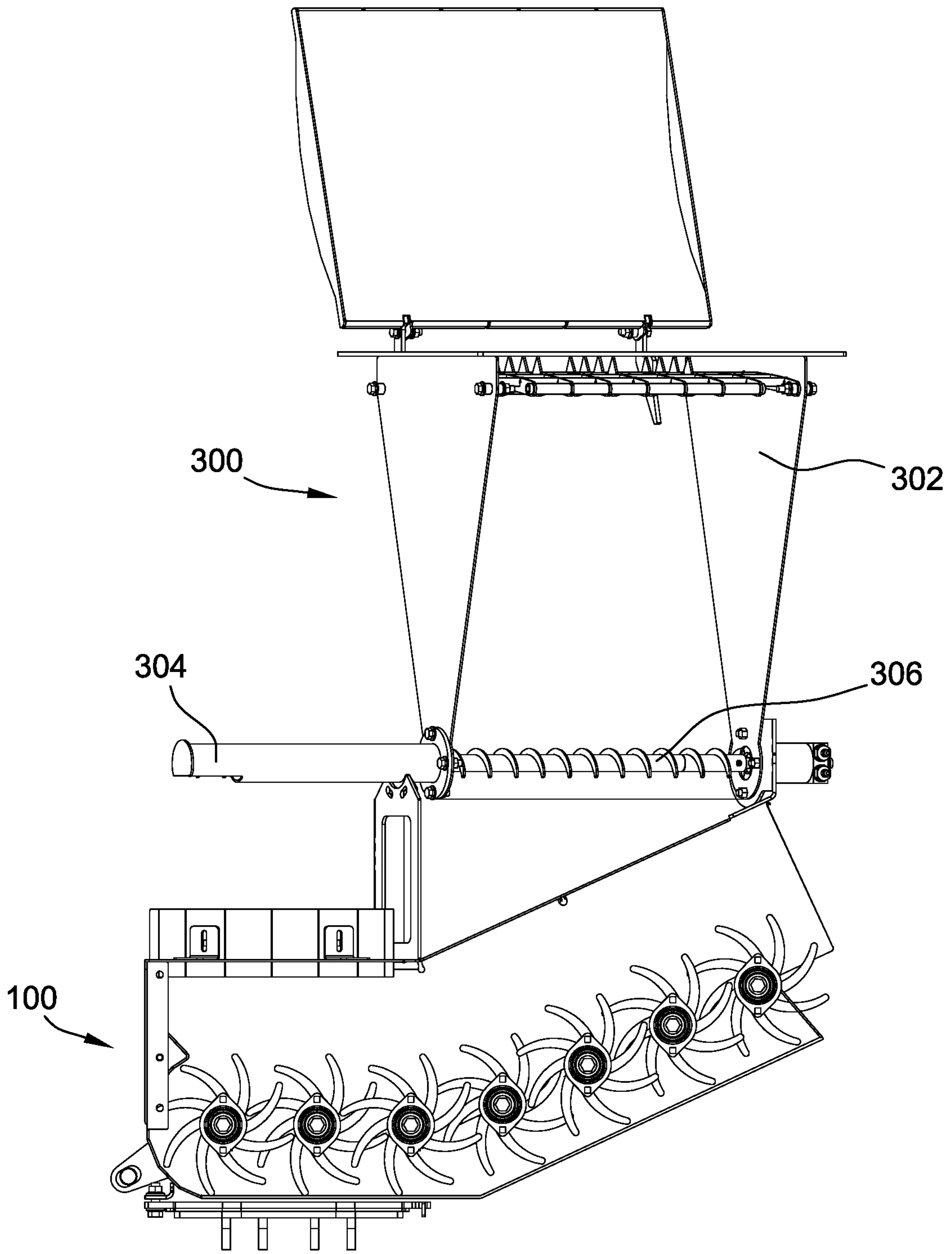
FIG. 22 is a side view of the example additive feed system of FIG. 21A.
Figure 23:
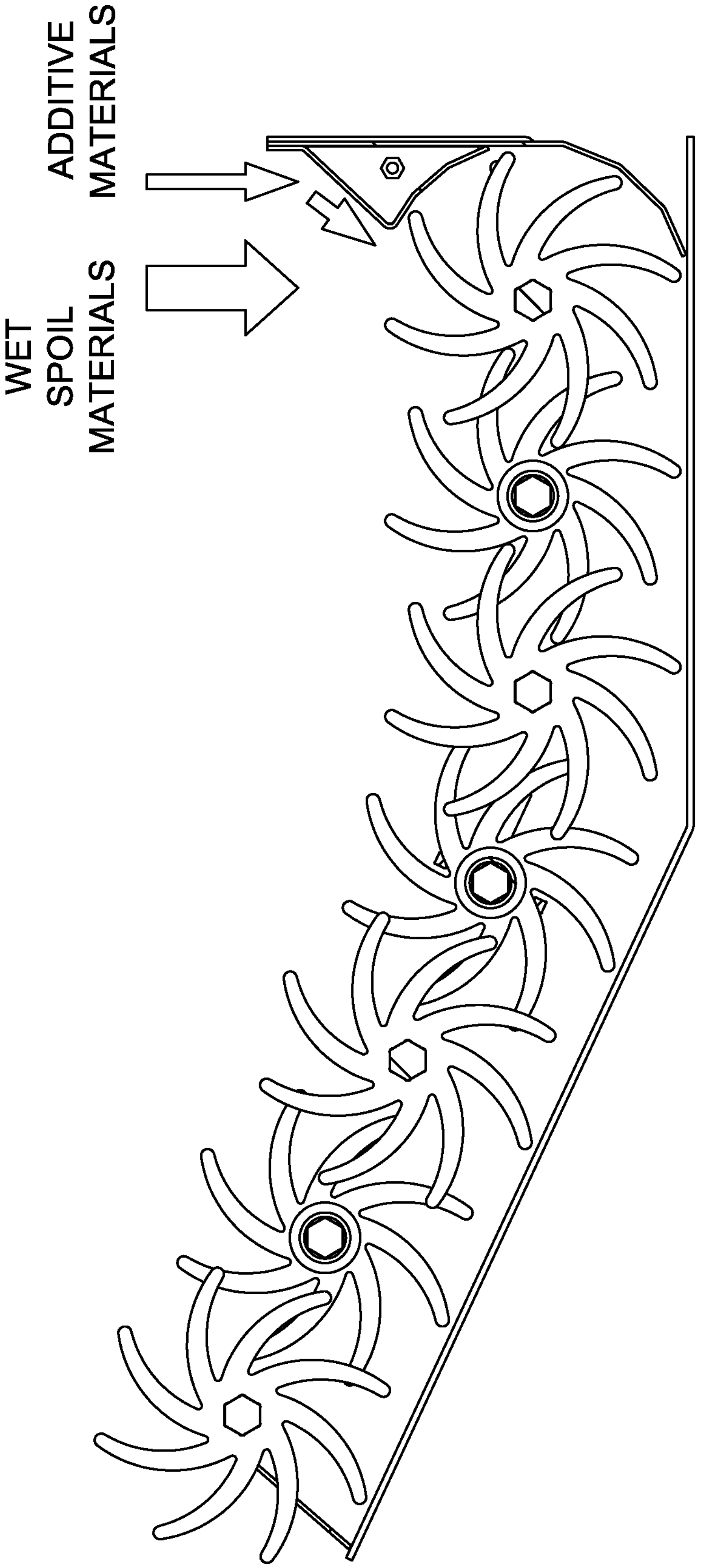
FIG. 23 is a side view of the mixing system showing the points of addition of solidifying additive and spoil material.

Another embodiment of an additive feed system 300 is shown in FIGS. 21A, 21B, and 22. The additive feed system 300 includes a feed vessel 302 for adding additive to the mixer housing 102. The additive feed system 300 includes an additive discharge 304 at which additive is added to the mixer housing 102. The additive discharge is disposed above the inlet 112. The additive feed system 300 also includes a conveyor 306 for conveying additive from the feed vessel 302 to the first section 162. The feed vessel 302 is supported, at least in part, by the mixer housing 102. The feed vessel 302 is supported above the mixer housing 102, such that the additive discharge 304 is disposed above the inlet 112.

Figure 24:
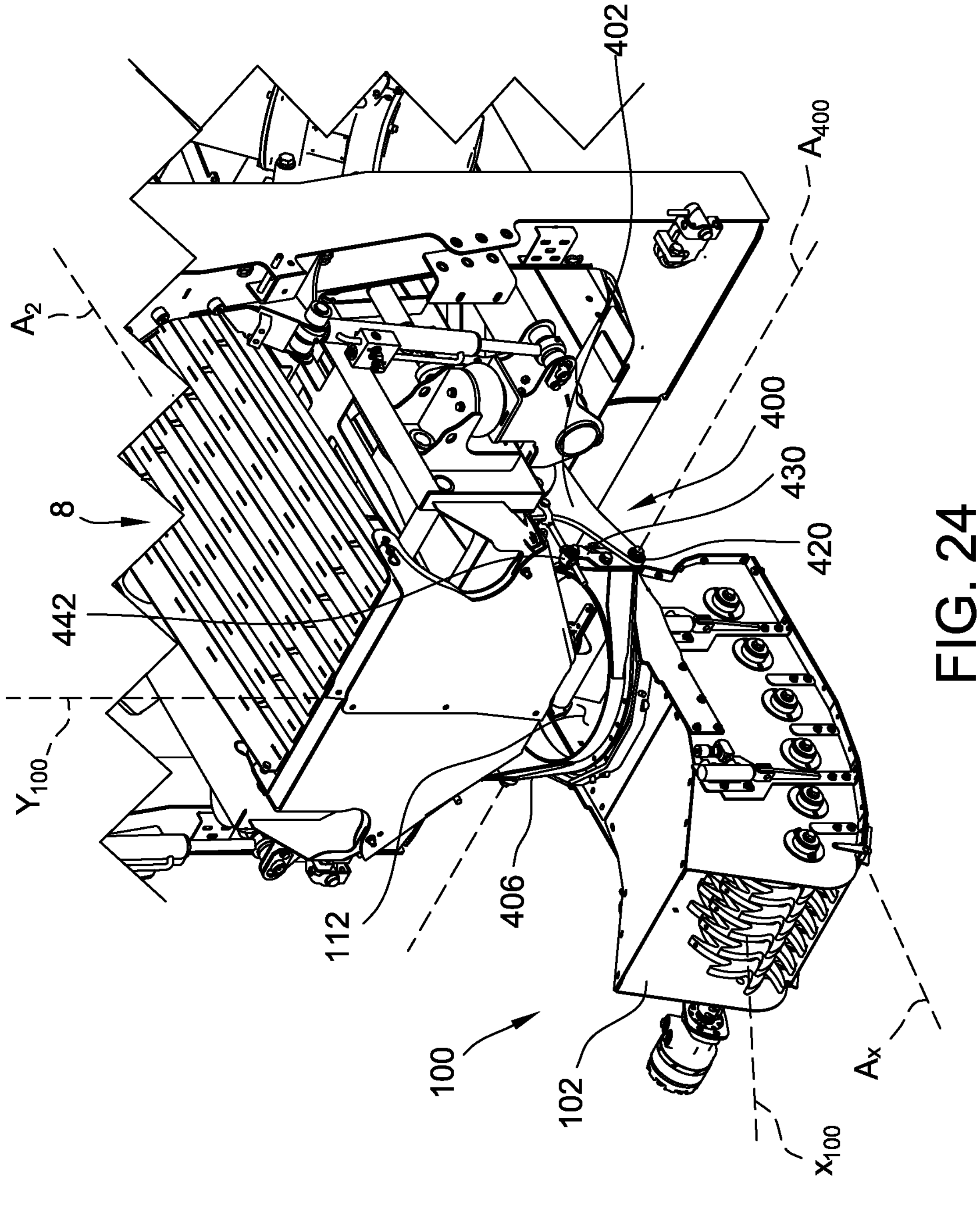
FIG. 24 is a perspective view of another embodiment of a mixing system.
Figure 44:
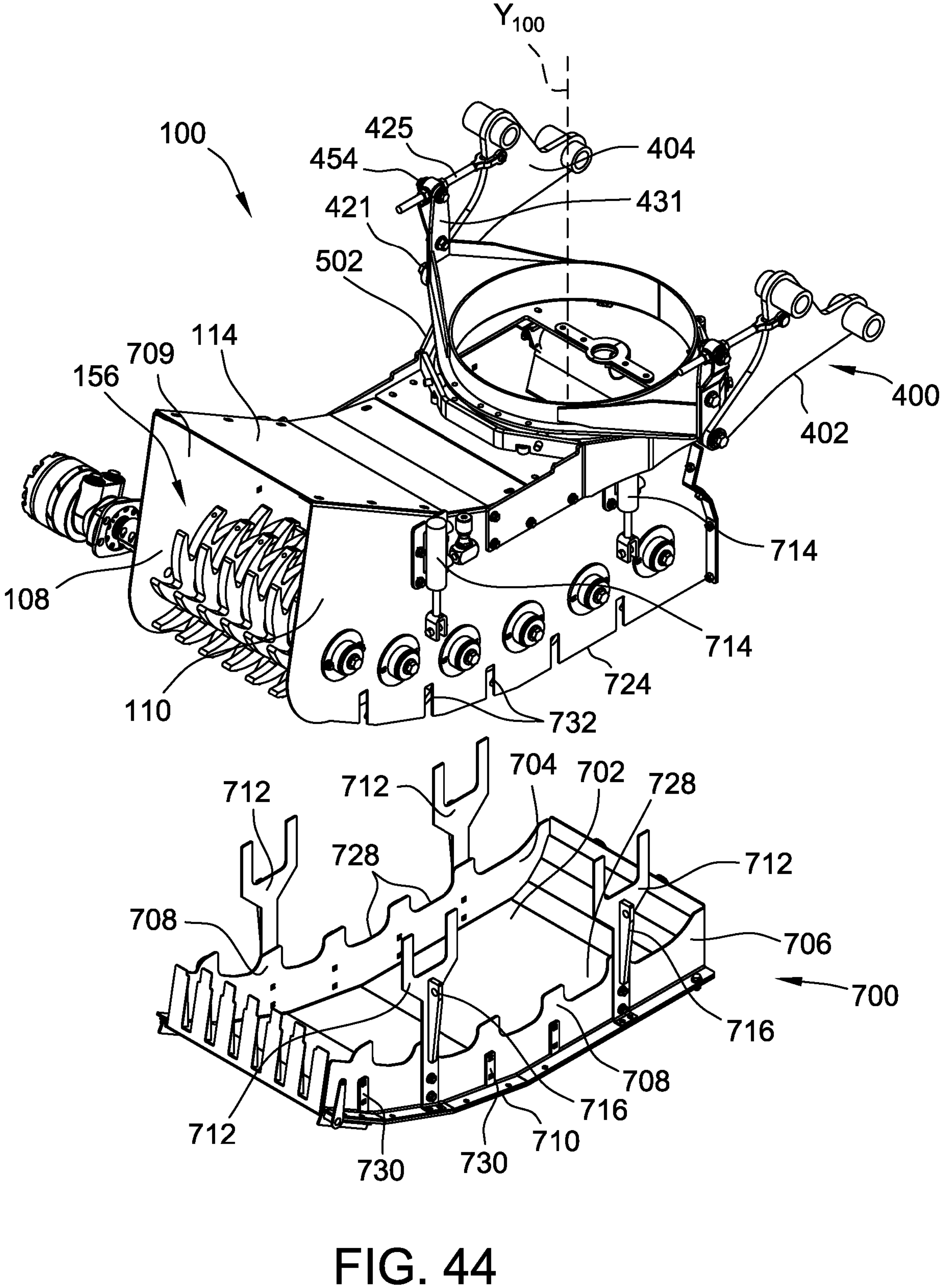
FIG. 44 is an assembly view of the mixer system.
Figure 45:
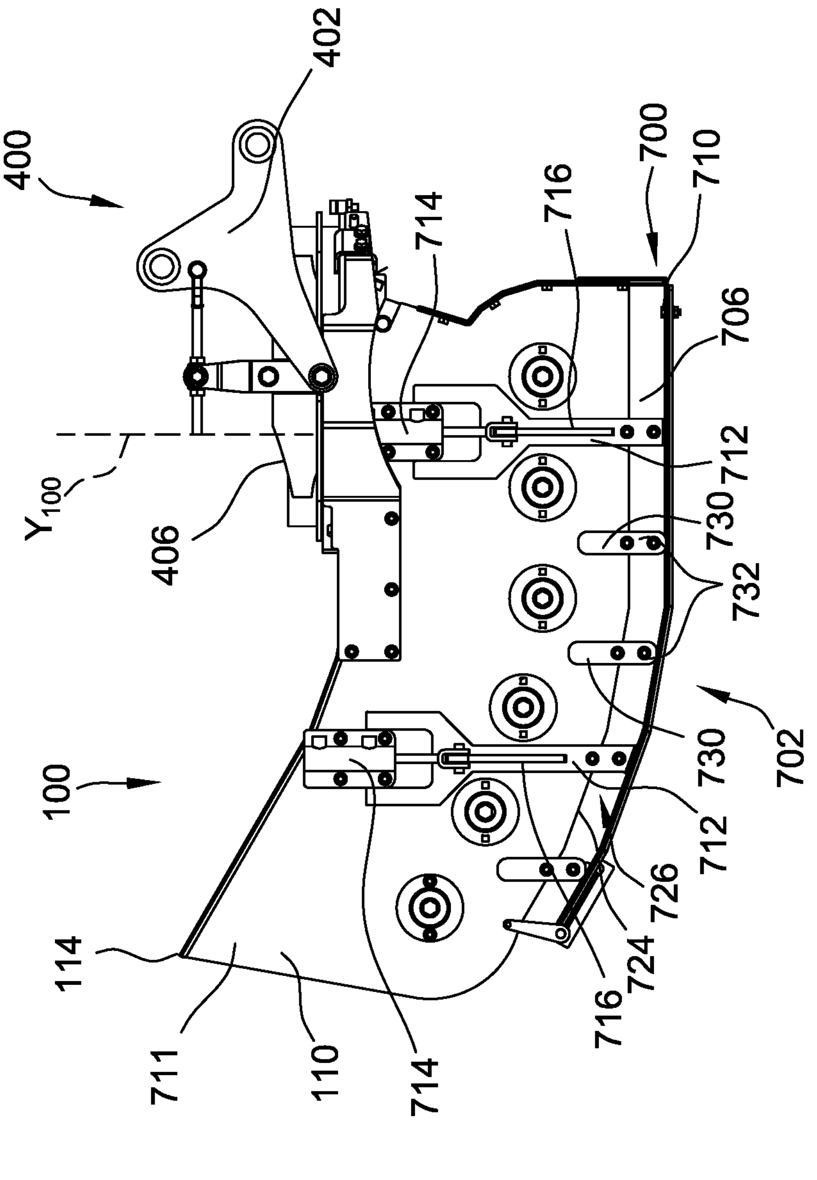
FIG. 45 is a side view of the adjustable floor assembly.

Another embodiment of the mixing system 100 is shown in FIGS. 24-48. The illustrated embodiment of the mixing system 100 is configured to tilt such that the angle $\alpha_{400}$ (FIG. 26) between the longitudinal axis $X_{100}$ of the mixer housing 102 and the horizontal axis $A_x$ may be changed. The mixing system 100 includes a tilt assembly 400 (FIG. 24). The tilt assembly 400 enables the mixing system 100 to rotate about a tilt axis $A_{400}$, such that the longitudinal axis $X_{100}$ of the mixer housing 102 may be selectively tilted relative to the horizontal axis $A_x$. The horizontal axis $A_x$ is generally parallel to the ground and to the longitudinal axis $A_2$ (FIG. 1) of the vehicle 2. The tilt assembly 400 includes a first mount 402 (FIG. 26) and a second mount 404 (FIG. 44). The first and second mounts 402, 404 are connected (e.g., fixedly connected) to a frame (e.g., chassis) of the hydro excavation vacuum apparatus 2. The first mount 402 and second mount 404 are arranged opposite each other with one mount being arranged on each side of the mixing system 100. The second mount 404 may be substantially similar to the first mount 402 and include similar components to the first mount 402 as described below.

The mixing system 100 includes an upper frame 406 (FIG. 29) and a lower frame 502. As described in more detail below, the lower frame 502 rotates relative to the upper frame 406 about a swivel axis $Y_{100}$ (i.e., the upper frame 406 and lower frame 502 are rotationally coupled). The upper frame 406 forms the inlet 112 of the mixing system 100. The lower frame 502 is connected to the mixer housing 102.

The upper frame 406 (FIG. 26) is pivotally connected to the first mount 402 at a first joint 420. The mixing system 100 and the upper frame 406 may be selectively tilted about a tilt axis $A_{400}$ that extends through the first joint 420. The upper frame 406 is also pivotally connected to the second mount 404 (FIG. 44) at a second joint 421. Accordingly, the mixing system 100 and the upper frame 406 may rotate about the first joint 420 and the second joint 421 about the tilt axis $A_{400}$ which extends through both of the first joint 420 and the second joint 421.

Figure 25:
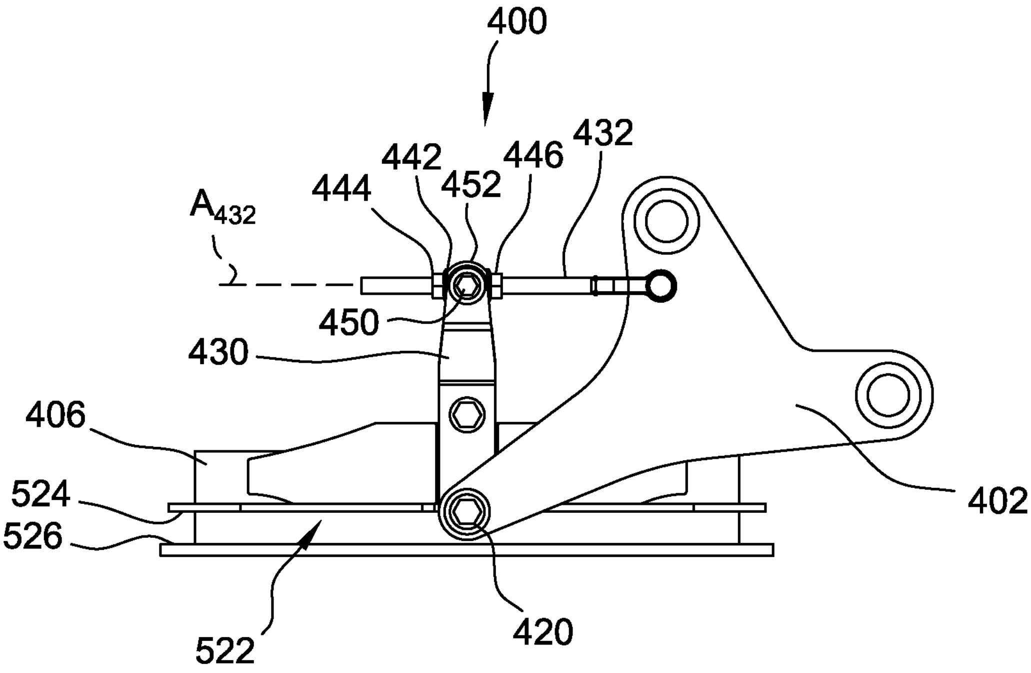
FIG. 25 is a detailed view of a tilt assembly of the mixing system.

Referring now to FIG. 25, the tilt assembly 400 includes an arm 430 and an adjustment rod 432 (or simply "rod"). The arm 430 is connected (e.g., rigidly connected) to the upper frame 406. The arm 430 is pivotally connected to the rod 432. The arm 430 may selectively translate along the rod 432 at a first end 452 of the arm 430 along a rod axis $A_{432}$. The rod 432 is pivotally connected to the first mount 402. The rod 432 is threaded. The arm 430 is connected to a socket 442 by a mounting bolt 450. The socket 442 has a through-hole through which the threaded rod 432 passes. The socket 442 may move along the rod 432 by repositioning first and second nuts 444, 446 that are disposed on each side of the socket 442. Moving the arm 430 along the rod 432 selectively tilts the mixing system 100 about the tilt axis $A_{400}$ (FIG. 24).

Referring now to FIG. 44, a second rod 425 is pivotally connected to the second mount 404 and a second arm 431. The second arm 431 is rigidly connected to the upper frame 406. The second arm 431 is movable along the second rod 425, similar to the description provided above for the rod 432, the arm 430, and the first mount 402. In some embodiments, the second mount 404, second rod 425, and second arm 431 are eliminated and the tilt assembly only includes a first mount 402, first arm 430 and first rod 432.

Figure 26:
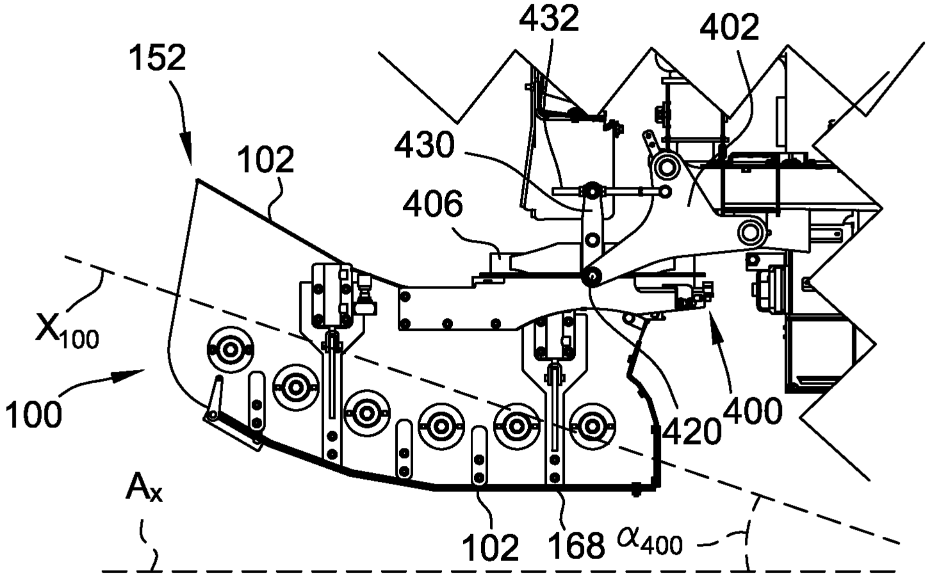
FIG. 26 is a side view of the mixing system showing a mixer housing tilted in a first tilted position.
Figure 27:
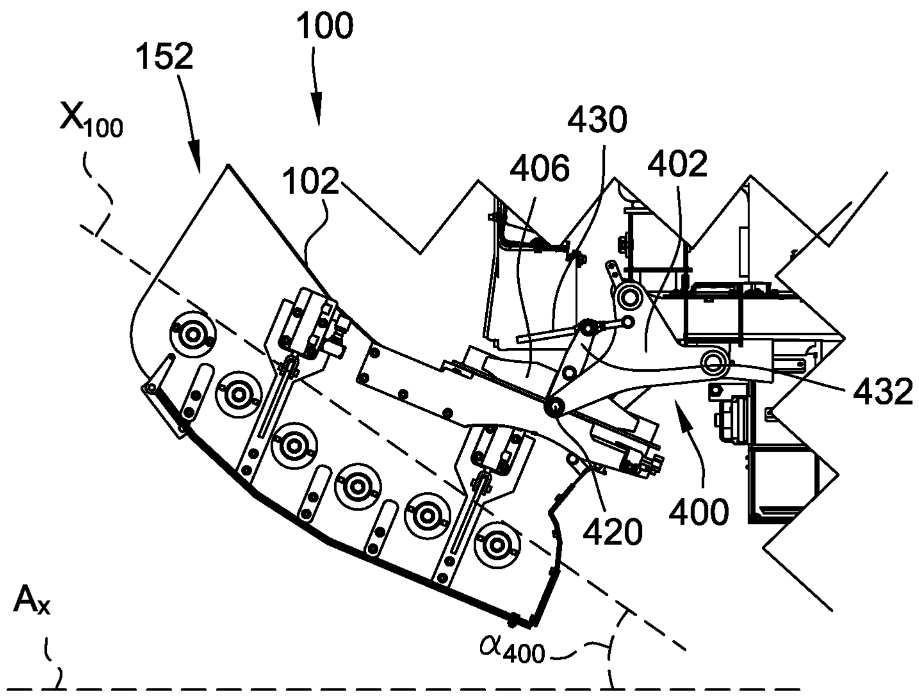
FIG. 27 is a side view of the mixing system showing a mixer housing tilted in a second tilted position.
Figure 28:
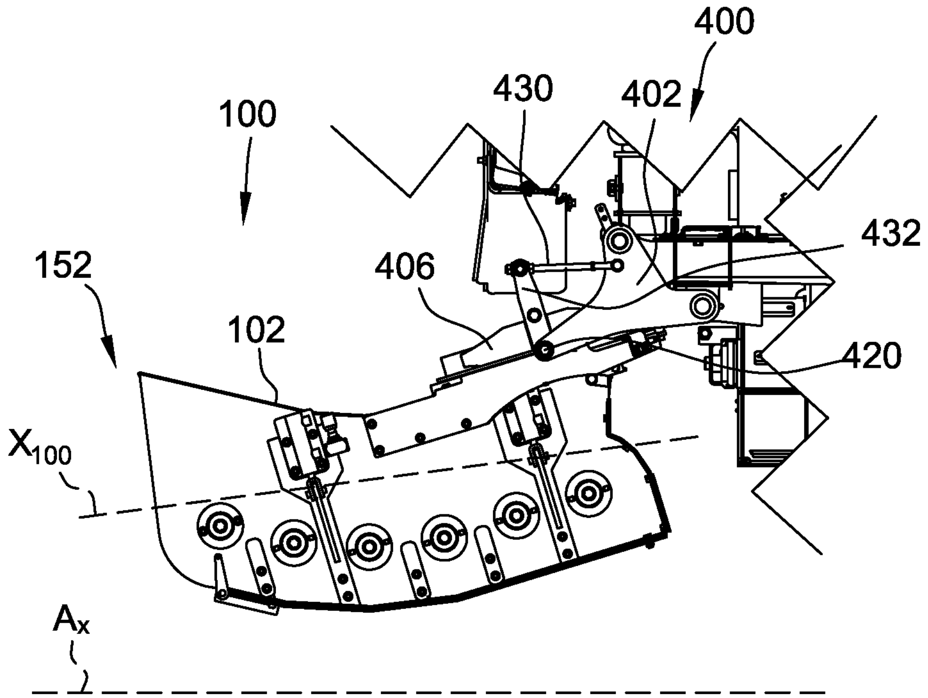
FIG. 28 is a side view of the mixing system showing a mixer housing tilted in a third tilted position.

The first and second arms 430, 431 (FIGS. 25 and 44) may be moved along the respective rods 432, 425 at their first ends 452, 454 to selectively tilt the mixing system 100 in one of a plurality of tilted positions. Specifically, the mixing system 100 may be selectively tilted about the tilt axis $A_{400}$ (FIG. 24) such that a tilt angle $\alpha_{400}$ between the longitudinal axis $X_{100}$ and the horizontal axis $A_x$ may be selectively increased or decreased as shown in FIGS. 26-28. By changing angle $\alpha_{400}$, the angle at which material is expelled through the discharge end 152 of the mixing system 100 also changes.

In some embodiments, the tilt assembly 400 may include one or more actuators (e.g., hydraulic or pneumatic cylinders or linear actuators). For example, actuators may be substituted for the first and second rods 425, 432. Alternatively, rigid links maybe substituted for the first and second rods 425, 432.

In some embodiments and as shown in FIGS. 29-33, the mixing system 100 is configured to swivel about a swivel axis $Y_{100}$. The mixing system 100 includes a swivel assembly 500 that enables the mixing system 100 to rotate about the swivel axis $Y_{100}$. As mentioned above, the upper frame 406 is rotationally connected to the lower frame 502 which is connected to the mixer housing 102. The lower frame 502 and the mixer housing 102 may be selectively rotated about the swivel axis $Y_{100}$ by the swivel assembly 500.

Figure 29:
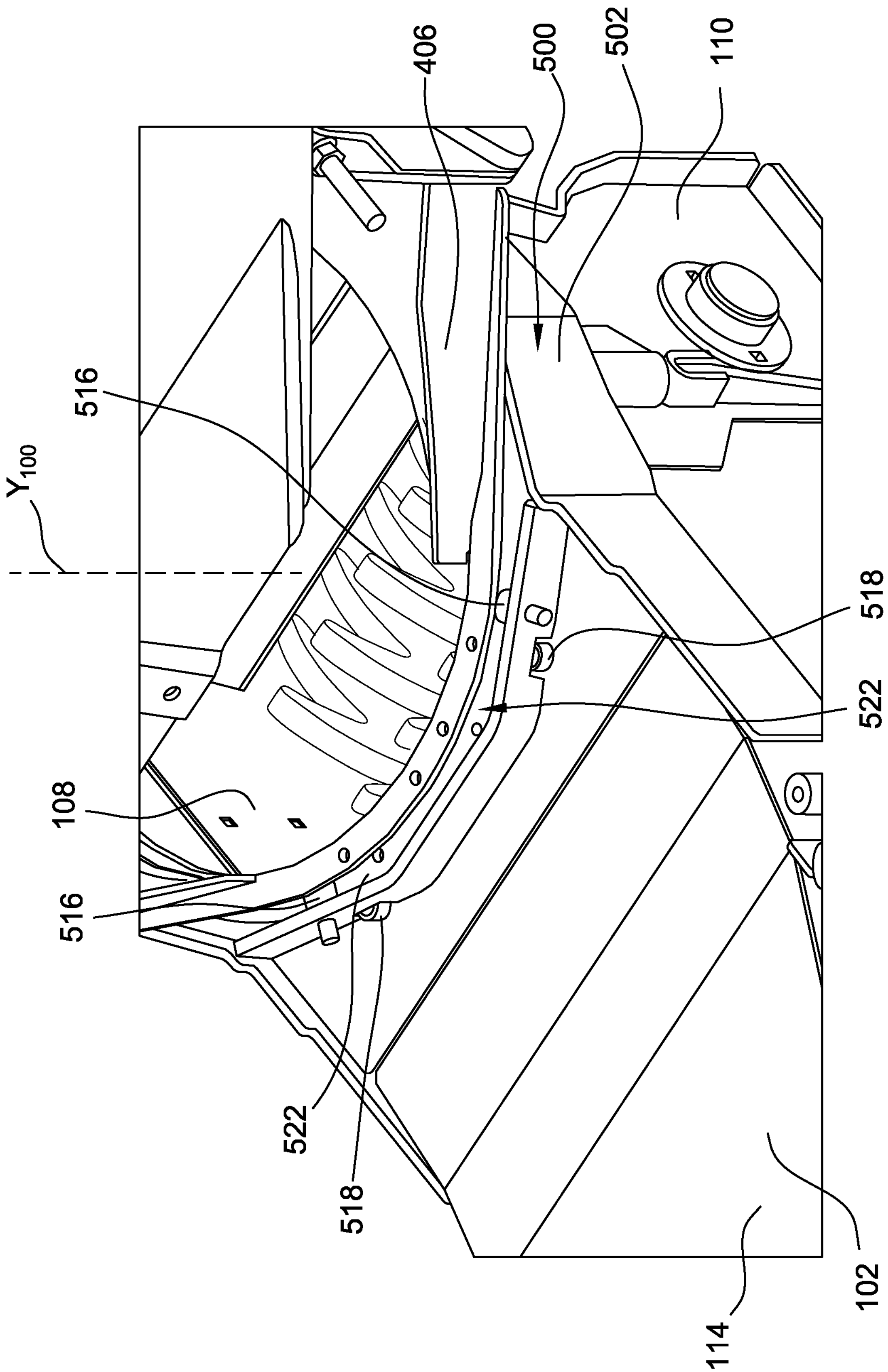
FIG. 29 is a detailed perspective view of a swivel assembly of the mixing system.
Figure 30:
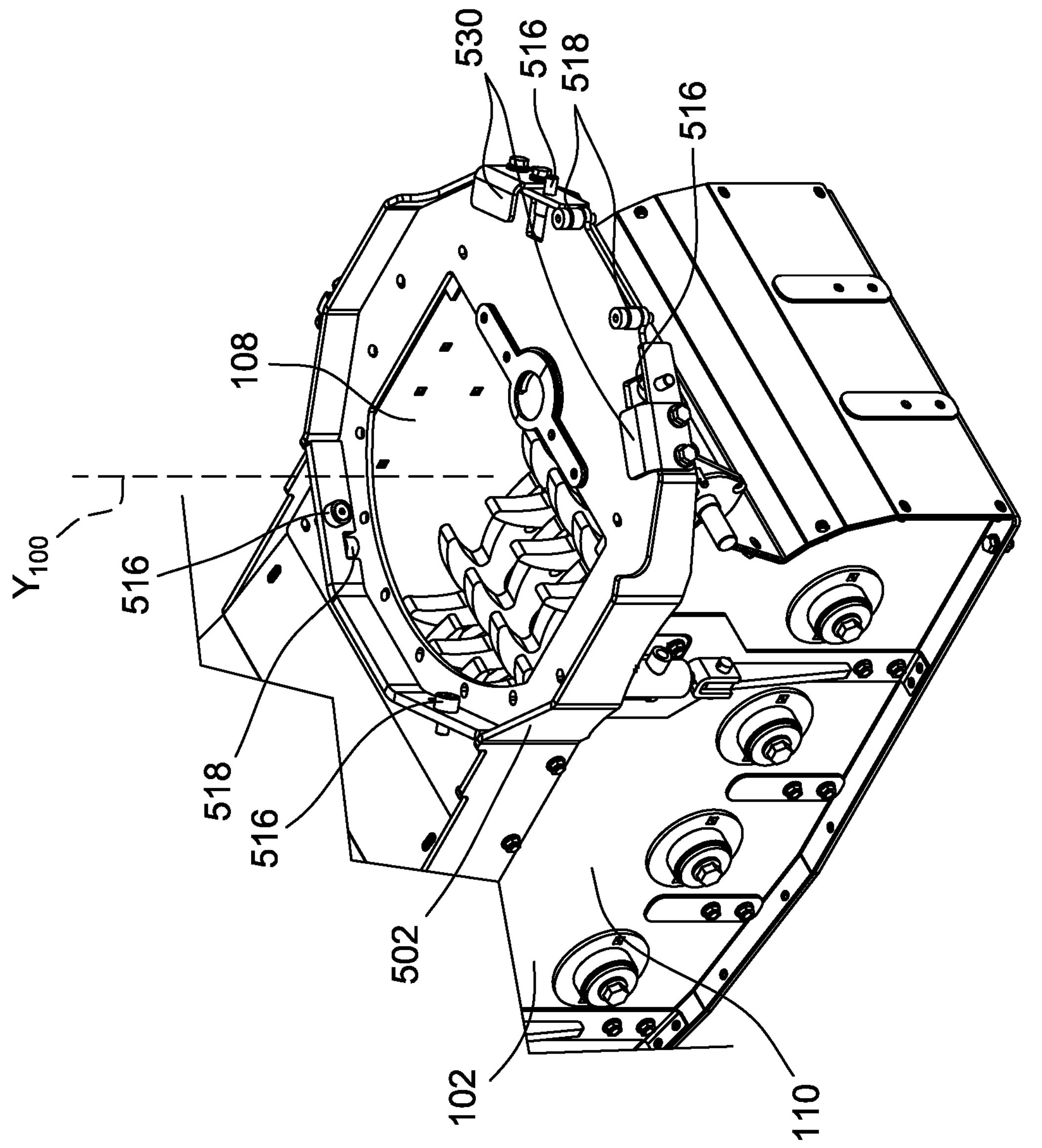
FIG. 30 is a perspective view of the swivel assembly.
Figure 31:
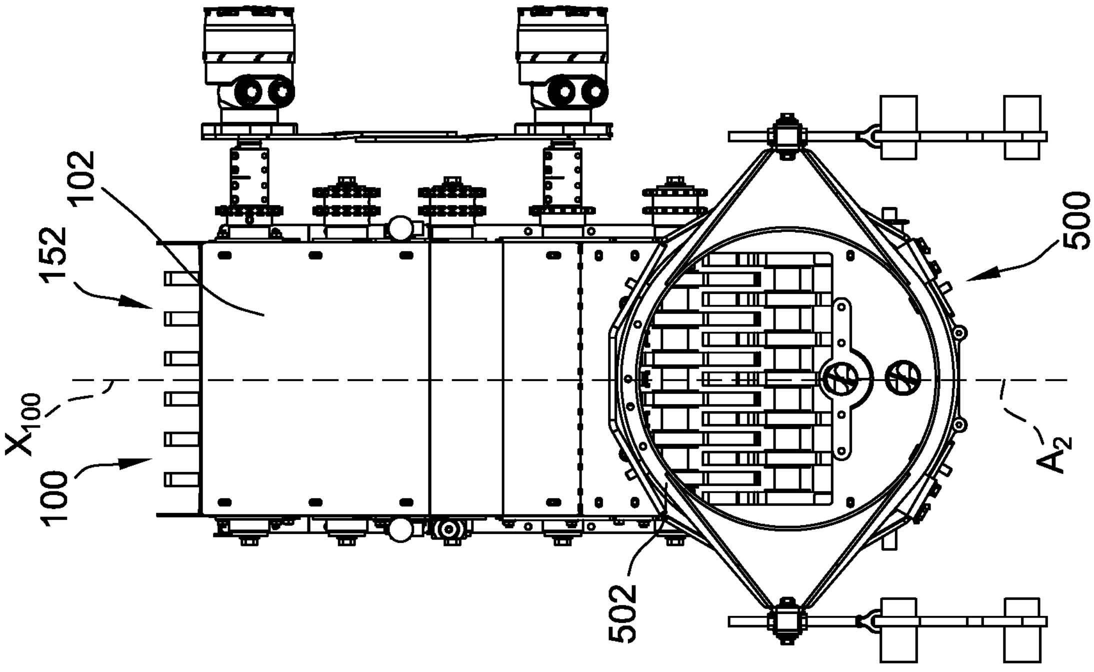
FIG. 31 is a top view of the mixing system showing the mixer housing rotated in a first position.

With reference to FIGS. 29 and 30, the lower frame 502 is connected to at least one of the first sidewall 108, the second sidewall 110, and/or the cover 114. First and second sets of bearings 516, 518 enable the lower frame 502 to move relative to the upper frame 406. The first set of bearings 516 extend within a raceway 522. Inner surfaces of upper and lower collars 524, 526 (FIG. 25) of the upper frame 406 help define the raceway 522. The first set of bearings 516 support the weight of the mixing system 100. The second set of bearings 518 contact the lower collar 526 and facilitate rotational movement of the lower frame 502 relative to the upper frame 406. The lower frame 502 includes L-brackets 530 (FIG. 30) which secure the lower frame 502 to the upper frame 406. The L-brackets 530 may be removed to facilitate assembly or disassembly of the lower frame 502 to the upper frame 406.

Figure 32:
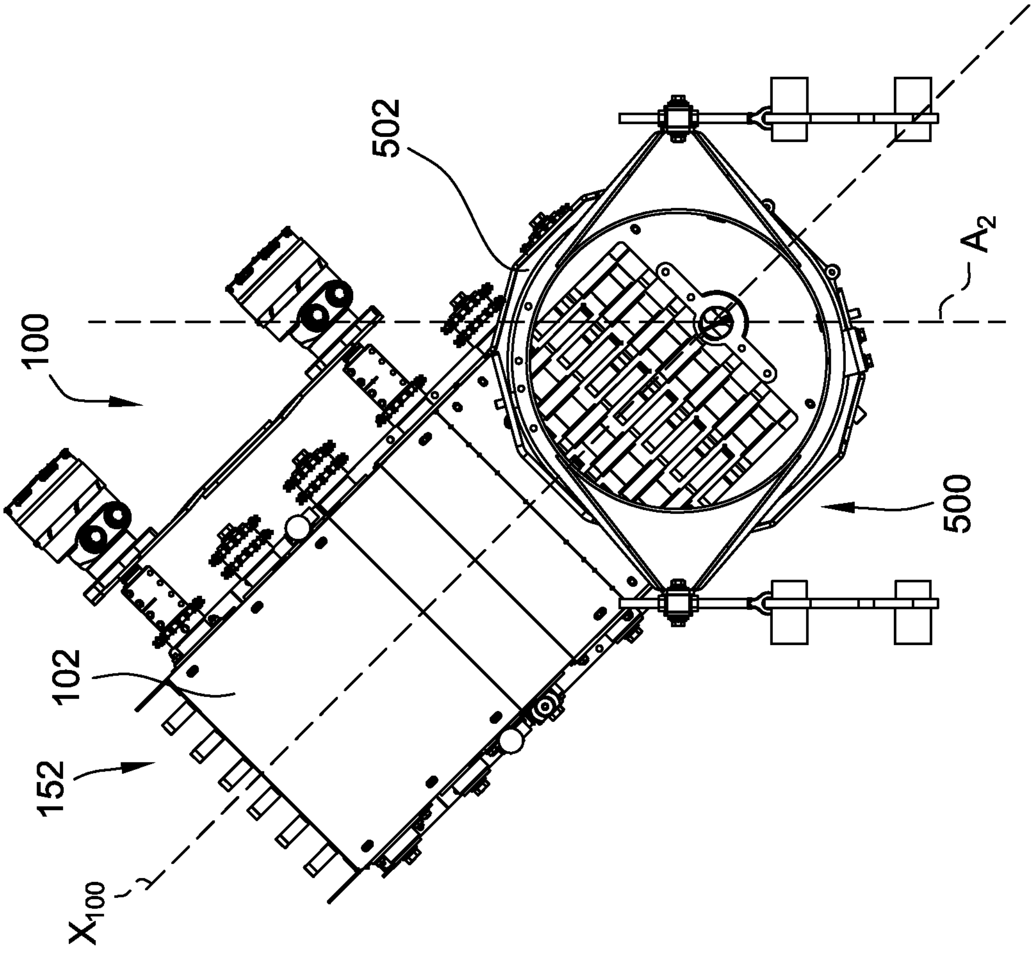
FIG. 32 is a top view of the mixing system showing the mixer housing rotated in a second position.
Figure 33:
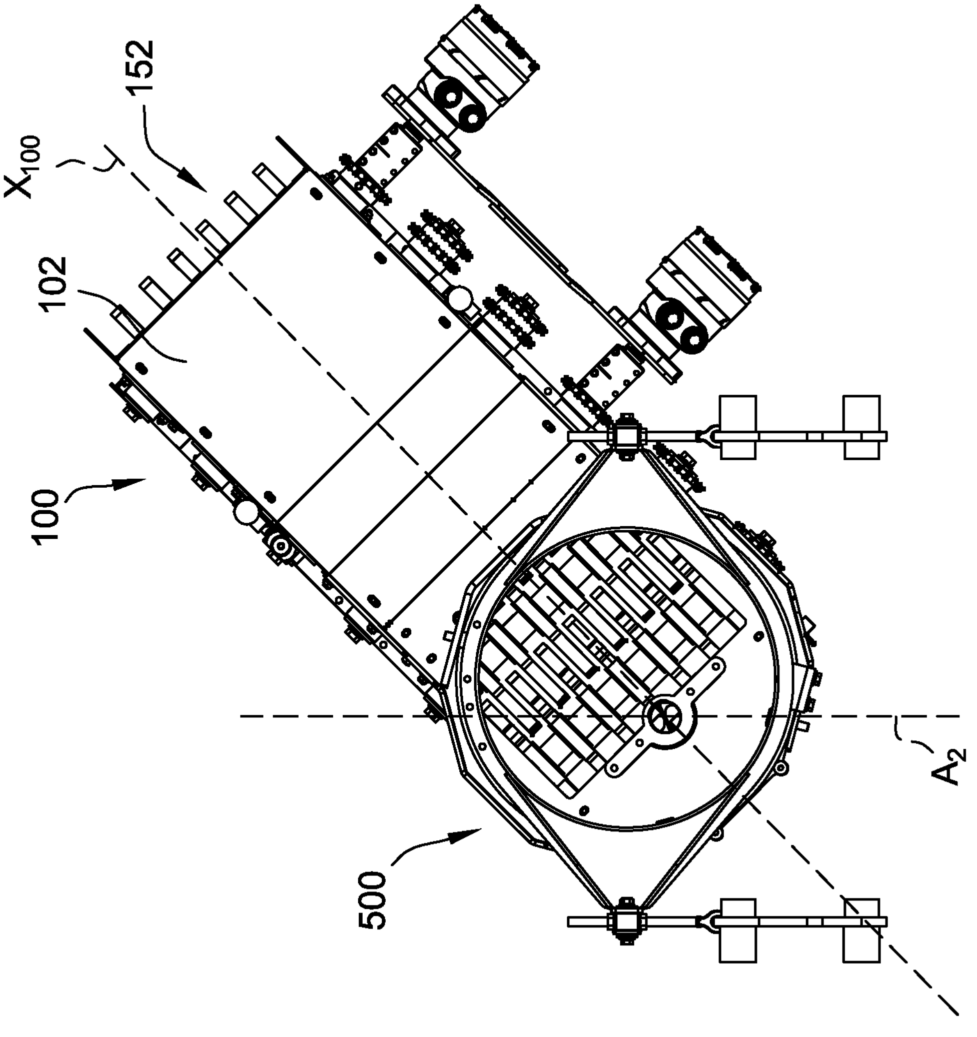
FIG. 33 is a top view of the mixing system showing the mixer housing rotated in a third position.
Figure 34:
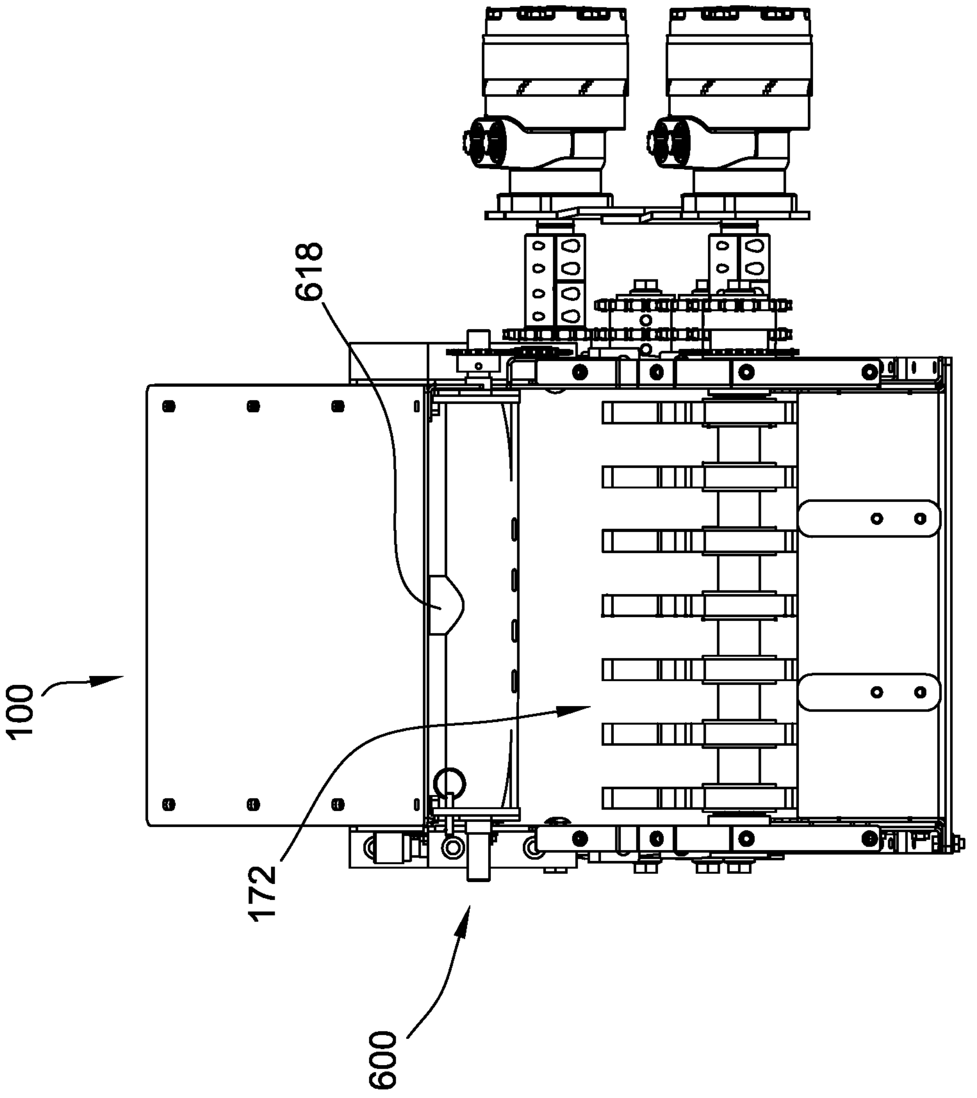
FIG. 34 is a front view of the mixing system showing a distribution assembly.
Figure 35:
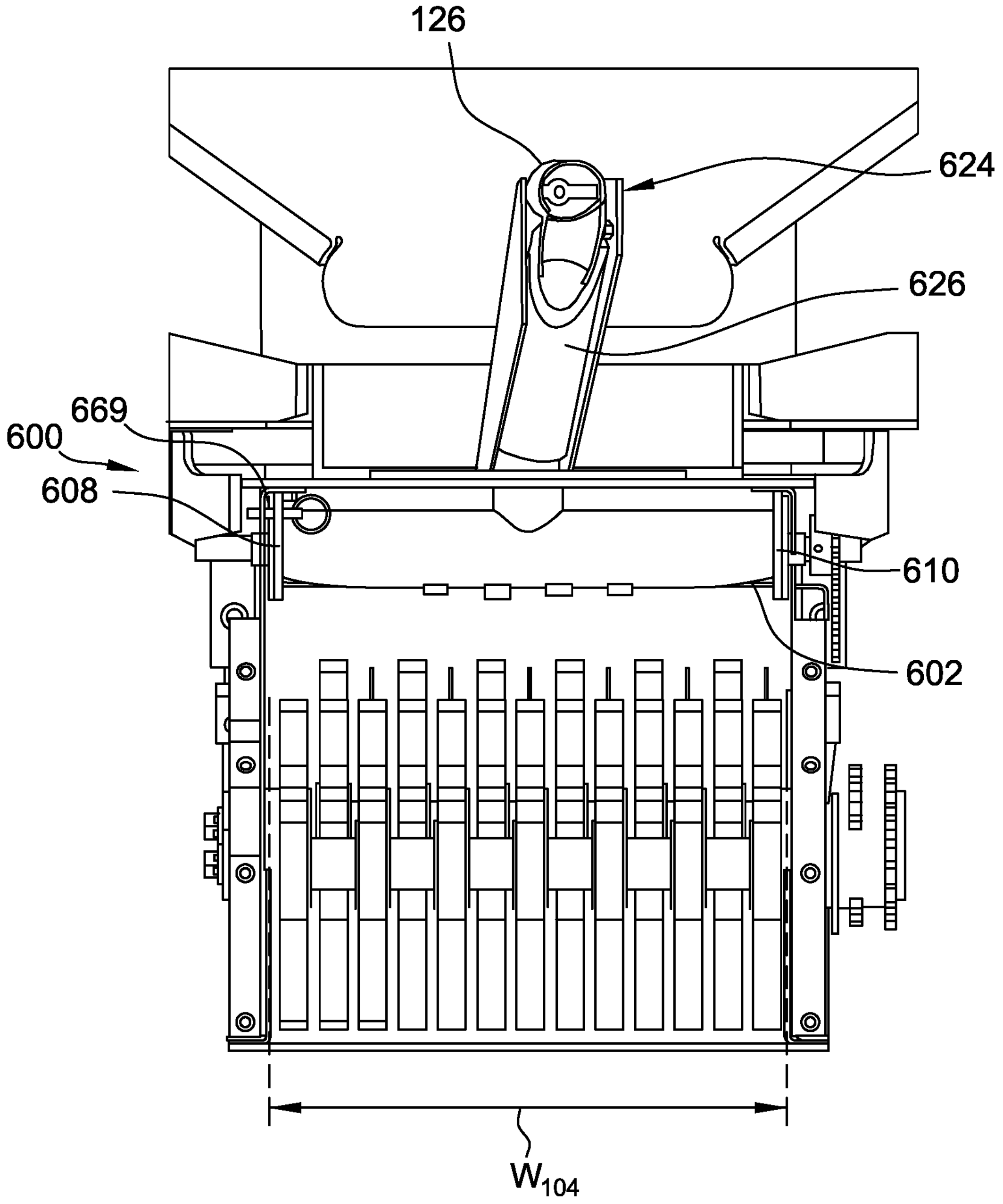
FIG. 35 is a detailed view of the mixing system showing the distribution assembly.
Figure 36:
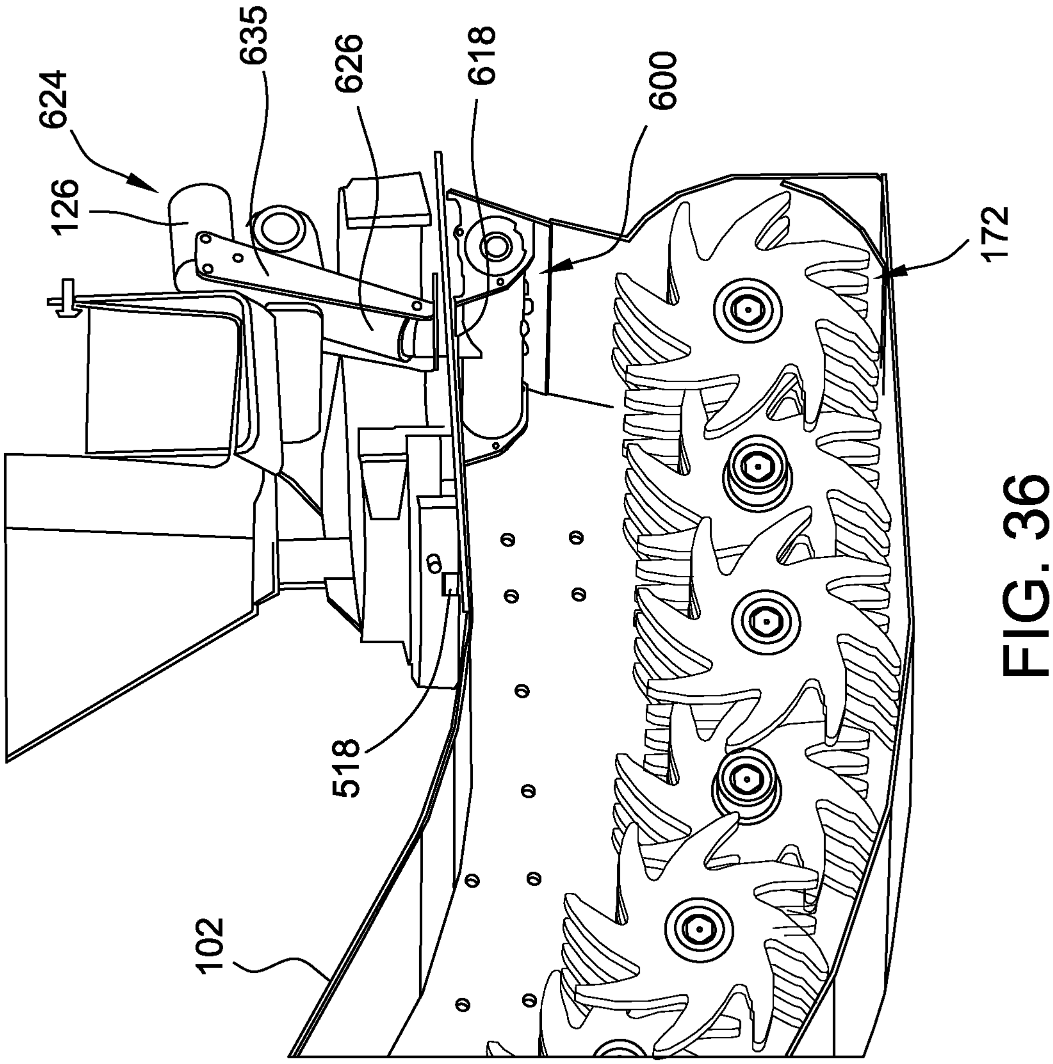
FIG. 36 is a side view of the mixing system showing the distribution assembly with a sidewall removed.

The mixer housing 102 may be rotated about the swivel axis $Y_{100}$ to selectively position the longitudinal axis $X_{100}$ of the mixing system 100 and the discharge end 152 relative to the longitudinal axis $A_2$ (FIG. 1) of the vehicle 2. The mixer housing 102 may be rotated such that the discharge end 152 is aligned with the axis $A_2$ (FIG. 31) or the mixer housing 102 may be rotated to position the discharge end 152 on either side of the axis $A_2$ (FIGS. 32 and 33).

The mixer housing 102 may be rotated manually by an operator, e.g., an operator may push on the mixer housing 102 to rotate the mixer housing 102. In some embodiments, a motor may be used to rotate the mixer housing 102. A locking mechanism (not shown) may be used to secure the rotational position of the mixing system 100 by coupling together the upper frame 406 and the lower frame 502.

Figure 9:
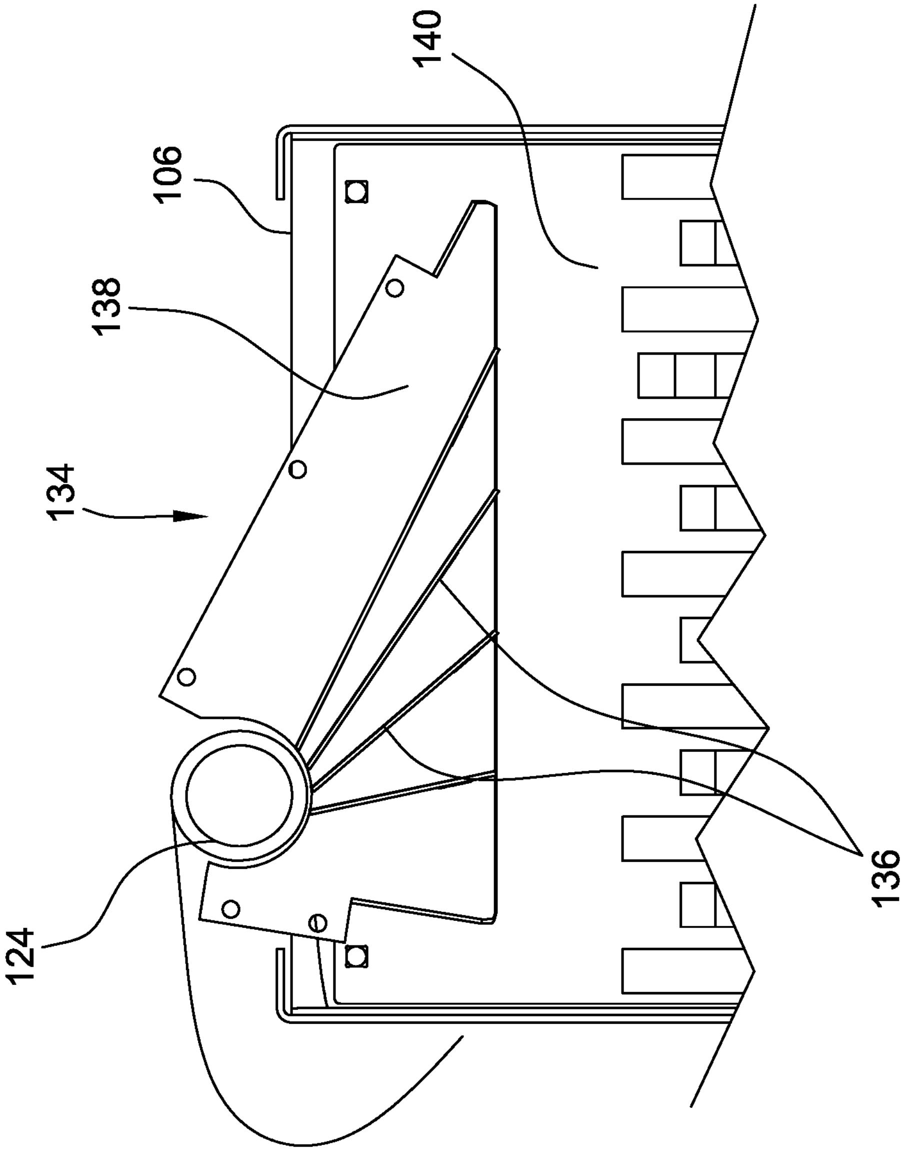
FIG. 9 is a detailed view of a vane assembly and the additive discharge of the additive feed system at which additive is added to the mixing system.
Figure 10:
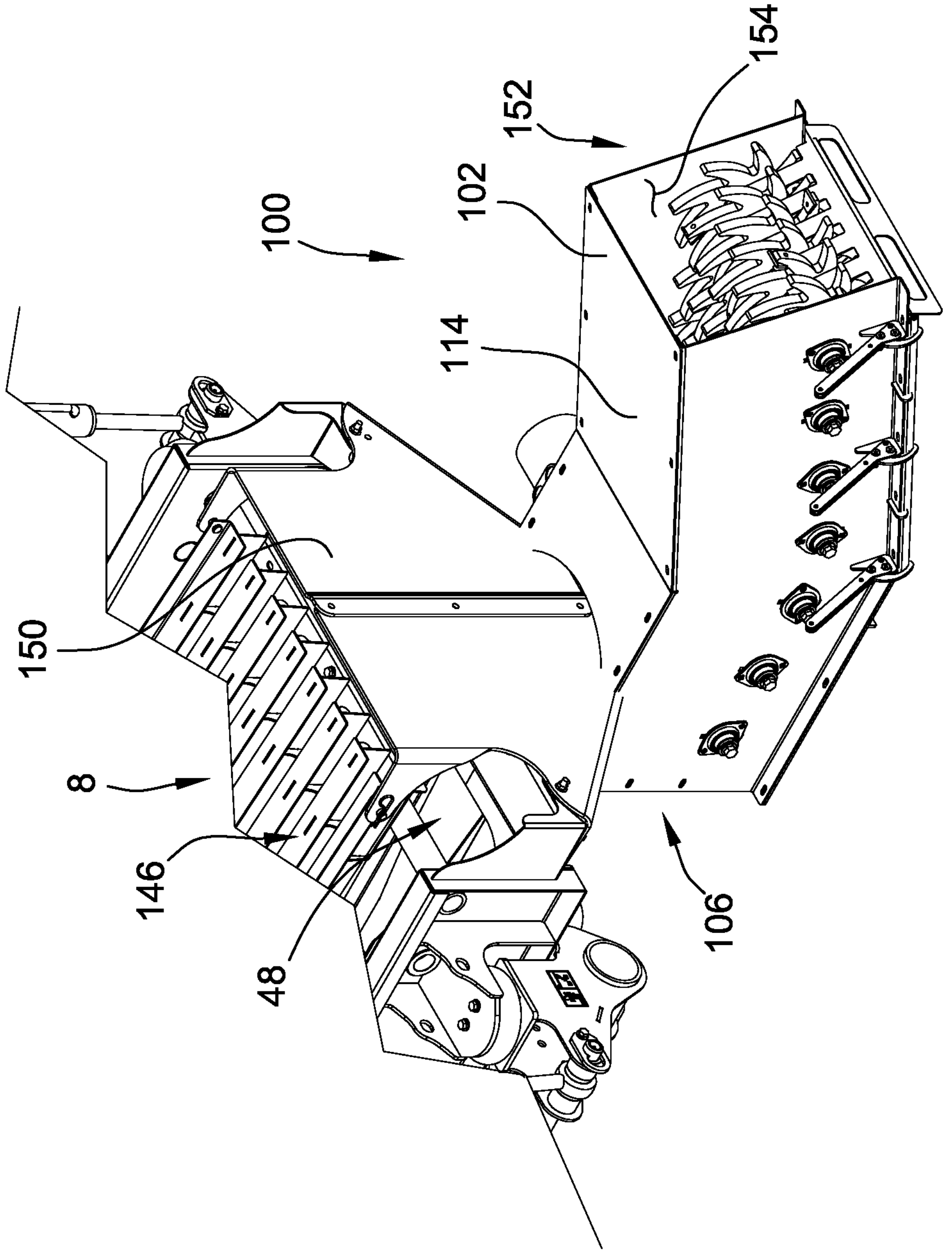
FIG. 10 is a perspective view of the mixing system and spoil material feed system for adding spoil material to the mixing system.

The mixing system 100 includes a distribution assembly 600, shown in FIGS. 34-42. The distribution assembly 600 distributes solidifying additive across the width $W_{104}$ (FIG. 35) of the mixer housing 102 to spread and/or distribute the solidification additive as it is introduced into the mixer housing 102. The distribution assembly 600 may be positioned such that solidifying additive is introduced onto the first disk assembly 156*a* (FIG. 12). The distribution assembly 600 may be used as an alternative to the vane assembly 134 (FIG. 9).

The distribution assembly 600 includes a housing 602 (FIG. 38) defining a chamber 606 therein. The housing 602 extends from a first end 608 (FIG. 37) to a second end 610. The distribution assembly 600 includes a first mounting plate 612 and a second mounting plate 614. The distribution assembly 600 includes a neck 618 having in inlet 616 for receiving solidifying additive.

Solidifying additive is delivered to the distribution assembly 600 using the tube 126 (FIG. 36) and the flexible auger 128 (FIG. 6), as described above. In some embodiments, a distal end 624 (FIG. 36) of the tube 126 may include tubing 626 (e.g., flexible tubing) which connects to the neck 618 of the distribution assembly 600. The tubing 626 may be flexible and have the ability to rotate and/or flex with the movement of the mixer system 100, such that the solidifying additive may be delivered to the distribution system 600 independent of the position of the mixing system 100. For example, the tubing 626 delivers solidification additive to the distribution assembly 600 while the mixing system 100 may be selectively rotated about the swivel axis $Y_{100}$ (FIG. 24) and/or tilted about the tilt axis $A_{400}$. The tubing 626 sits within a linkage 635 which guides the tubing 626 toward the neck 618 of the distribution assembly 600. In other embodiments, a chute is connected to the tubing 126 and the distribution assembly 600 to guide material from the tube 126 to the distribution assembly 600.

Figure 40:
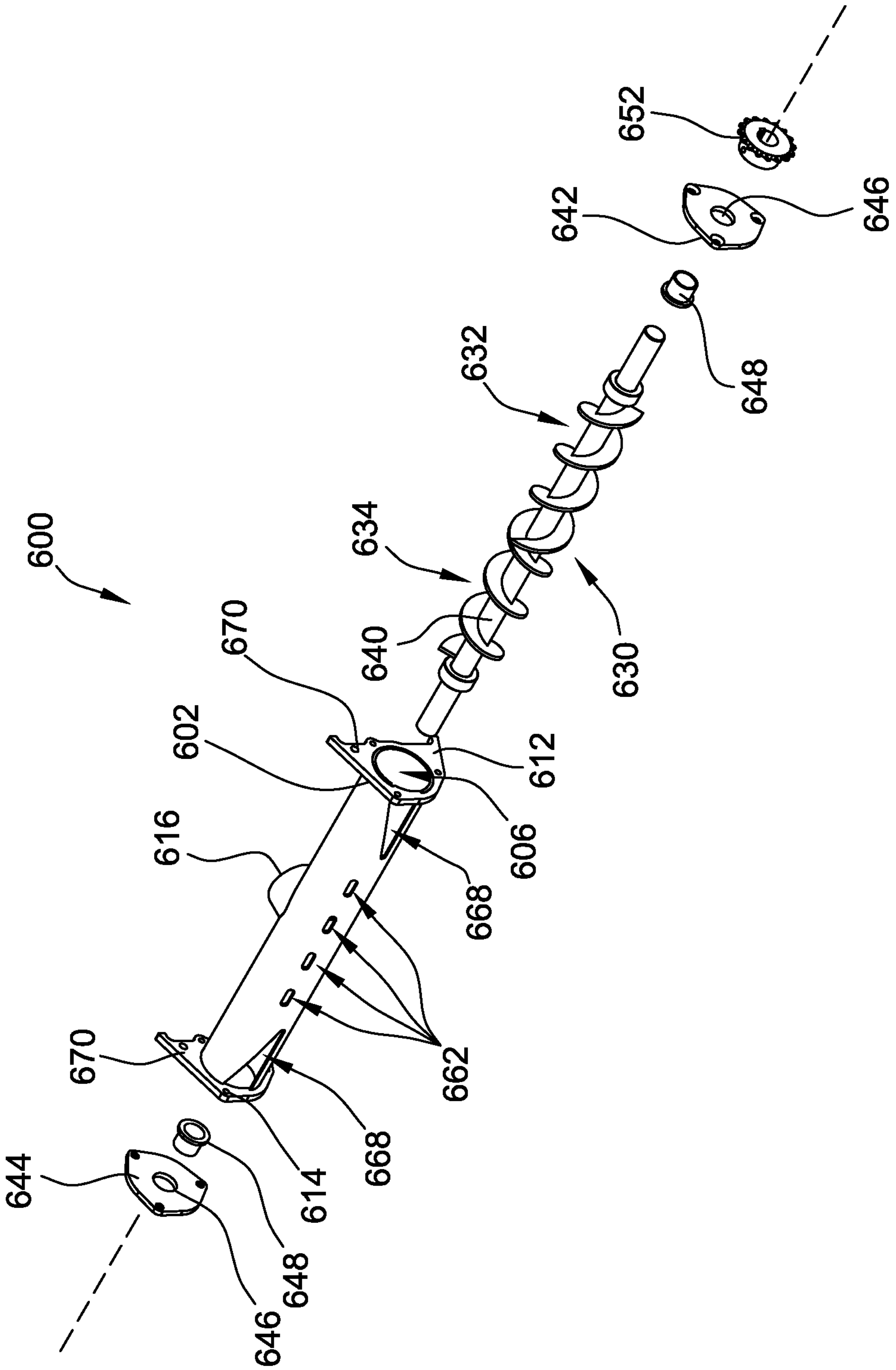
FIG. 40 is an assembly view of the distribution assembly.

With reference to FIG. 40, the distribution system 600 is generally shown as a screw auger. The system includes a screw 630 connected to a shaft 640. The screw 630 and shaft 640 rotate within the chamber 606. The screw 630 is a dual ended screw including a first screw portion 632 and a second screw portion 634. The first screw portion 632 is a first handed screw (i.e., the first screw portion has flightings in a first direction) and the second screw portion 634 is a second handed screw (i.e., the second screw portion 634 has flightings in a second direction that is opposite the first direction) such that the solidification additive moves in opposite directions. Rotations of the screw 630 convey the solidifying additive outwards, away from the inlet 616, towards the first end 608 (FIG. 35) and the second end 610.

The distribution assembly 600 includes a first end cap 642 and a second end cap 644 each including an aperture 646 formed therein. The end caps 642, 644 each support a bearing 648 disposed within the aperture 646. The aperture 646 is sized and shaped to receive the shaft 640 and the bearing 648 enables the screw 630 to rotate. The shaft 640 extends outward from the housing 602 through each aperture 646. The shaft 640 is coupled to a drive gear 652 such that the shaft 640 may be operably coupled to a drive motor using suitable mechanisms, such as drive chain and/or sprockets. The shaft 640 may be operably coupled to at least one of the disk motors 196 (FIG. 8) using a chain connected between the drive gear 652 and sprockets 204. In other embodiments, a designated hydraulic and/or electric motor (not shown) is operably coupled to the shaft 140 which drives the rotations of screw 630.

Figure 37:
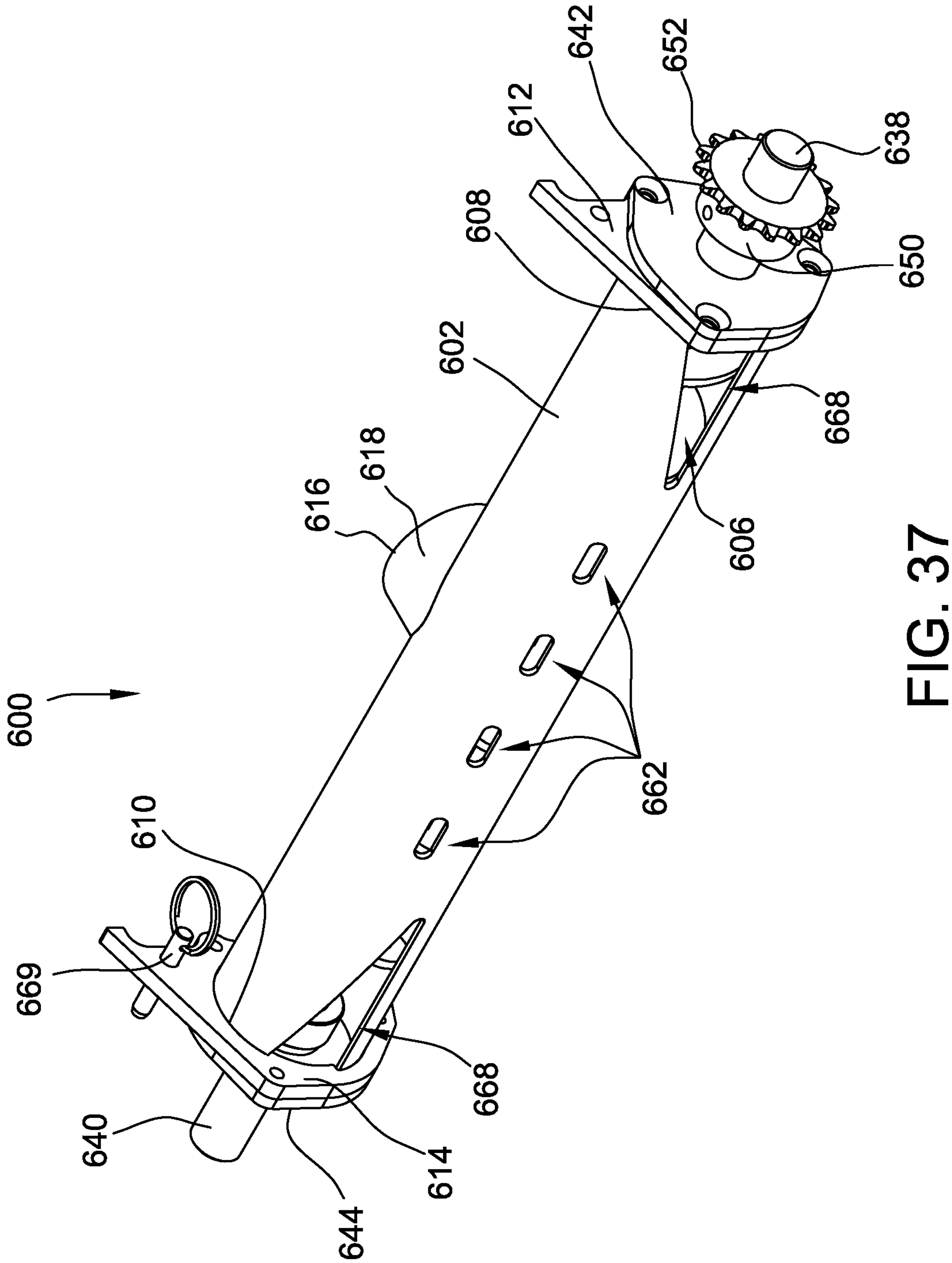
FIG. 37 is a perspective view of the distribution assembly.
Figure 38:
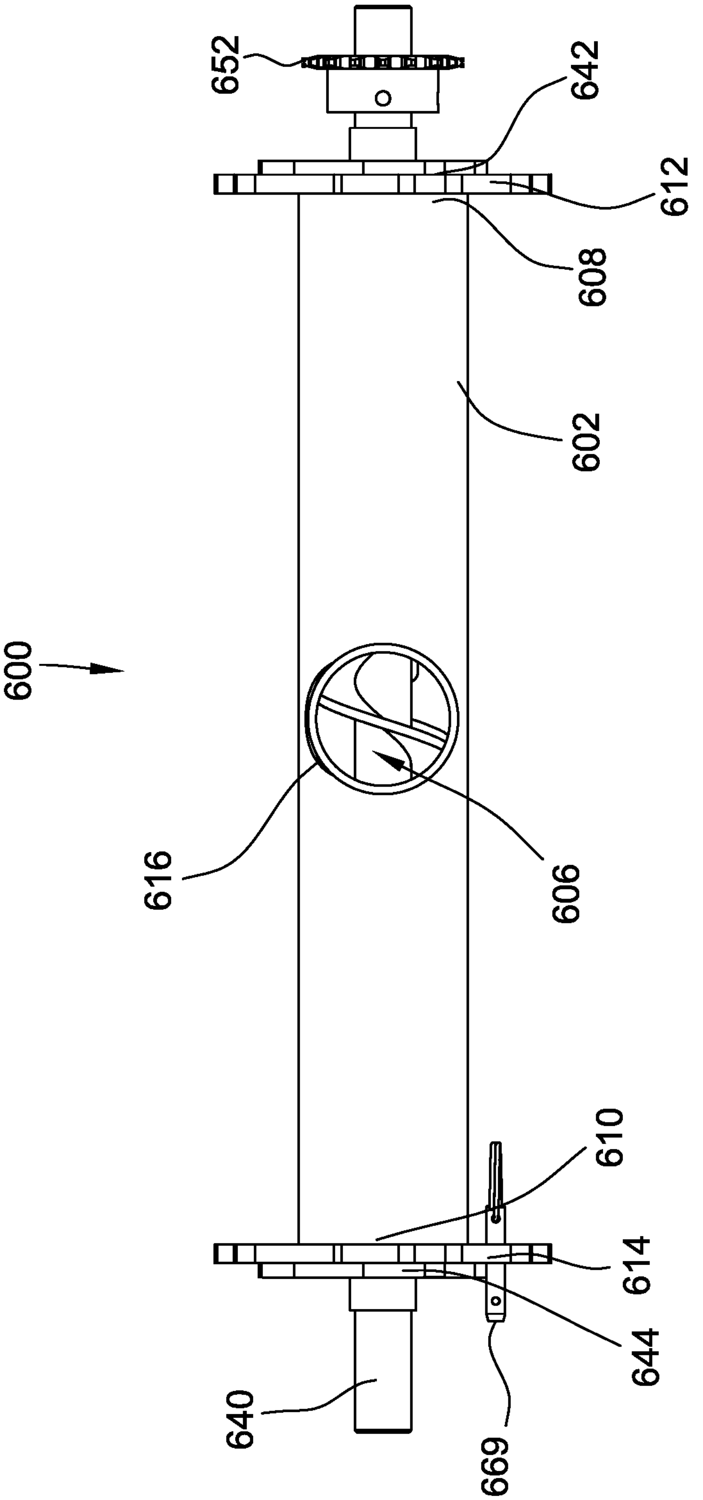
FIG. 38 is a top view of the distribution assembly.
Figure 39:
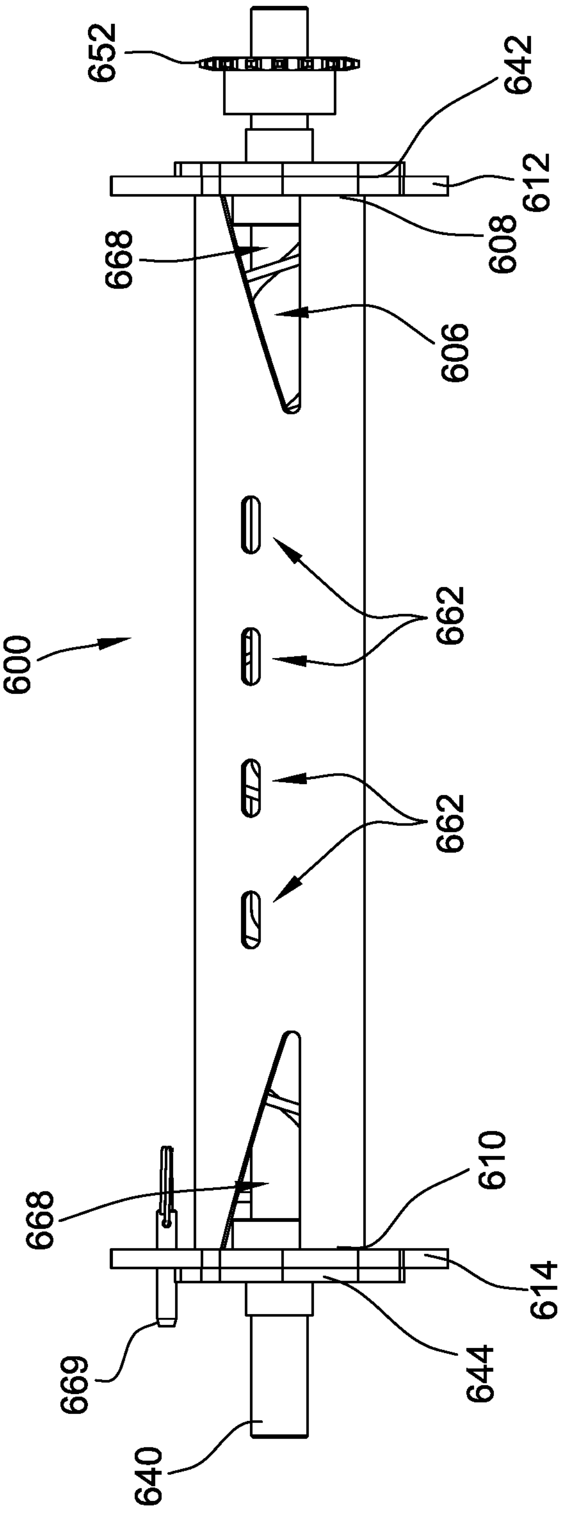
FIG. 39 is a bottom view of the distribution assembly.

Referring now to FIG. 37, the housing 602 also includes outlets 662, 668 which allows the solidifying additive within the chamber 606 to exit the chamber 606 and fall into the mixer housing 102 and onto the first disk assembly 156*a* and/or onto the lower louver 140. A first set of outlets 662 each have a generally oval shape. Alternatively, each of the outlets of the first set 662 may be generally circular in shape.

A second set of outlets 668 is disposed near the first end 608 and the second end 610 of the housing 602. The second set of outlets 668 are generally triangular in shape and allow the remainder of the solidification additive that did not pass through the outlets of the first set 662 to exit the chamber 606 and fall into the mixer housing 102. The distribution assembly 600 may include any suitable number of outlets having any suitable arrangement allowing the solidification additive to exit the chamber 606 to disperse over the width $W_{104}$ (FIG. 35) of the mixer housing 102 as the additive material is conveyed towards the first and second ends 608, 610.

Figure 41:
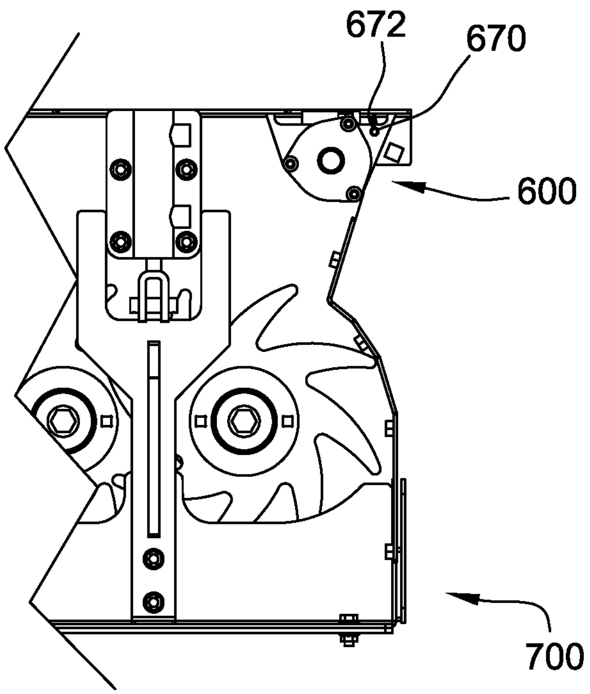
FIG. 41 is a side view of the mixer system with the distribution assembly attached to the mixer housing with a sidewall removed.
Figure 42:
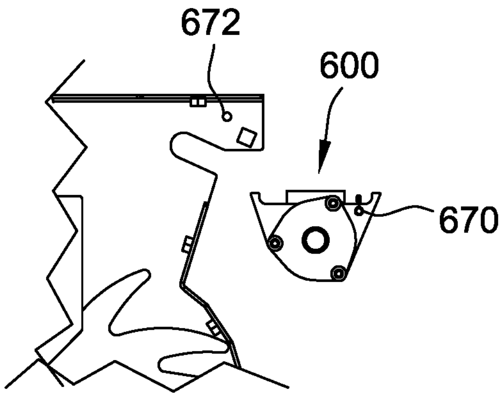
FIG. 42 is a side view of the mixer system with the distribution assembly detached from the mixer housing with a sidewall removed.
Figure 43:
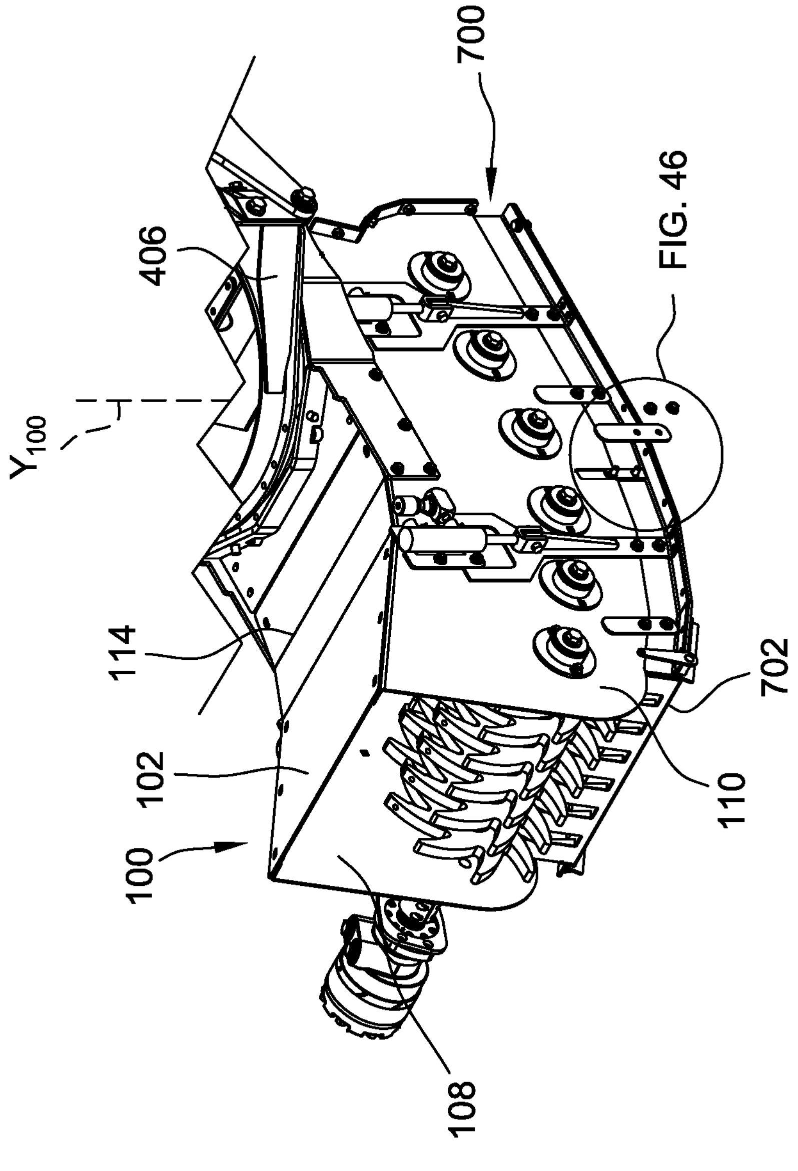
FIG. 43 is a perspective view of the mixer system showing an adjustable floor assembly.

With reference to FIGS. 41 and 42, the distribution assembly 600 is removably coupled to the mixing housing 102 such that an operator may readily detach the distribution assembly 600 for cleaning or clearing of the distribution assembly 600. The distribution assembly 600 may detach and be reattached using suitable fasteners such as clips and/or pins 669 (FIG. 37), allowing an operator to toollessly detach and/or reattach the distribution assembly 600. At least one of the first or second mounting plates 612, 614 includes a first locking aperture 670 (FIG. 40) that may be aligned with a second locking aperture 672 (FIG. 42) on the mixer housing 102. Pins 669 may be received in the first and second locking apertures 670, 672 to mount and attached the distribution assembly 600 to the mixer housing 102.

In some alternative embodiments, the distribution assembly 600 may include a screw that is a single handed screw having flightings in a single direction. The inlet 616 may be positioned at one either the first end or the second end 608, 610 and the single-handed screw conveys solidification additive introduced into the inlet 616, across the width $W_{102}$ (FIG. 35) of the mixer housing 102.

In some embodiments, the mixing system 100 includes an adjustable floor assembly 700 as shown in FIGS. 43-48. The adjustable floor assembly 700 includes a floor 702 (e.g., closed floor) which may be similar to floor 104 (FIG. 7). The adjustable floor assembly 700 enables the floor 702 of the mixer housing 102 to be selectively lowered and/or raised relative to the disk assemblies 156.

The floor 702 is connected to a first sub-floor bracket 704 (FIG. 44) and a second sub-floor bracket 706. Each of the first and second sub-floor brackets 704, 706 includes a panel 708 and a flange 710 extending perpendicularly from the panel 708. The panel 708 is parallel to the first and second sidewalls 108, 110 and is perpendicular to the floor 702. The first and second sub-floor brackets 704, 706 are arranged such that the panels 708 are within the mixer housing 102 adjacent to an internal surface 709 of each of the first and second sidewalls 108, 110.

Figure 47:
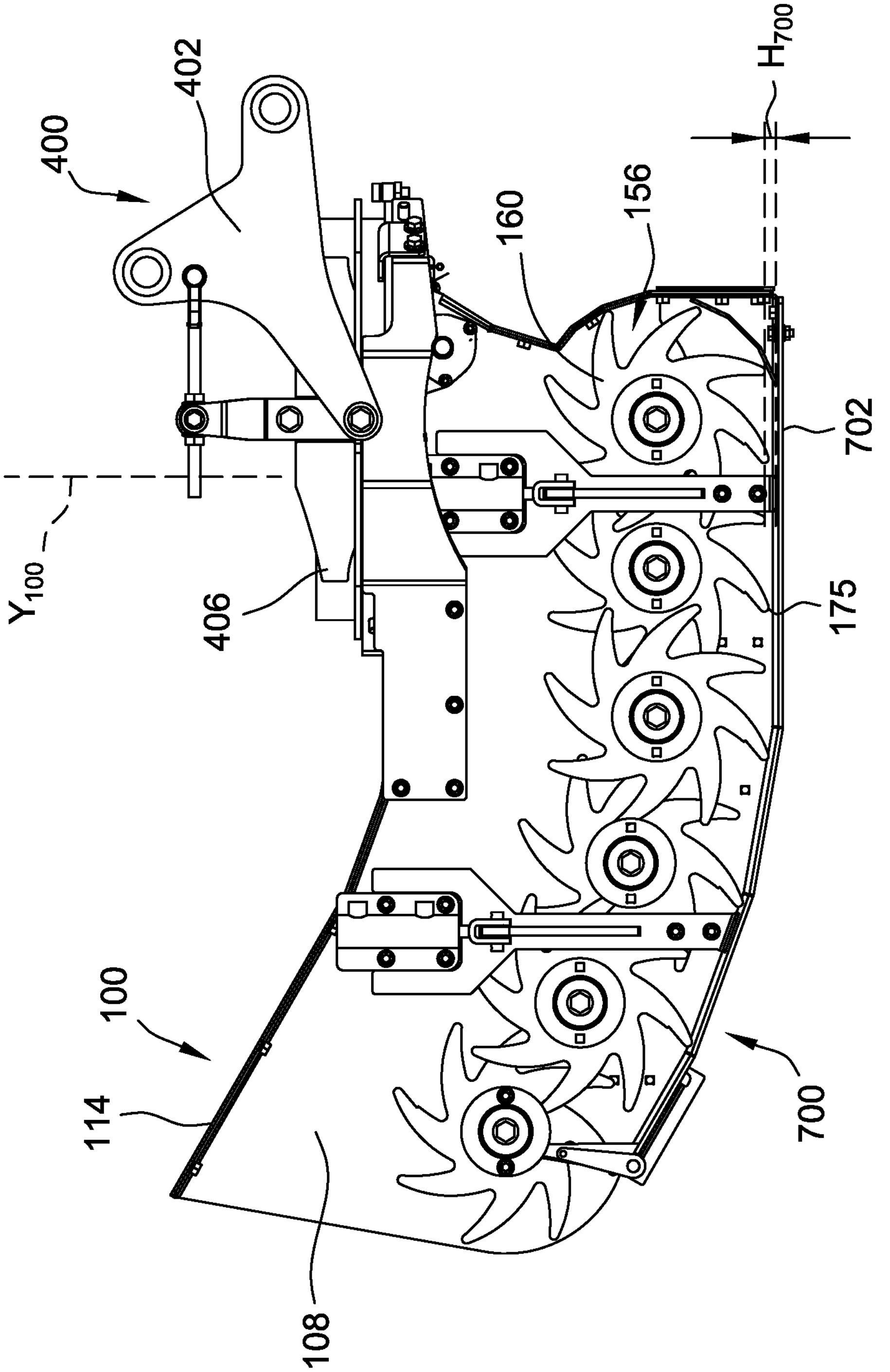
FIG. 47 is a side view of the mixer system with a sidewall removed showing the adjustable floor assembly positioned at a first location.
Figure 48:
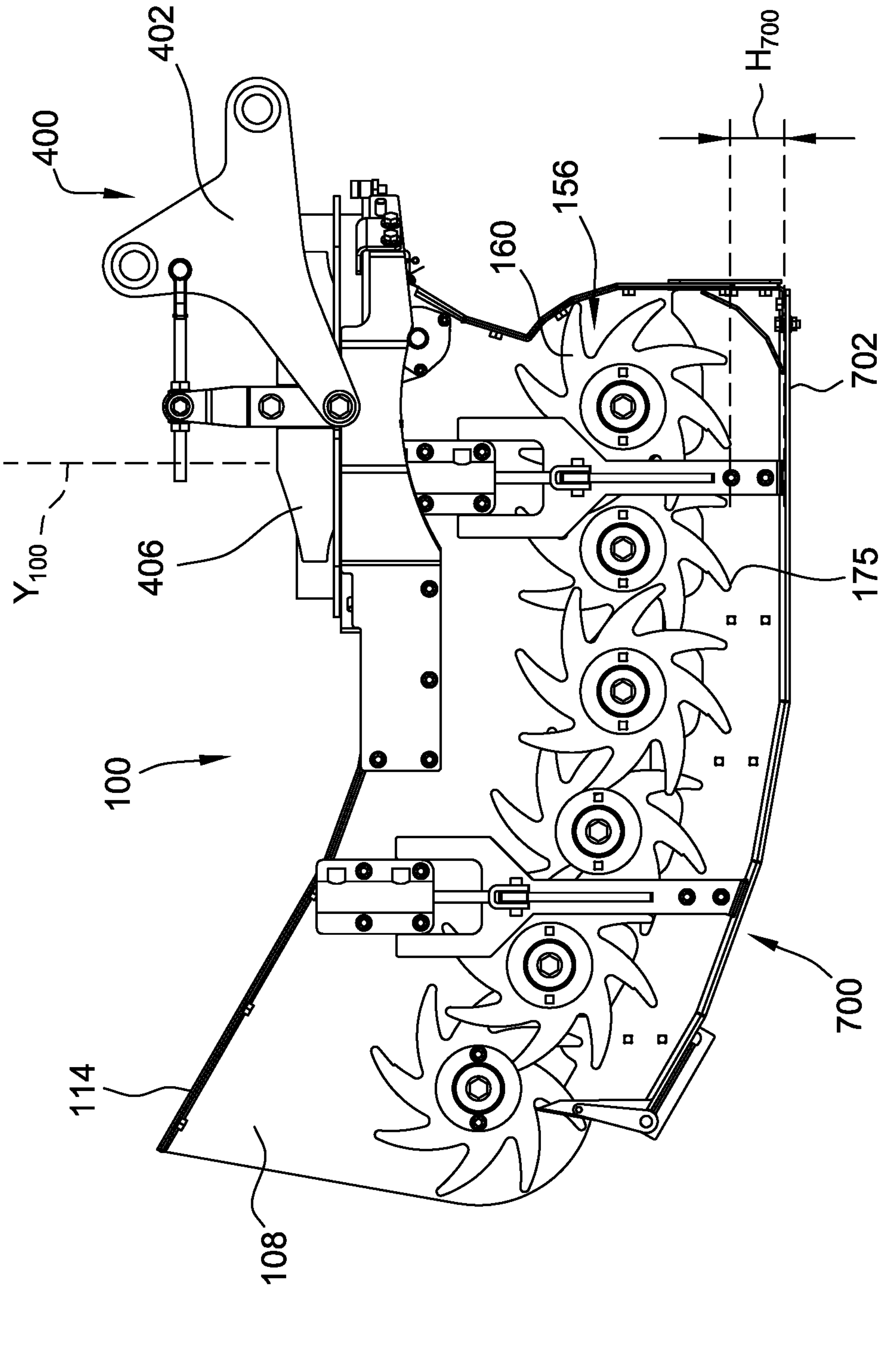
FIG. 48 is a view of the mixer system with a sidewall removed showing the adjustable floor assembly positioned at a second location.
Figure 49:
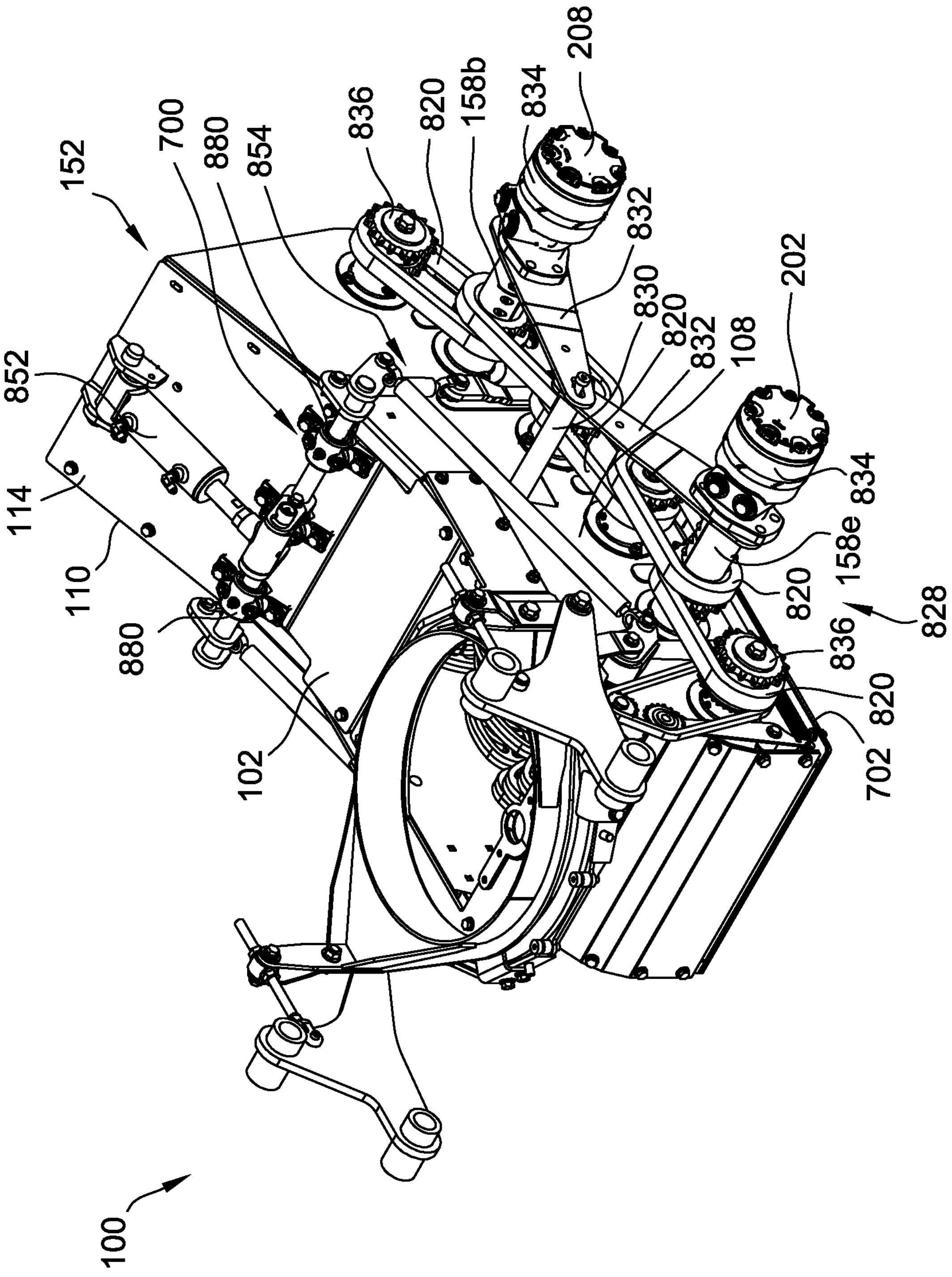
FIG. 49 is a perspective view of another embodiment of a mixing system.

One or more mounting arms 712 (FIG. 45) are coupled to each of the first and second sub-floor brackets 704, 706. The mounting arms 712 extend upward from the flange 710 such that the mounting arms 712 are generally parallel to the panel 708. The mounting arms 712 are arranged external to the mixer housing 102 adjacent to an external surface 711 of the mixer housing 102. A first end of at least one actuator 714 is coupled to the first and second sidewalls 108, 110. The mounting arm 712 includes a rib 716 which is coupled to a second end of the actuator 714. The actuator 714 transmits a force to move the floor 702 upward and downward. The actuator 714 may be used to adjust the distance between the floor 702 and the disk assembly 156 (FIGS. 47-48). The floor 702 is a distance $H_{700}$ from the distal fingertips 175 of the disks 160. This distance $H_{700}$ may be decreased (FIG. 47) such that the disks 160 contact the floor 702 or may be increased (FIG. 48) to provide more clearance between the floor 702 and the disks 160. Adjusting the vertical position of the floor 702 relative to the disk assemblies allows for changes in the mixing characteristics and/or for a cleaning or clearing operation to be performed. For example, moving the floor 702 away from the disks 160 (FIG. 48) provides a clearance between the floor 702 and the disk assembly 156 to clear out debris, such as sticks, plugs, rocks, or any other similar debris. Additionally, the disk assembly 156 may be run (rotated) in reverse to assist in a clearing operation.

As the actuator 714 drives the floor 702 downward, a lower edge 724 of the first and second sidewalls 108, 110 is displaced from the floor 702 creating a gap 726 (FIG. 45) therebetween. The panels 708 have a height that is sufficient to cover the gap 726. Additionally, the panels 708 may have a scalloped edge 728 (FIG. 44) that provides a clearance to prevent the panels 708 from interfering with the disk assemblies 156. Accordingly, the adjustable floor assembly 700 is closed, regardless of the vertical position of the floor 702, preventing spoil material from exiting the mixer housing 102. In some embodiments, a bearing surface is disposed between the housing side panels 108, 110 and the floor panels 708.

Figure 46:
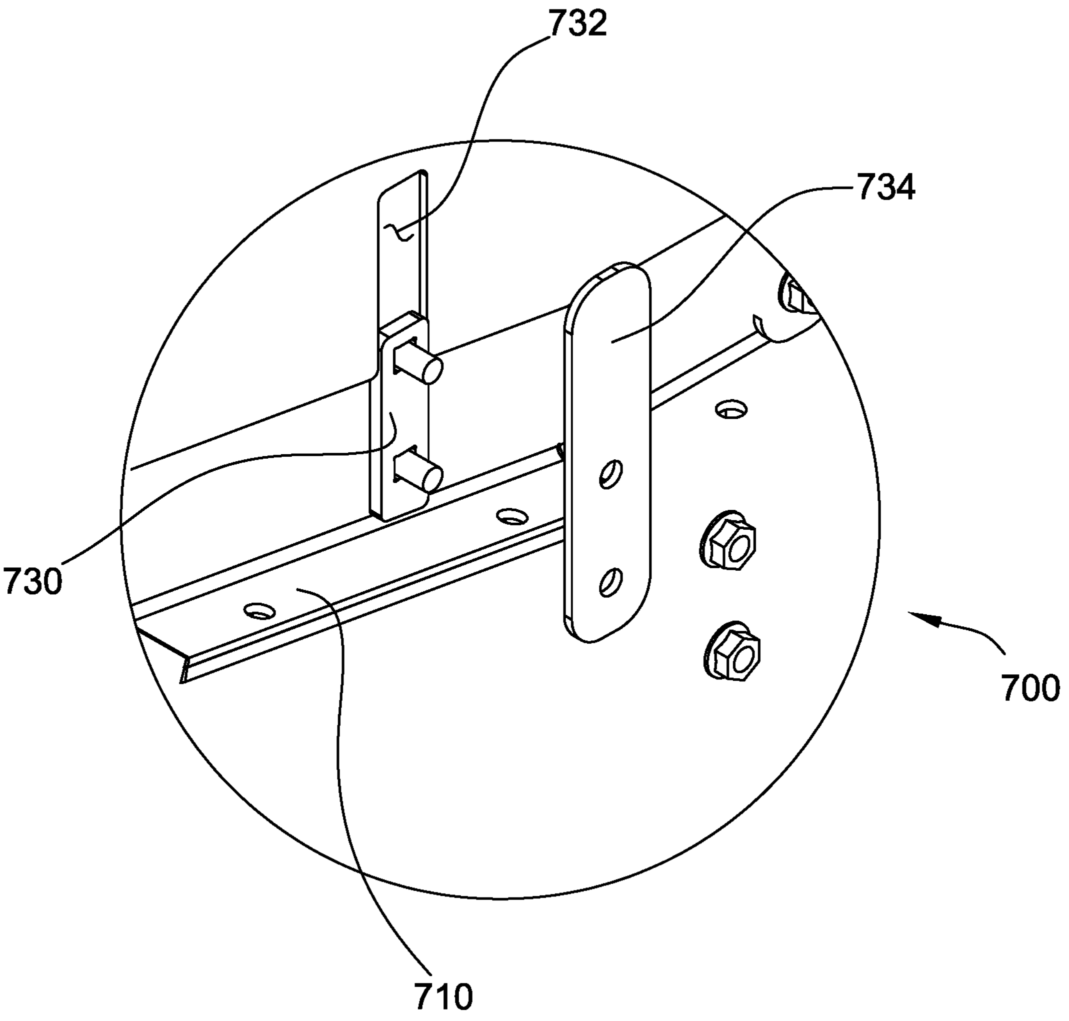
FIG. 46 is a detailed view of the of the adjustable floor assembly.

Referring now to FIG. 46, guides 730 are coupled to the first and second sub-floor brackets 704, 706 (FIG. 44) and extend outward from the panel 708. The first and second sidewalls 108, 110 include a slot 732 that is sized to receive at least a portion of the guide 730. The plurality of guides 730 and the slots 732 maintain the alignment of the floor 702 as it is caused to move vertically by the actuators 714. The guides 730 may include a cover plate 734, which may be arranged external to the mixer housing 102 and is coupled to the guide 730 using a suitable fasteners, such as bolts.

Another embodiment of the mixing system 100 is shown in FIGS. 49-55. The illustrated embodiment of the mixing system 100 may be substantially the same as the mixing system 100 described above with respect to FIGS. 24-48, except as described below.

Figure 50:
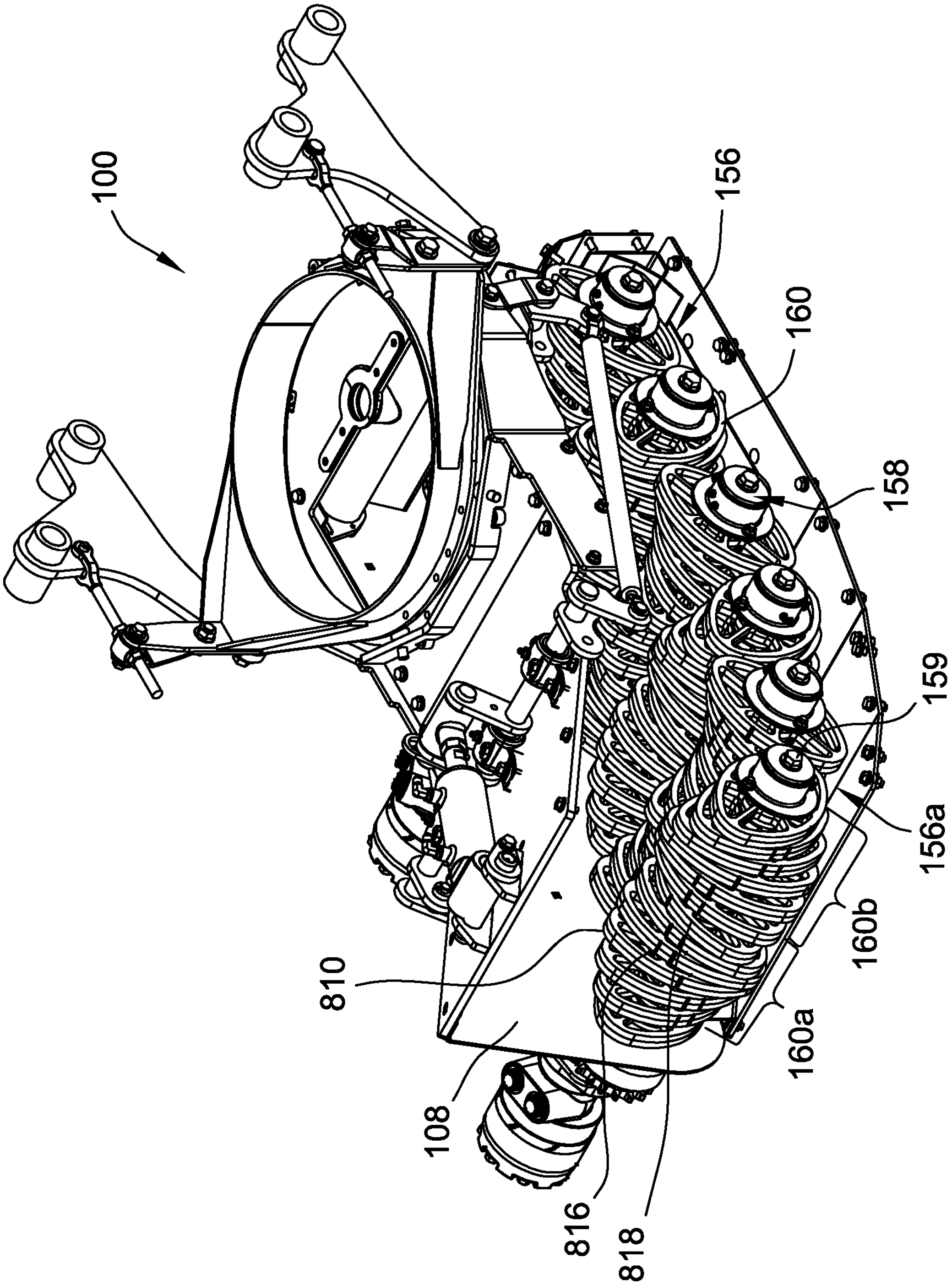
FIG. 50 is a perspective view of the mixing system with a sidewall removed.
Figure 53:
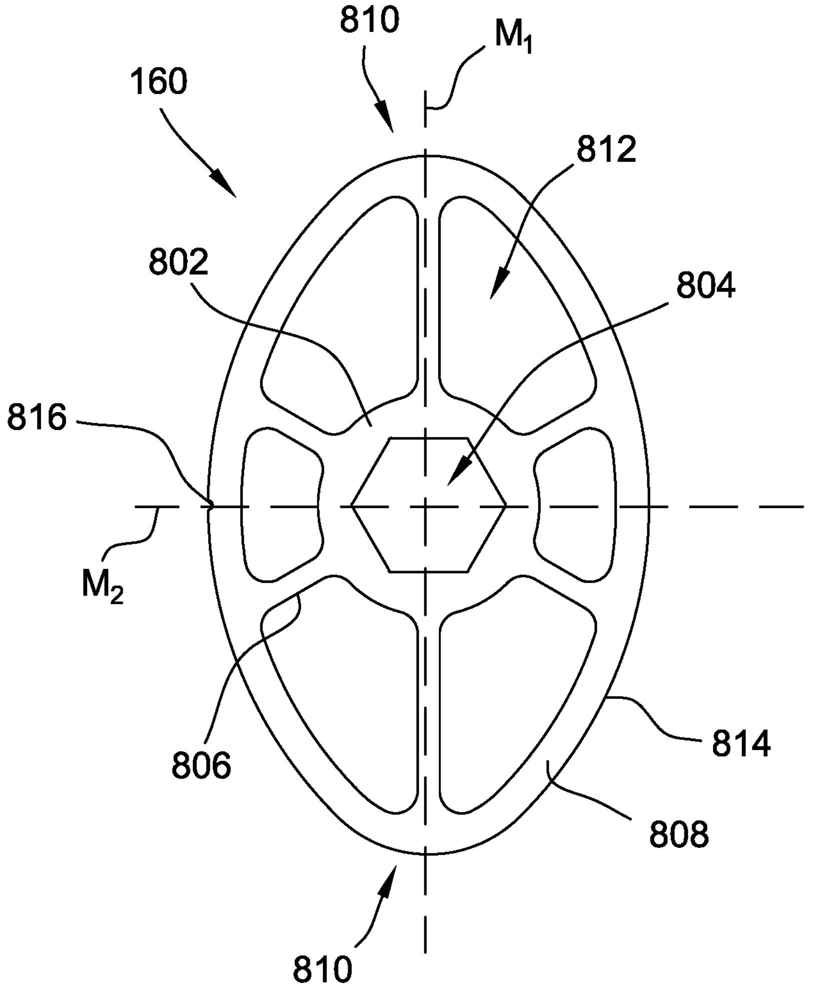
FIG. 53 is a side view of another embodiment of a disk of the mixing system.

Referring to FIG. 50, the disk assemblies 156 of the illustrated mixing system 100 each include a plurality of lobed disks 160 mounted on the rotatable shafts 158. When assembled on shaft 158, the lobed disks 160 are each positioned in contact with at least one adjacent disk 160 on the same shaft 158 to substantially close any gaps between the disks 160. In other embodiments, the lobed disks 160 may be spaced from adjacent disks 160 on the same shaft 158 such that gaps (not shown) are defined between adjacent disks 160. Referring to FIG. 53, the disk 160 in the illustrated embodiment has an oval profile defining a major axis $M_1$ and a minor axis $M_2$. The disk 160 includes a hub 802, a center bore 804 defined within the hub, spokes 806, and a rim 808. The rim 808 defines two lobes 810 of the disk 160 at opposed ends of the disk along the major axis $M_1$. The center bore 804 has a generally hexagonal shape and is sized to receive one of the rotatable shafts 158 axially (i.e., into the page in FIG. 53) therethrough. The spokes 806 radiate outward from the hub 802 to the rim 808 and define a plurality of openings 812 therebetween. The openings 812 provide an extra level of mixing for spoil material (e.g., such as clay chunks) that may become at least partially contained within the disks 160 during operation. In other embodiments, the disks 160 do not define openings 812 between the hub 802 and the rim 808.

The rim 808 of the illustrated disk 160 includes an outer surface 814. The outer surface 814 defines a timing notch 816 therein. In particular, in the illustrated embodiment the timing notch 816 is defined in the rim 808 at a position along the minor axis $M_2$ of the disk 160. The timing notch 816 facilitates orienting the disk 160 on the rotatable shaft 158 in accordance with a desired arrangement of the disk assemblies 156. For example, referring back to FIG. 50, in the illustrated embodiment, the disk assemblies 156 each include a number of disk pairs with the two disks of each pair being oriented in alignment with each other on the rotatable shaft 158.

In the illustrated embodiment, the disk pairs are oriented or "timed", on the shafts 158 to be angularly offset from an adjacent disk pair, such that the disk assemblies 156 have an arrangement defined by opposed helixes along the rotatable shaft 158. In particular, a first group of disks **160*a* of the rear disk assembly 156*a* includes disk pairs that are offset from each of the other disk pairs in the group of disks 160*a* (i.e., the lobes 810 of the disks 160*a* shift about the shaft 158 as they progress from a first end (not shown) of the rotatable shaft 158 at the first housing sidewall 108 to a central disk pair 818 in a first rotational direction such as the clockwise direction as viewed in FIG. 50). A second group of disks 160*b* on the rear disk assembly 156*a* includes disk pairs that are offset from adjacent disk pairs such that the lobes 810 shift in a second, opposite, rotational direction (i.e., the counter-clockwise direction in FIG. 50) as the pairs progress from the central disk pair 818 to the second end 159 of the rotatable shaft 158 at the second housing sidewall 110. A similar timing of the disks 160 on the disk assemblies 156 is also shown with respect to the embodiment illustrated in FIG. 59, as described in greater detail below. In other embodiments, more than two disks 160 may be aligned (3, 4, 5 or more aligned in a group). In yet other embodiments, each disk 160 is not aligned with an adjacent disk 160 but is angularly offset from adjacent disks 160**.

Figure 52:
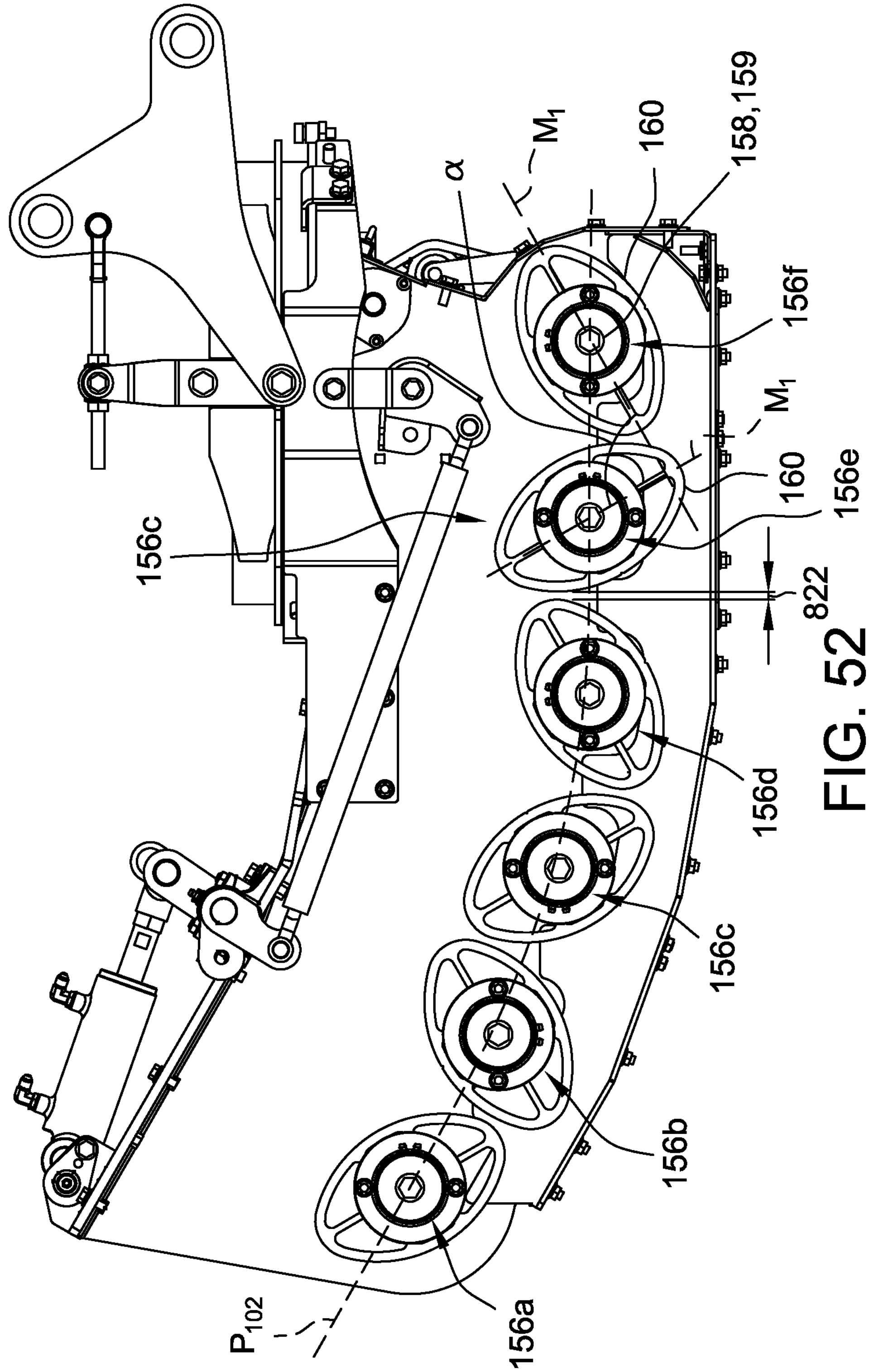
FIG. 52 is a side view of the mixing system with a sidewall removed.

Referring now to FIG. 52, in the illustrated embodiment six disk assemblies **156*a*-156*f* are shown with each disk assembly 156 including an end disk 160 positioned at the second ends 159 of the rotatable shafts 158. The illustrated end disks 160 are each positionally aligned along the flow path $P_{102}$. The remaining disks 160 shown in FIG. 50 are removed for clarity in FIG. 52, though it should be understood that the positional relationship described with respect to the illustrated end disks 160 of adjacent disk assemblies 156 in FIG. 52 is the same for the remaining disks 160 of the disk assemblies 156**.

Figure 51:
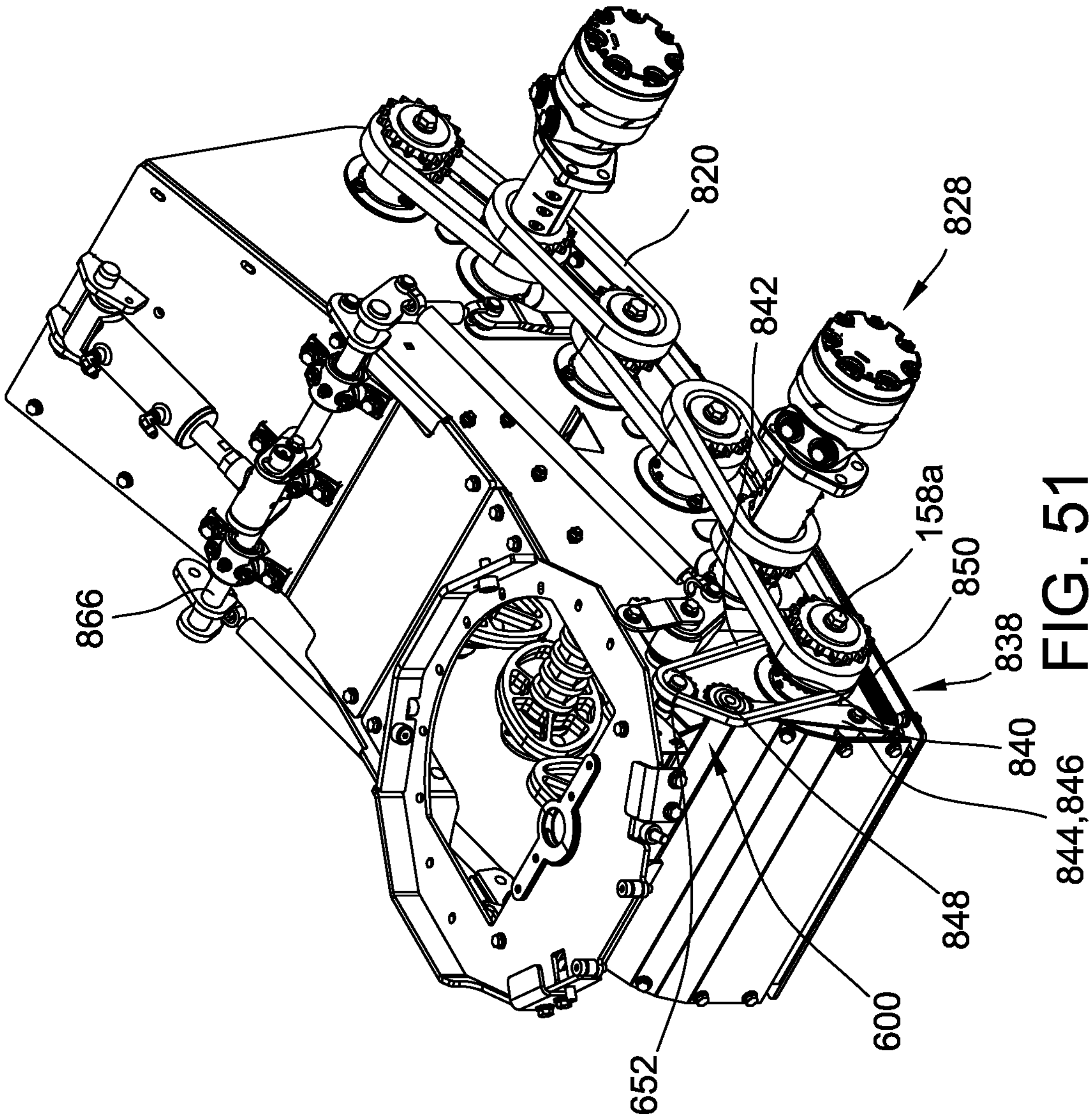
FIG. 51 is another perspective view of the mixing system with torque arms and tilt assembly removed.

In the illustrated embodiment, the end disks 160 are offset by an angle $\alpha$ from the positionally aligned end disks 160 of adjacent disk assemblies 156. To illustrate, the first end disk 160 of the fifth disk assembly **156*e* and the first end disk 160 of the sixth disk assembly 156*f* are oriented on their corresponding rotatable shaft 158 such that the angle $\alpha$ (defined by the intersection of the major axes $M_1$ of the end disks 160) is approximately 90 degrees. Additionally, as shown in FIG. 51 and described in greater detail below, in the illustrated embodiment, the rotatable shafts 158 are each connected to one another by a plurality of drive chains 820 that synchronize the rotational speed of each of the rotatable shafts 158. The illustrated orientation or "timing" of the end disks 160 relative to the adjacent end disks 160 prevents material from being pinched between the disk assemblies 156 by maintaining the same size of the gaps 822 (FIG. 52**)

defined between the positionally aligned disks 160 as the disk assemblies 156 are rotated.

FIGS. 56-60 illustrate another embodiment of a mixing system 100. The mixing system 100 of FIGS. 56-60 is substantially the same as the mixing system 100 of FIGS. 49-55 except that, in the illustrated embodiment, the mixing system 100 includes alternative disk assemblies 156 having trilobed disks 160 and a plurality of floor inserts 824 attached to the floor 702.

Figure 58:
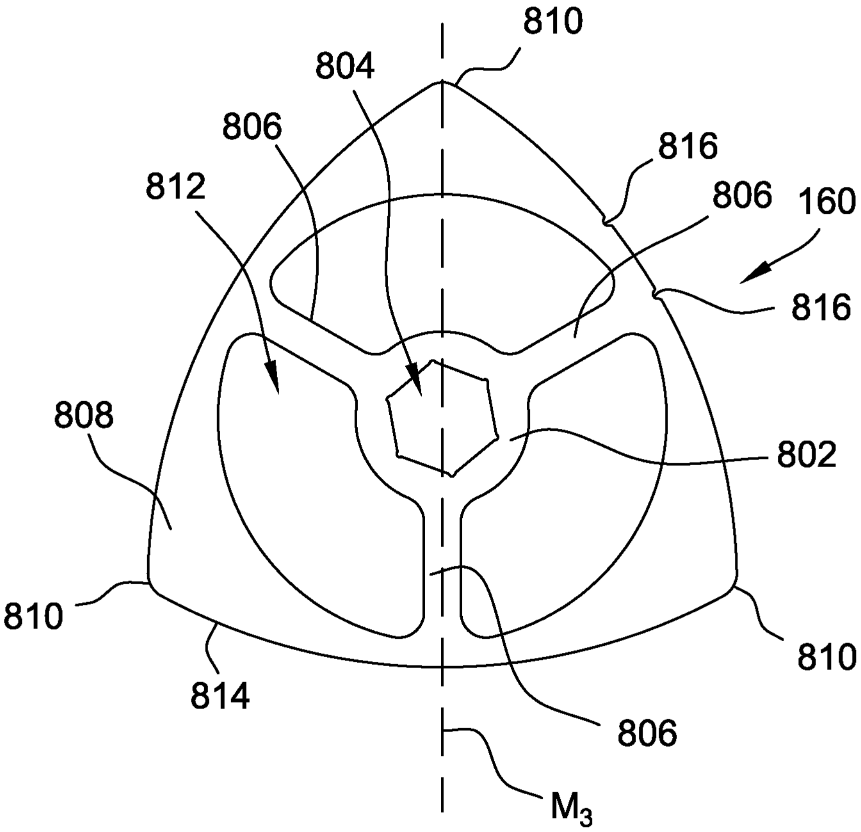
FIG. 58 is a side view of another embodiment of a disk of the mixing system.
Figure 59:
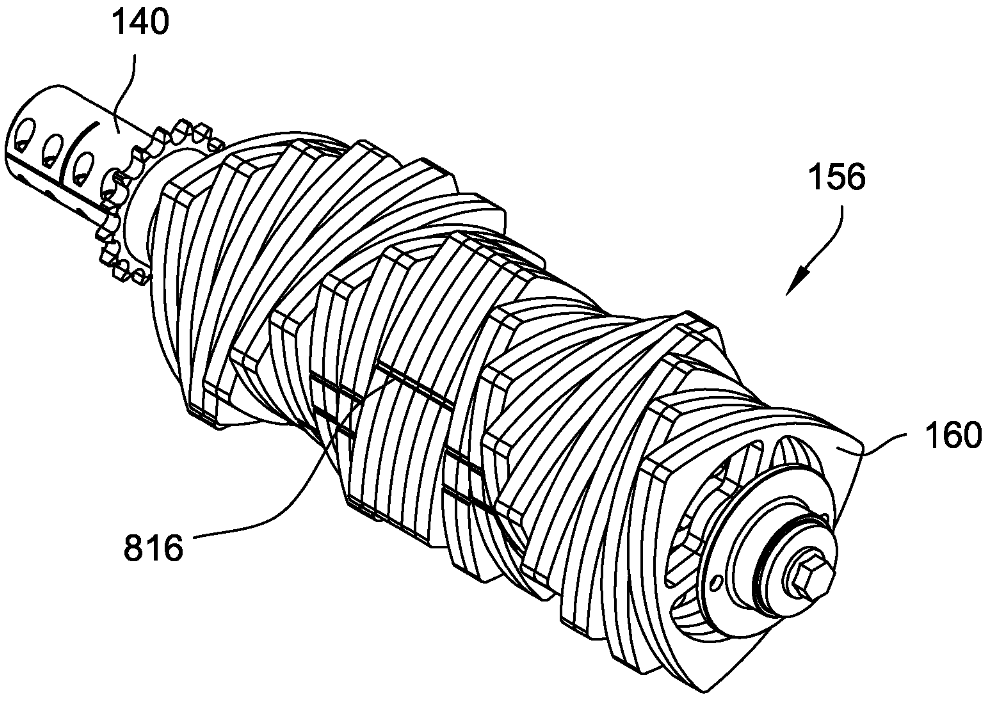
FIG. 59 is a perspective view of another embodiment of a disk assembly.
Figure 60:
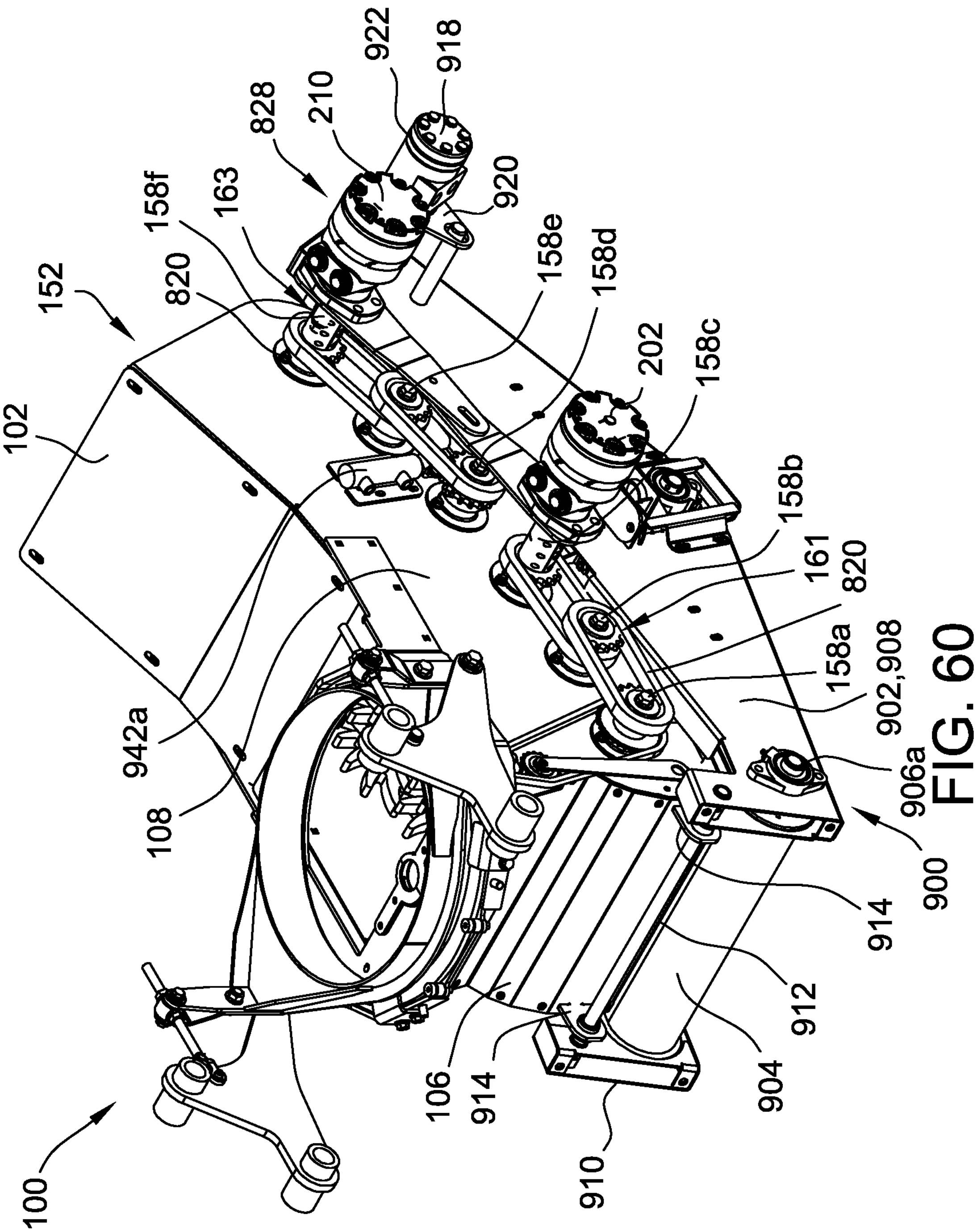
FIG. 60 is a perspective view of another embodiment of a mixing system.

Referring to FIG. 58, in the illustrated embodiment the trilobed disks 160 are shaped to have a Reuleaux triangle profile having three lobes 810. A longitudinal axis $M_3$ of the trilobed disk 160 is defined extending through one of the lobes 810 and an opposed point directly between the other two lobes 810. The trilobed disks include a hub 802 defining a central bore 804 and a plurality of spokes 806 radiating out from the hub 802 to the rim 808. The spokes 806, rim 808, and hub 802, collectively define a plurality of openings 812 extending through the disks 160 though, as described above with respect to the bilobed disks 160, in other embodiments the disks 160 do not include the openings 812. Timing notches 816 are defined in an outer surface 814 of the trilobed disks 160. As shown in FIG. 59, in the illustrated embodiment, the trilobed disks 160 are positioned in direct contact on the disk assembly shaft 140 and are angularly offset in pairs. The trilobed disks 160 are oriented on the shaft 140, or "timed", to define an opposed helix shape of the disk assembly 156.

Figure 57:
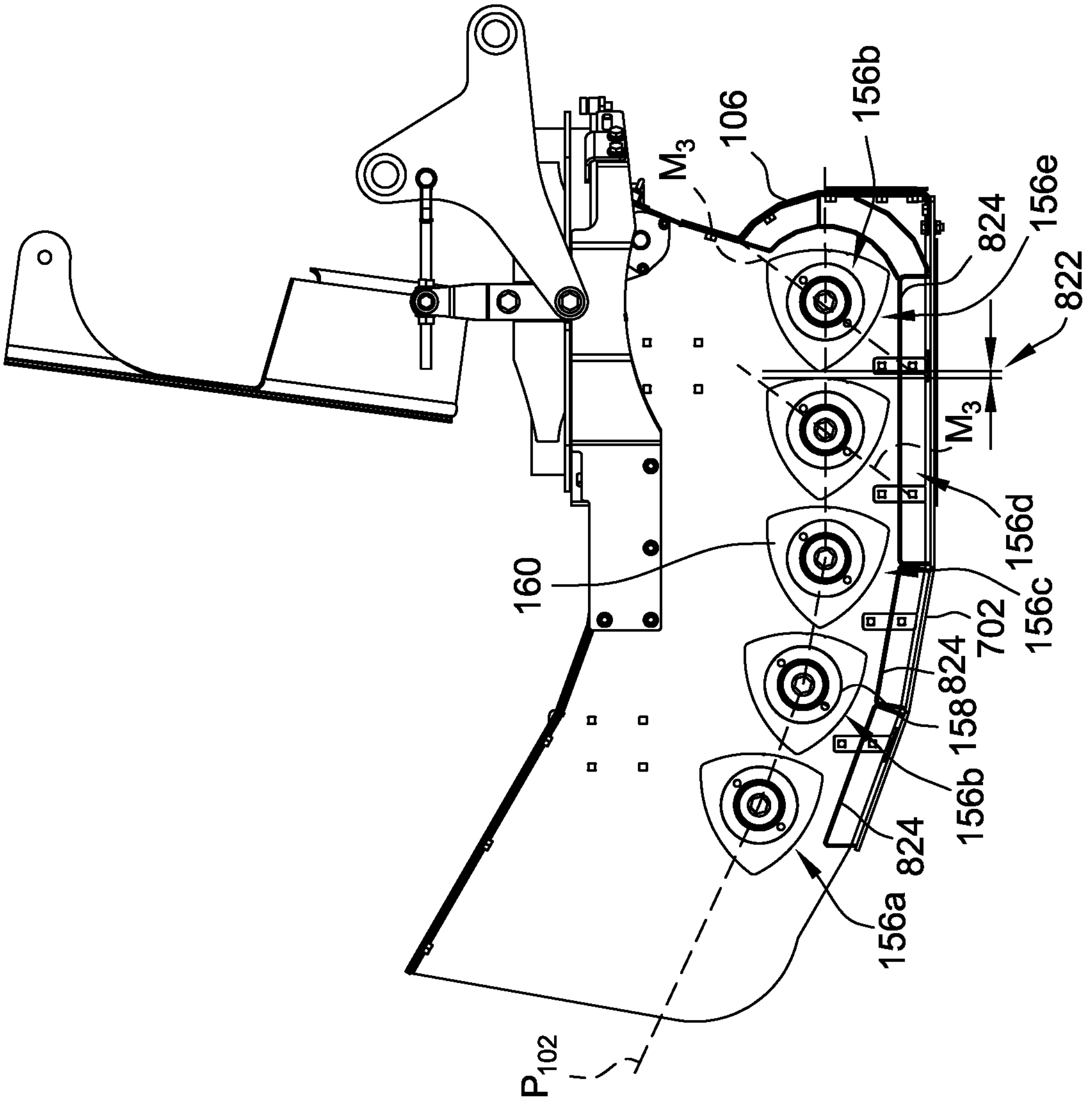
FIG. 57 is a side view of the mixing system with a sidewall removed.

Referring to FIG. 57, compared with the bilobed disks 160 shown in FIG. 52, the trilobed disks 160 have a relatively smaller rotational profile. Accordingly, in the illustrated embodiment, inserts 824 are provided to support the spoil material above the floor 702 and reduce the open space between the disks 160 and the spoil material. In the illustrated embodiment, the inserts 824 are metal plates supported by legs attached to the floor 702 or front wall 106 of the mixer housing 102. In other embodiments, an alternative housing may be used with the trilobed disks 160 that has a reduced clearance between the floor 702 and the disk 160. In further embodiments, a floor adjustment assembly, similar to the floor adjustment assemblies described with respect to FIGS. 43-48 or FIGS. 49-55 may be provided to adjust the position of the floor 702 relative to the rotatable shafts 158.

Figure 56:
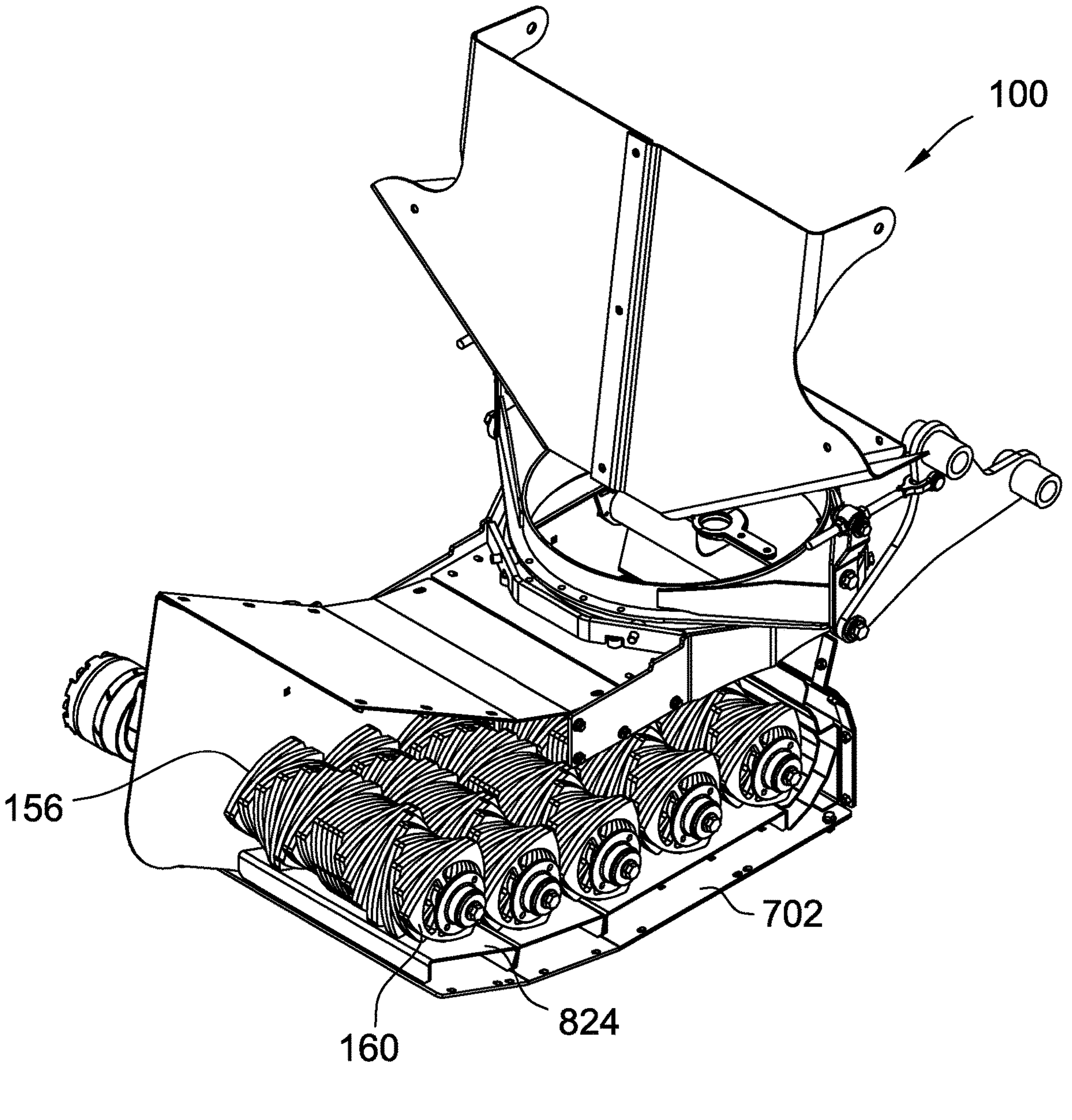
FIG. 56 is a perspective view of another embodiment of a mixing system with a sidewall removed.

In the illustrated embodiment five disk assemblies 156 are shown with each disk assembly 156 including an end disk 160 positioned at the second ends 826 of the rotatable shafts 158. The illustrated end disks 160 are each positionally aligned along the flow path $P_{102}$. The remaining disks 160 shown in FIG. 56 are removed for clarity, though it should be understood that the positional relationship described with respect to the illustrated end disks 160 of adjacent disk assemblies 156 in FIG. 57 is the same for the remaining disks 160 of the disk assemblies 156.

In the illustrated embodiment, the end disks 160 are oriented in parallel, or "timed at zero degrees offset" from the positionally aligned end disks 160 of adjacent disk assemblies 156. In particular, a first end disk 160 of the first disk assembly **156*b* is oriented on the corresponding rotatable shaft 158 such that the longitudinal axis $M_3$ of the first end disk 160 is parallel to the longitudinal axis $M_3$ of a second end disk 160 on a second adjacent disk assembly 156*c*. The illustrated orientation or "timing" of the trilobed disks 160 relative to the adjacent disk assemblies 156 maintains the same size of the gaps 822 defined between the positionally aligned disks 160 as the disk assemblies 156** are rotated at the same velocity.

Referring back to FIG. 49, in the illustrated embodiment, the mixer housing 102 further includes a drive system 828 including two motors 202, 208 that are operable to drive rotation of the rotatable shafts 158. In particular, a first motor 202 is attached to the fifth rotatable shaft **158*e* and a second motor 208 is attached to the second rotatable shaft 158*b*. A support arm 830 is attached to the first housing sidewall 108 and extends therefrom to connect to a pair of torque arms 832. The torque arms 832 support the motors 202, 208 on the mixer housing 102 and inhibit rotation of the motor housings 834 relative to the rotatable shafts 158**.

The drive system 828 further includes a plurality of drive chains 820 and sprockets 836 connecting the rotatable shafts 158. In particular, at least one sprocket 836 is attached to each rotatable shaft 158. The drive chains 820 connect the sprockets 836 between adjacent rotatable shafts 158 to synchronize rotation of the shafts 158. In particular, the sprockets 836 in the illustrated embodiment are each similarly sized such that actuation of the motors 202, 208 causes each of the rotatable shafts 158 to rotate at approximately the same rotational velocity and maintain the spacing of the gaps 822 between the disk assemblies 156 (FIG. 52) during rotation. Synchronizing rotation of the shafts 158 also prevents the disk assemblies 156 from interfering with or obstructing rotation of adjacent disk assemblies 156. In other embodiments, at least one of the sprockets 836 may have a different size and/or a different number of teeth from another one of the sprockets 836 to impart a different rotational velocity on one of the shafts 158. In further embodiments, the drive system 828 may include only one motor or more than two motors. In yet further embodiments, the drive system 828 is any suitable drive system 828 that is operable to drive rotation of the rotatable shafts 158. For example, and without limitation, in one alternative embodiment, the drive system 828 is a spur gear drive system that includes one or more spur gears (not shown).

Referring to FIG. 51, in the illustrated embodiment, the mixer housing 102 further includes a distribution assembly 600 that is substantially the same as the distribution assembly 600 shown and described with respect to FIGS. 37-42. The drive system 828 also includes an additive drive system 838 for driving a drive gear 652 of the distribution assembly 600. The additive drive system 838 includes a sprocket 840 attached to the first rotatable shaft **158*a*, the drive gear 652 of the distribution assembly 600, and a drive chain 842 connecting the sprocket 840 to the drive gear 652. A tensioner 844 is connected to the drive chain 842 to maintain tension in the drive chain 842 during operation. The tensioner 844 includes a tensioning arm 846, a sprocket 848 attached on the tensioning arm 846 and engaged with the drive chain 842, and a biasing element 850. The biasing element 850 biases the tensioning arm 846 and the sprocket 848 away from the drive gear 652 and the sprocket 840. In other embodiments, similar tensioners 844 and/or other known tensioners may be provided to maintain tension in each of the drive chains 820 on the rotatable shafts 158**.

Referring back to FIG. 49, the illustrated mixing system 100 further includes an alternative adjustable floor assembly 700 that enables the floor 702 of the mixer housing 102 to be selectively lowered and/or raised relative to the disk assemblies 156. In particular, lowering the floor 702 may enable a clean out operation to remove various debris (e.g., sticks, plugs, rocks, etc.) that may accumulate on the floor. Additionally, the floor 702 may be moved to provide additional clearance for mixing the spoil material and/or to accommodate different sized disk assemblies 156.

The adjustable floor assembly 700 is substantially the same as the adjustable floor assembly 700, shown and described with respect to FIGS. 43-48, except as described below. For example, in contrast with adjustable floor assembly 700 shown in FIGS. 43-48, the adjustable floor assembly 700 of FIG. 49 includes a single actuator 852 and a linkage assembly 854 that connects the actuator 852 to the floor 702. The linkage assembly 854 is configured to translate movement of the actuator 852 into vertical movement of the floor 702.

Figure 54:
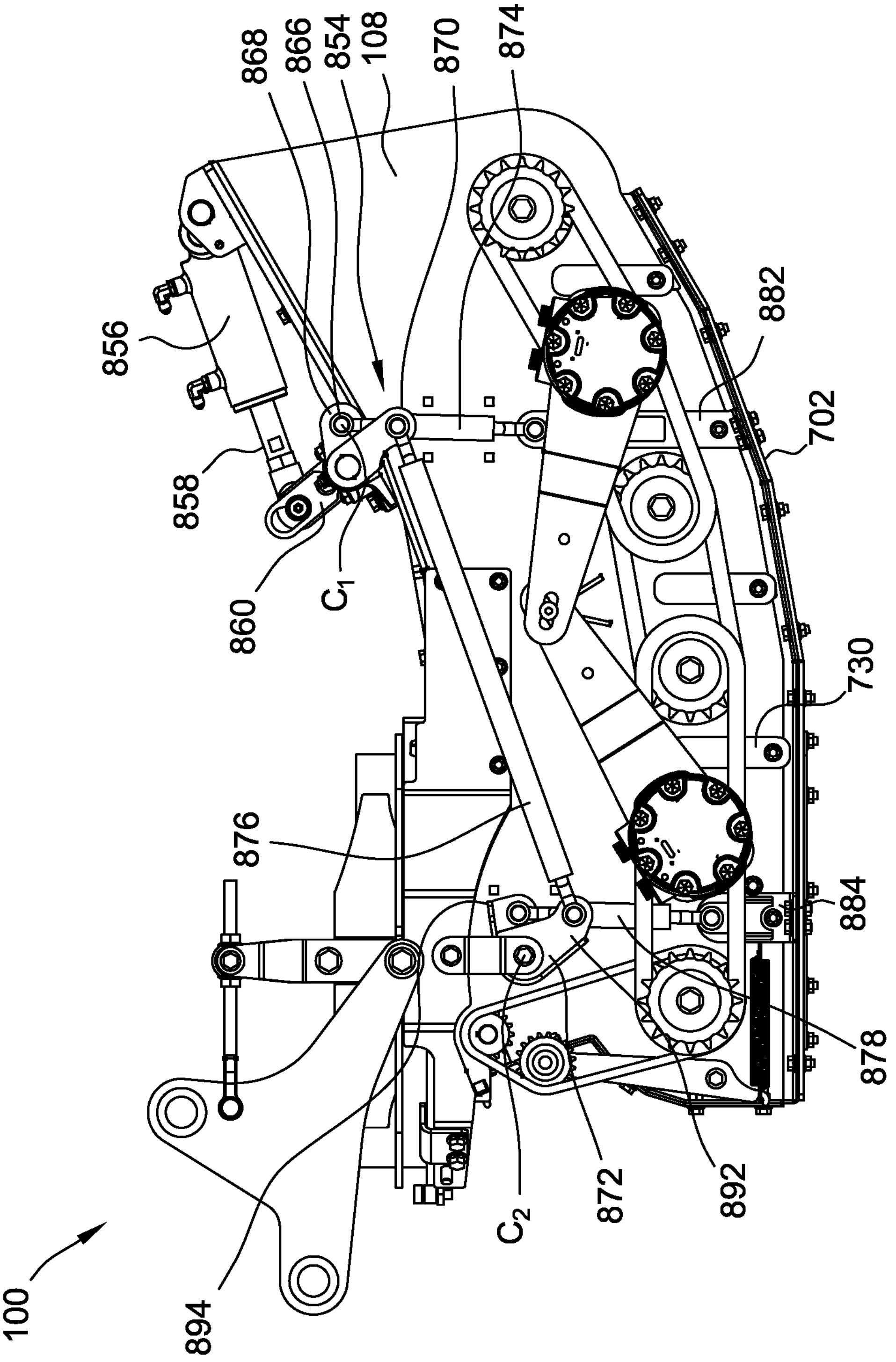
FIG. 54 is a side view of the mixing system showing another embodiment of an adjustable floor assembly in a raised position.
Figure 55:
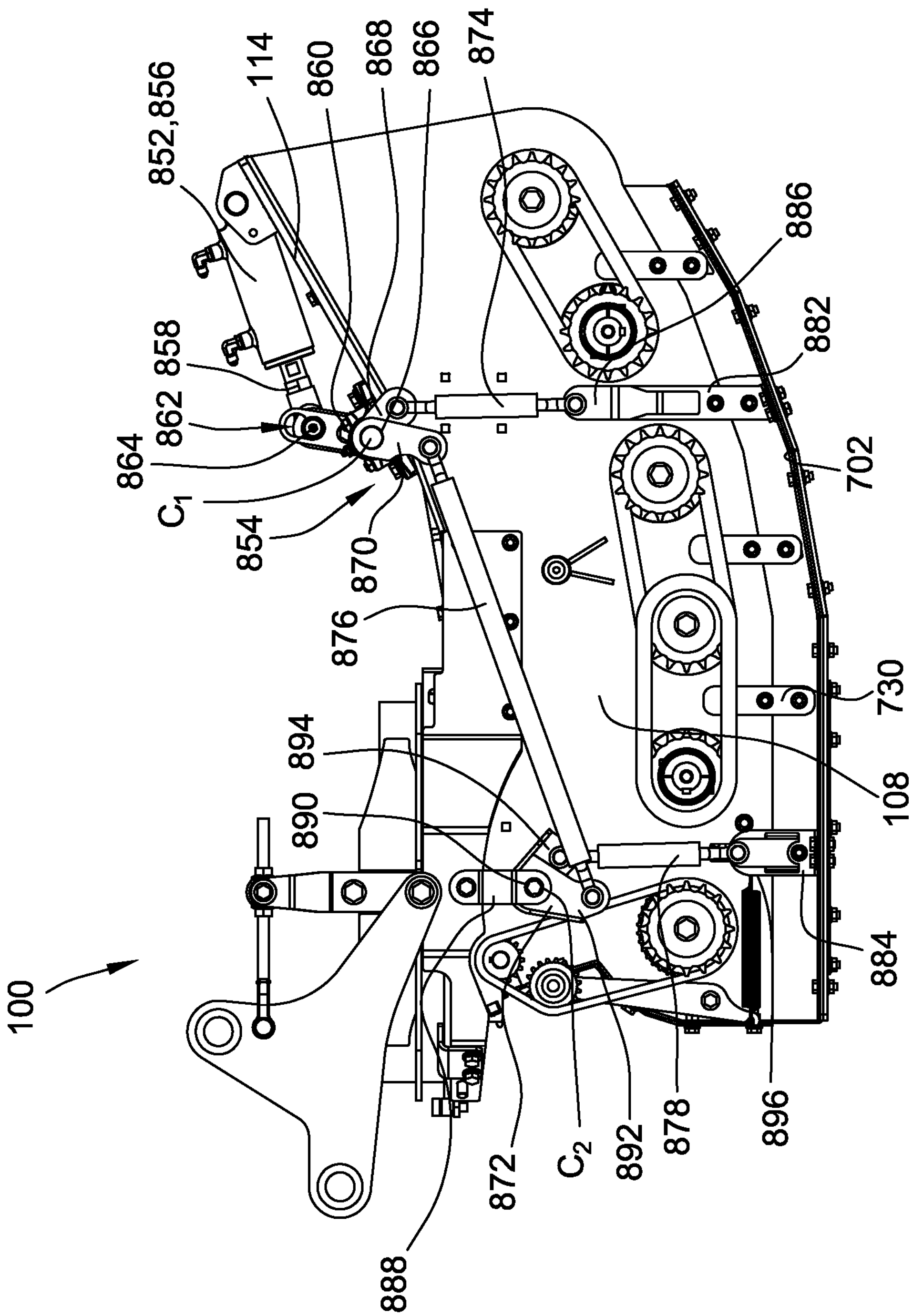
FIG. 55 is another side view of the mixing system showing the adjustable floor assembly in a lowered position.

FIG. 54 is a side view of the mixing system 100 with the floor 702 in the raised position and FIG. 55 is a side view that shows the floor 702 in the lowered position. Additional components are removed in FIG. 55 to show features of the adjustable floor assembly 700. In the illustrated embodiment, the actuator 852 is a hydraulic actuator that includes a cylinder 856 (FIG. 55) and a piston 858. In other embodiments, any suitable actuator may be used. The cylinder 856 is attached to the outer cover 114 and configured to be pressurized to extend and retract the piston 858 from the cylinder 856. Other actuators such as linear actuators or any mechanically driven actuator may alternatively be used. In the illustrated embodiment, the piston 858 is in an extended position relative to the cylinder 856 when the floor 702 is in the raised position (FIG. 54) and is retracted when the floor 702 is in the lowered position (FIG. 55).

As shown in FIG. 55, the linkage assembly 854 includes a pivot bracket 860 connected to the piston 858 of the actuator 852. In particular, the pivot bracket 860 defines a slot 862 that receives a projection 864 of the piston 858 therein. The linkage assembly 854 further includes, a connecting shaft 866, first, second, and third arms 868, 870, 872, and first, second, and third linkages 874, 876, 878. In some embodiments, the linkages 874, 876, 878 have a selectively adjustable length to achieve a desired range of motion of the linkages 874, 876, 878.

In the illustrated embodiment, the connecting shaft 866 is rotatable within bearings 880 (FIG. 49) attached to the cover 114. The pivot bracket 860 is attached to and rotates with the connecting shaft 866 about a first center axis $C_1$ extending through the connecting shaft 866 (into the page in FIG. 55). The first and second arms 868, 870 are each attached to the connecting shaft 866 and positioned outward from the first housing sidewall 108. The first linkage 874 is pivotably attached to the first arm 868 and is connected to a first mounting arm 882 attached to the floor 702 by a first clevis and tang connector 886. The second linkage 876 is pivotably attached to the second arm 870 and the third arm 872. The third arm 872 is pivotably attached to the first housing sidewall 108. In particular, a mounting bracket 888 is attached to the second sidewall 110 and the third arm 872 is connected to the mounting bracket 888 by a pin connector 890 extending through the mounting bracket 888 and third arm 872. The third arm 872 is configured to rotate around a second center axis $C_2$ extending through the pin connector 890 (into the page in FIG. 55).

In the illustrated embodiment, the third arm 872 includes a first prong 892 and a second prong 894 each extending radially outward from the pin connector 890. The second linkage 876 is pivotably attached to the third arm 872 at the first prong 892 and the third linkage 878 is pivotably attached to the third arm 872 at the second prong 894. In the illustrated embodiment, the second prong 894 is angularly offset from the first prong 892 such that the generally lateral movement of the first prong 892 by the second linkage 876 is translated into generally vertical movement of the second prong 894 and the third linkage 878. The third linkage 878 is also connected to a second mounting arm 884 by a second clevis and tang connector 896. The second mounting arm 884 is attached to the floor 702. The floor 702 also includes guides 730 which maintain the alignment of the floor 702 during raising and lowering of the floor 702 in substantially the same manner as described above with respect to guides 730 shown in FIG. 44. It should be understood that the linkage assembly 854 also includes additional arms and linkages on the opposed side of the mixing system 100 (shown partially in FIG. 9) that are arranged to connect the actuator 852 to the floor 702 in substantially the same manner as described herein with respect to the first through third linkages 874, 876, 878 and the first through third arms 868, 870, 872.

Referring to FIG. 54, to move the floor 702 from the raised position to the lowered position (FIG. 55), the piston 858 is retracted into the cylinder 856, thereby causing the pivot bracket 860 to rotate circumferentially around the first center axis $C_1$ and rotating the connecting shaft 866 about the first center axis $C_1$. Rotation of the connecting shaft 866 also rotates the first arm 868 and the second arm 870 circumferentially around the first center axis $C_1$ of the connecting shaft 866 (e.g., in the clockwise direction as shown in FIG. 54). The circumferential rotation of the first arm 868 lowers the first linkage 874 relative to the first housing sidewall 108, thereby lowering the first mounting arm 882. The circumferential rotation of the second arm 870 moves the second linkage 876 (e.g., to the left of the page as shown in FIG. 54), thereby rotating the third arm 872 around the second center axis $C_2$ (e.g., in the clockwise direction as shown in FIG. 54). In particular, the second linkage 876 moves the first prong 892 of the third arm laterally (e.g., to the left of the page in FIG. 54) which moves the second prong 894 generally vertically downward. Movement of the second prong 894 lowers the third linkage 878 and the second mounting arm 884. The pivotable connections between the first, second, and third linkages 874, 876, 878 and the guides 730 facilitate maintaining alignment of the floor 702 with the first housing sidewall 108 between the raised and lowered positions and restrict lateral movement of the floor 702.

FIGS. 60-64 show another embodiment of a mixing system 100. The mixing system 100 is substantially the same as the mixing system 100, described above with respect to FIGS. 24-48, except as described below. In the illustrated embodiment, the mixing system 100 includes a mixer housing 102 and a conveyor assembly 900 pivotally attached to the mixer housing 102. The conveyor assembly 900 is configured to carry material within the mixer housing 102 in either a forward direction (i.e., from the front wall 106 towards the discharge end 152) or in an opposite reverse direction.

As described above, during normal operation, the disks 160 mix and at least partially solidified spoil material in the mixer and convey the solidified spoil material to the discharge end 152. However, during some operations, an additional drive to move the spoil material within the mixer housing 102 may be desirable. For example, in some such operations, the spoil material may include fine grain particles, such as sand, that are not easily carried by the disks 160. Additionally, in some operations, the mixing system 100 may operate in a "pass through" mode, in which the spoil material is conveyed through the mixer housing 102 with only a small amount or no additive mixed in. For such operations, the conveyor assembly 900 facilitates moving the material within the mixer housing 102 to the discharge end 152. Additionally, the conveyor assembly 900 may be used to clear obstructions in the mixer housing (such as rocks or gravel) that may otherwise become impacted into the floor and cause the disks 160 to become mechanically bound.

Figure 61:
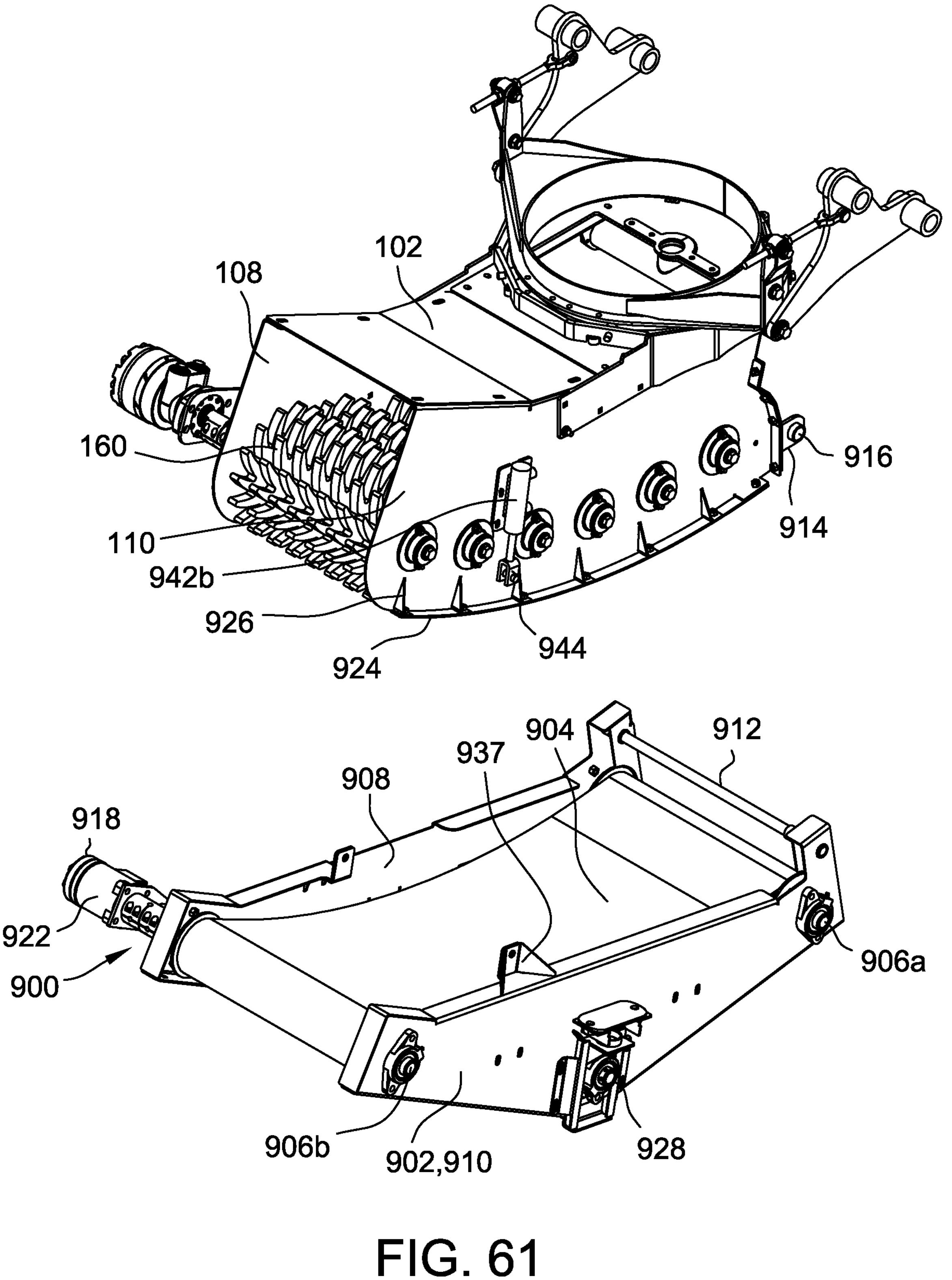
FIG. 61 is an assembly view of the mixing system.

In the illustrated embodiment, the conveyor assembly 900 is a belt conveyor that includes a conveyor housing 902, a belt 904, and conveyor shafts 906 rotatably connected to the conveyor housing 902 operable to drive movement of the belt 904 around the conveyor shafts 906. The conveyor housing 902 includes a first sidewall 908 and a second sidewall 910 (FIG. 61). A pivot bar 912 extends between and connects the first and second sidewalls 908, 910 of the conveyor housing 902. A pair of bosses 914 extend longitudinally outward from the front wall 106 of the mixer housing 102 and the pivot bar 912 extends through apertures 916 (FIG. 61) defined in the bosses 914. In some embodiments, bearings (not shown) are provided between the pivot bar 912 and the bosses 914 to reduce wear resulting from friction at an interface between the pivot bar 912 and the bosses 914. As described in greater detail below, the illustrated configuration of the pivot bar 912, the bosses 914 and the conveyor housing 902 enables the conveyor assembly 900 to pivot relative to the mixer housing 102.

In the illustrated embodiment, the mixer housing 102 includes a drive system 828 (FIG. 60) that includes a first, or lower, group 161 of rotatable shafts 158 (numbered 158*a*-158*c*) and a second, or upper, group 163 of rotatable shafts 158 (numbered 158*d*-158*f*). A first motor 202 is operably connected, via drive chains 820, to drive the first group 161 of rotatable shafts 158 and a second motor 208 is operably connected, via drive chains 820, to drive the second group 163 of rotatable shafts 158. That is, unlike the drive system 828 described above with respect to FIG. 51, in the illustrated embodiment the rotatable shafts 158 are separated into different drive groups 161, 163 to facilitate operating the different groups of shafts at different rotational velocities. For example, in one operation, the second group 163 of rotatable shafts 158 may be rotated at a higher rotational velocity than the first group 161 to keep spoil material moving upwards towards the discharge end 152. In another operation, the first group 161 and the second group 163 may be operated in opposing rotational directions simultaneously. Moreover, it should be understood that the drive systems 828 of FIGS. 51 and 60 may alternatively be used on any of the mixing systems 100 described herein.

Figure 62:
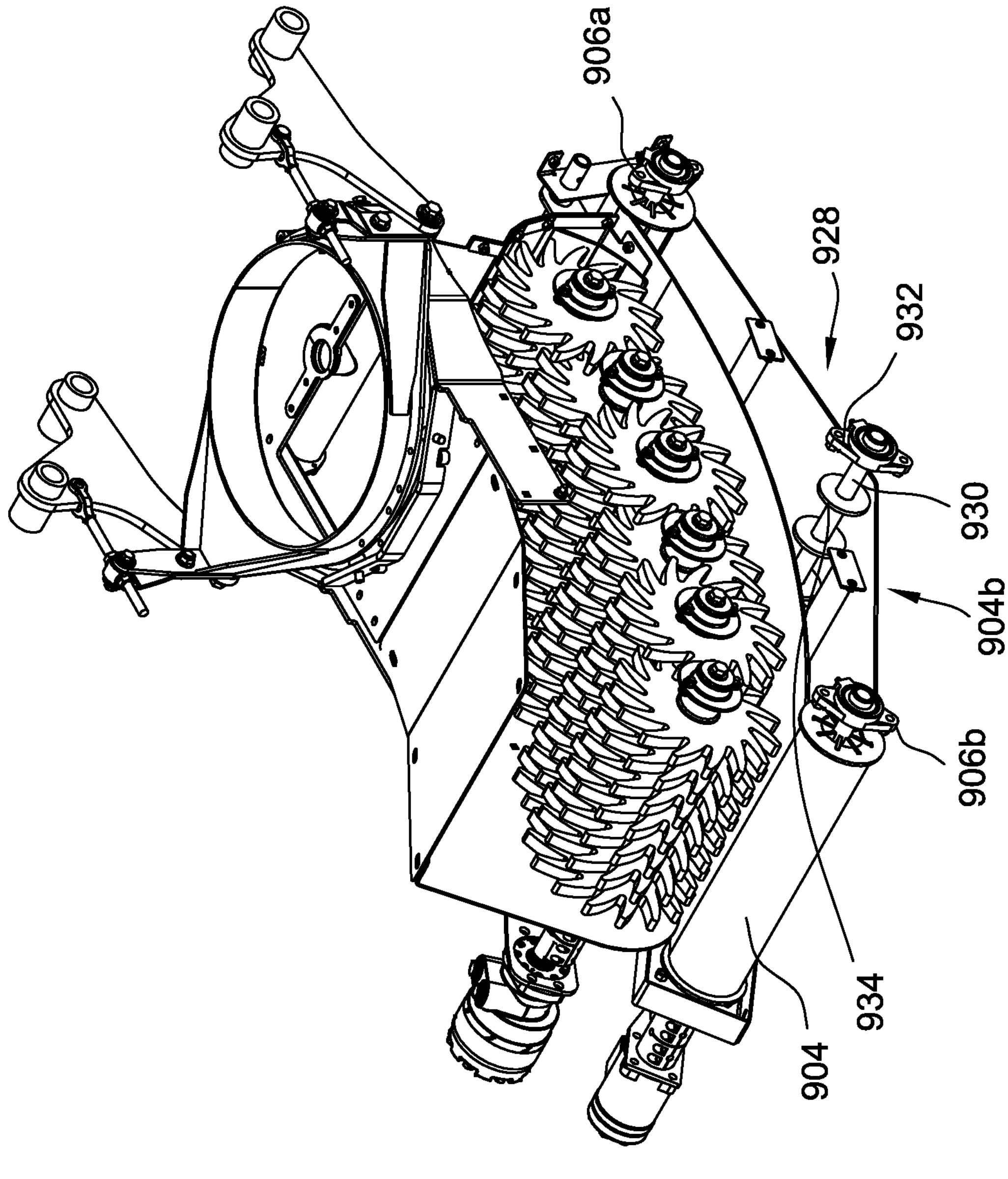
FIG. 62 is a perspective view of the mixing system with a sidewall removed.

The conveyor assembly 900 also includes a conveyor motor 918 operably engaged with at least one of the conveyor shafts 906 to rotate the conveyor shafts 906. In the illustrated embodiment, the conveyor assembly 900 includes a front conveyor shaft 906*a* and a rear conveyor shaft 906*b* (FIG. 62). The conveyor motor 918 drives rotation of the rear conveyor shaft 906*b* to move the belt 904 on the shafts 906. The conveyor housing 902 includes an anti-rotational mount 920 (FIG. 60) attaching a motor housing 922 of the conveyor motor 918 to the first conveyor housing sidewall 908. The anti-rotational mount 920 inhibits rotation of the motor housing 922 relative to the conveyor housing 902.

Referring to FIG. 61, in the illustrated embodiment, the belt 904 is a smooth conveyor belt (i.e., the belt has a substantially smooth surface that contacts the spoil material during use). In other embodiments, the belt 904 may include any suitable conveyor belt having any known belt features (e.g., protruding ribs, treads, etc.) for engaging the spoil material.

The mixer housing 102 further includes at least one laterally extending flange 924 that is positioned to contact and engage the belt 904 during operation. In particular, the flange 924 contacts and seals against the belt 904 during operation to prevent, or at least substantially inhibit, spoil material within the housing from moving laterally beyond the flange 924. In the illustrated embodiment, the flange 924 defines a generally arched concave contour and engages the belt 904 to define a generally arched convex contour of the belt 904 between the conveyor shafts 906. In other embodiments, the flange 924 may be shaped in any manner that enables the mixer housing 102 to function as described herein.

In the illustrated embodiment, the housing 102 includes a first laterally extending flange (not shown) protruding laterally outward from a bottom of the first housing sidewall 108 and a second lateral flange 924 protruding laterally outward from a bottom of the second housing sidewall 110. In other embodiments, at least one of the flanges 924 may protrude laterally inward (i.e., toward the disks 160) from at least one of the housing sidewalls. A plurality of triangular gussets 926 are provided to support and inhibit bending or deformation of the flanges 924. In the illustrated embodiment, the flange 924 is formed of a metal material. In other embodiments, the flange 924 is formed of a lubricant impregnated wear material. In further embodiments, a strip (not shown) formed of a wear resistant metal or wear resistant material such as, but not limited to, ultra high molecular weight polyethylene, nylon, etc. may be provided on the flange 924.

Figure 63:
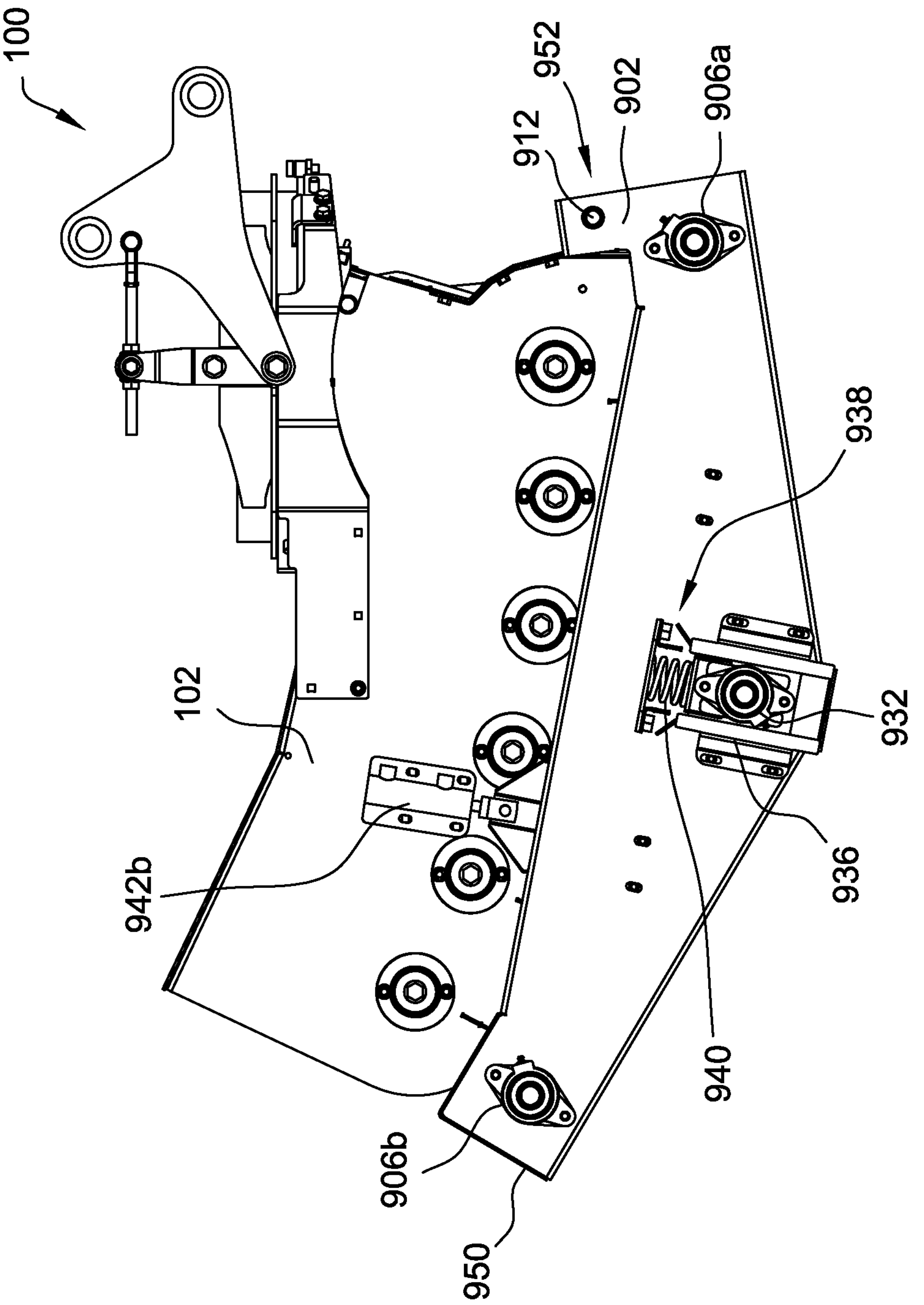
FIG. 63 is a side view of the mixing system with the conveyor assembly in a raised position.

In the illustrated embodiment, the conveyor housing 902 includes a belt tensioning assembly 928 that controls tension and prevents slipping of the belt 904. Referring to FIG. 62, the belt tensioning assembly 928 includes a tensioner shaft 930 rotatably received within a bearing element 932. A plurality of pulleys 934 are attached along the tensioner shaft 930 and are configured to rotate therewith. The pulleys 934 contact and engage a lower section 904*b* of the belt to apply a downward force on the belt 904. As shown in FIG. 63, the bearing element 932 is slidably received in a mount 936 attached to the conveyor housing 902. A biasing assembly 938 (FIG. 63) is attached to the conveyor housing 902 and includes a biasing element 940 that biases the bearing element 932 downward within the mount 936. In the illustrated embodiment, the biasing element 940 is a compression spring, though in other embodiments, any suitable biasing element may be used. In some embodiments, the biasing assembly 938 may be selectively adjustable and/or positionable to adjust the belt 904 tension.

Referring back to FIG. 61, the mixer housing 102 further includes at least one actuator 942 attached to the mixer housing 102 that is configured to attach to the conveyor housing 902. In the illustrated embodiment, a first actuator 942*a* is mounted on the first mixer housing sidewall 108 (FIG. 60) and a second actuator 942*b* is mounted on the second mixer housing sidewall 110. The actuators 942 each include clevis and tang connectors 944 that connect to corresponding mounts 937 on the conveyor housing 902. The actuators 942 are linearly extendable to move the conveyor assembly 900 between a raised position (shown in FIG. 63), and a lowered position (shown in FIG. 64).

Figure 64:
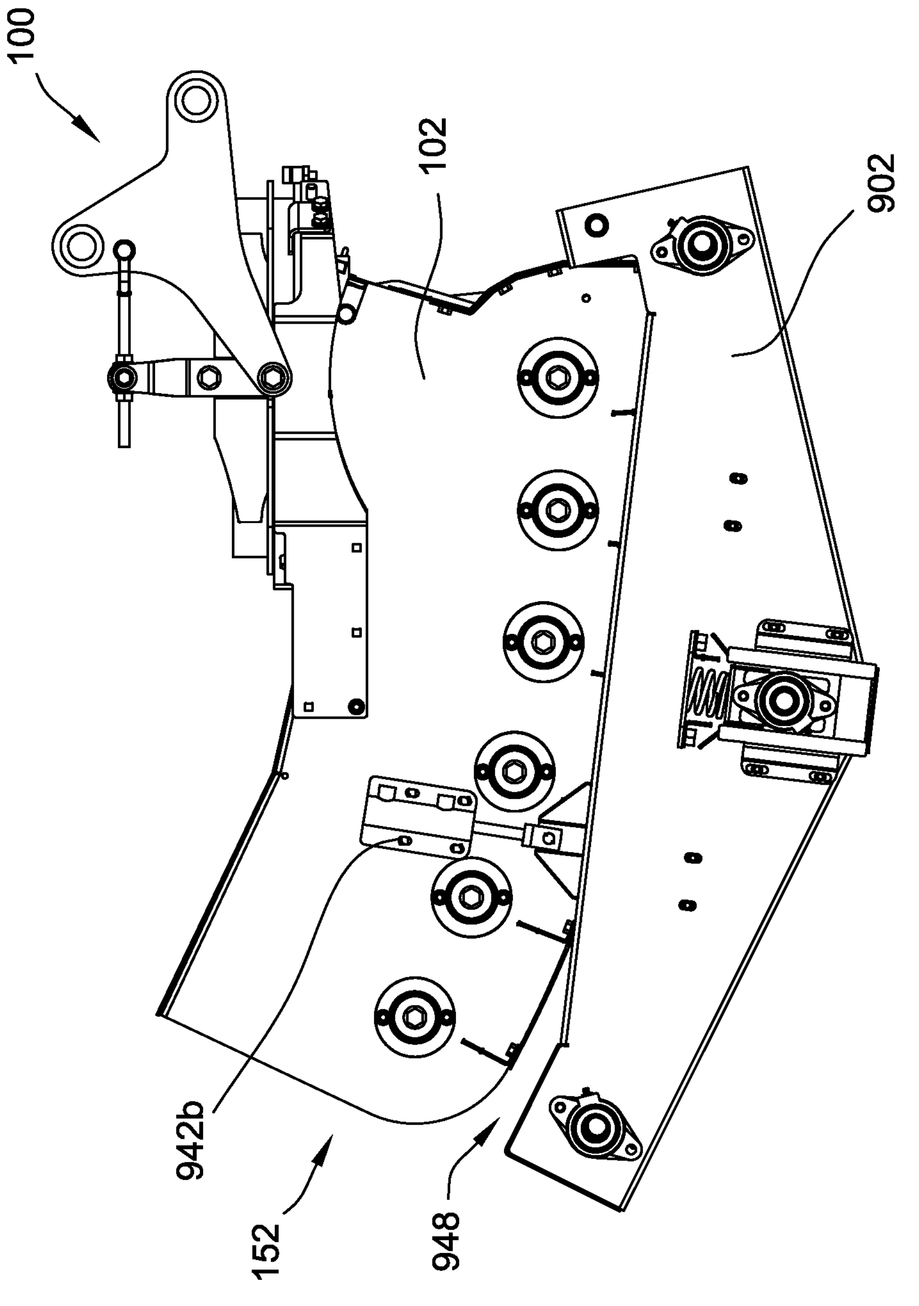
FIG. 64 is another side view of the mixing system with the conveyor assembly in a lowered position.

Referring to FIG. 63, in the raised, or operating, position, the flanges 924 contact and engage the belt 904 (FIG. 61) along substantially the entire length of the belt 904 between the conveyor shafts 906. To move the conveyor assembly 900 to the lowered position, the actuators 942 are extended, pivoting a front end 952 of the conveyor housing 902 about the pivot bar 912 and lowering a rear end 950 of the conveyor housing 902 relative to the mixer housing 102. In particular, as shown in FIG. 64, in the lowered position, a gap 948 is defined between the mixer housing 102 and the conveyor housing 902 at the discharge end 152 of the mixing system 100. In some operations, the conveyor assembly 900 is moved to the lowered configuration to perform a clean out operation of the mixing system 100, in which the conveyor belt 904 is optionally run and any trapped debris or other materials may be removed from the mixer housing 102.

Figure 65:
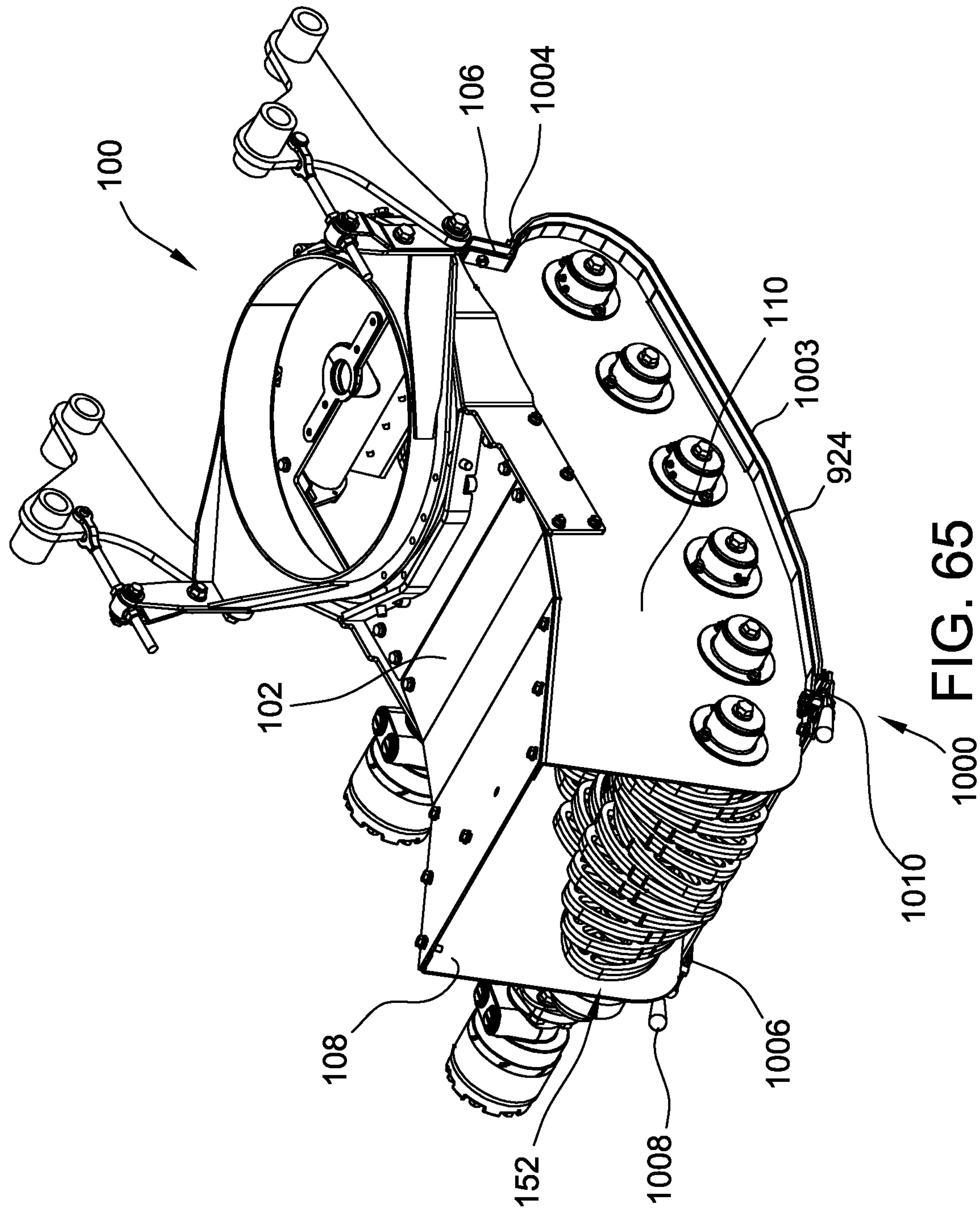
FIG. 65 is a perspective view of another embodiment of a mixing system.

FIGS. 65-68 show another embodiment of a mixing system 100. The mixing system 100 is substantially the same as the mixing system 100, described above with respect to FIGS. 24-48, except as described below. Referring to FIG. 65, in the illustrated embodiment, the mixing system 100 includes a mixer housing 102 and a flexible floor assembly 1000 removably attached to the mixer housing 102. The flexible floor assembly 1000 includes a floor 1002 formed from a flexibly resilient material, such as rubber. The floor extends between a first end 1004 attached to the front wall 106 of the mixer housing 102 to a second end 1006. The second end 1006 is attached to mixer housing 102 proximate the discharge end 152 by a pair of clamps 1008, 1010. In particular, the pair of clamps 1008, 1010 include a first clamp 1008 and a second clamp 1010. The first clamp 1008 is mounted on a first flange (not shown) extending outward from the first sidewall 108 of the mixer housing 102. The second clamp 1010 is mounted on a second flange 924 extending outward from the second sidewall 110. The clamps 1008, 1010 apply a tensioning force to the floor 1002 to tightly secure the floor 1002 to the mixer housing 102. The clamps 1008, 1010 are also adjustable to release the second end 1006 of the floor 1002 from the mixer housing 102. When the clamps 1008, 1010 are released the floor 1002 is attached to the mixer housing 102 only at the first end 1004 of the floor 1002.

The flexible floor assembly 1000 enables at least partial toolless detachment of the floor 1002 from the mixer housing 102. For example, toolless detachment of the floor 1002 may be desirable to perform routine cleaning and maintenance on internal components of the mixer housing 102 and/or during operations in which processing spoil material in the mixing system 100 is not desired. Additionally, the flexible resilience of the floor 1002 resists denting or other deformations when processing hardened spoil material or other hardened debris, such as large rocks or stones.

Figure 66:
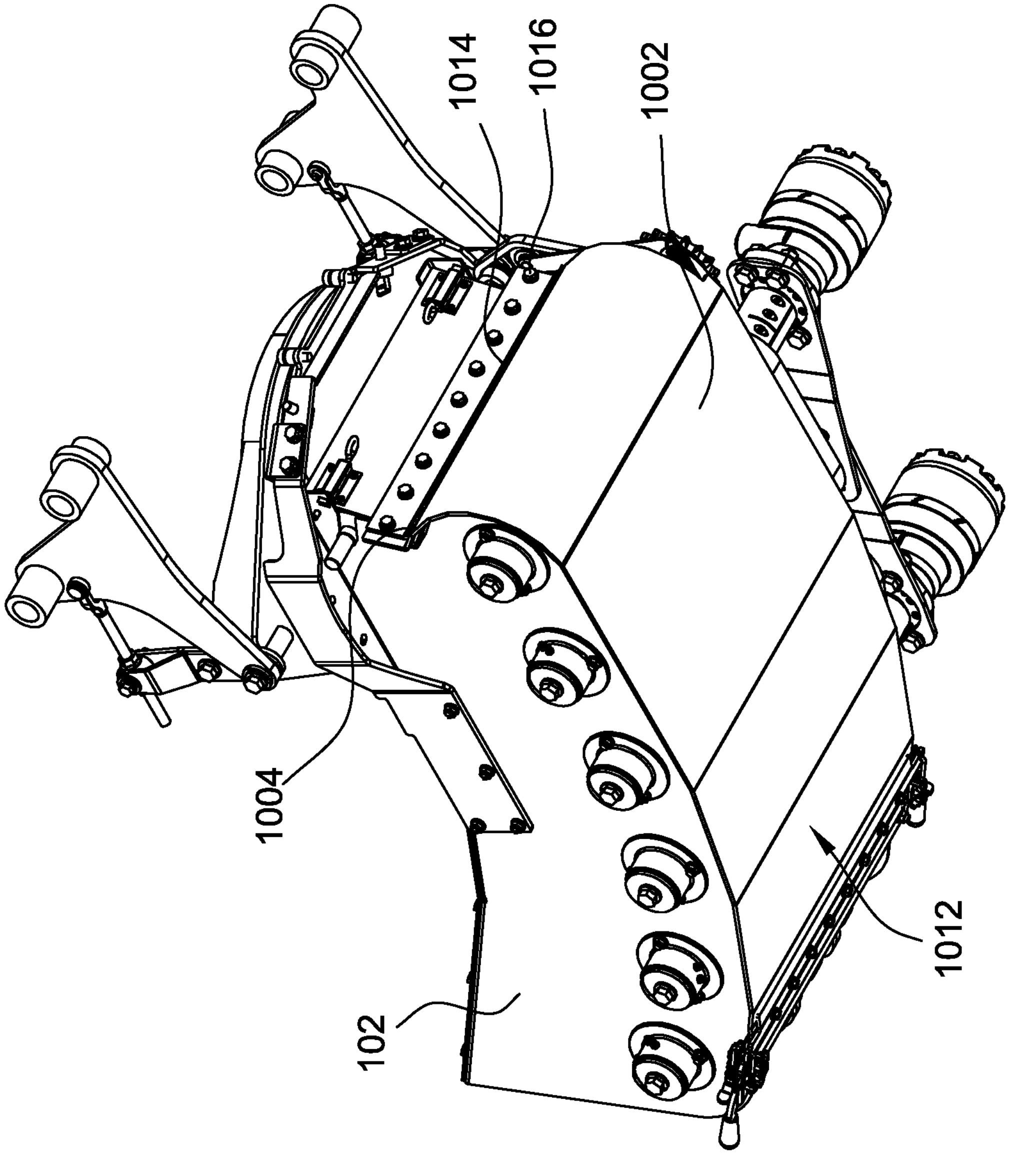
FIG. 66 is a rear front perspective view of the mixing system.

Referring to FIG. 66, in the illustrated embodiment, the floor 1002 is generally rectangular and covers a lower end 1012 of the mixer housing 102 to contain the spoil material within the mixer housing 102. The first end 1004 of the floor 1002 is attached to the front wall 106 (FIG. 65) by a mounting bracket 1014. A plurality of fasteners 1016 extend through apertures (not shown) defined within the mounting bracket 1014 and tightly press the mounting bracket 1014 against the floor 1002 to secure the floor 1002 to the front wall 106. In some embodiments, the first end 1004 of the floor 1002 may define apertures (not shown), through which the fasteners 1016 also extend.

Figure 67:
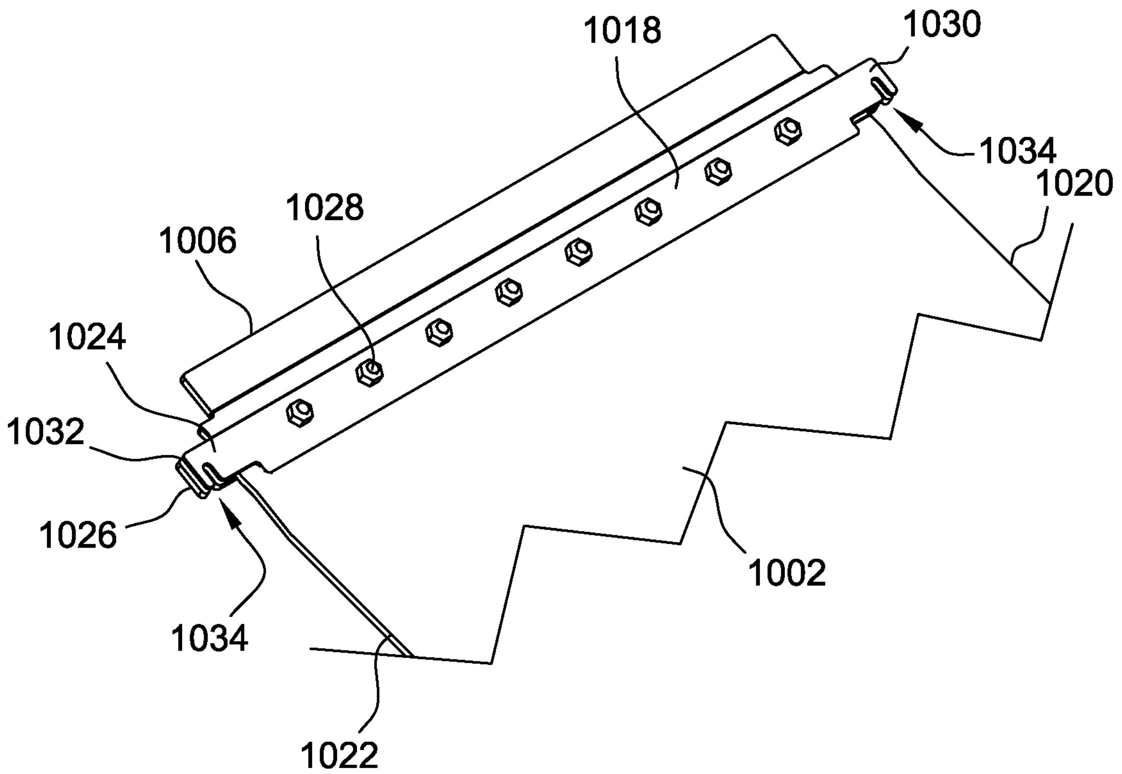
FIG. 67 is a perspective view of a portion of a floor of the mixing system.

Referring to FIG. 67, in the illustrated embodiment, a clamping bracket 1018 is attached to the floor 1002 near the second floor end 1006. The floor 1002 includes a first side 1020 and a second side 1022 and the clamping bracket 1018 extends across the floor 1002 from the first side 1020 to the second side 1022. The clamping bracket 1018 includes a first plate 1024 and a second plate 1026 and the floor 1002 is positioned between the first plate 1024 and the second plate 1026. The plates 1024, 1026 each define a plurality of apertures (not shown) through which a plurality of fasteners 1028 extend. The floor 1002 also defines a plurality of apertures (similar to apertures 1112, shown in FIG. 71) through which the fasteners 1028 extend. The fasteners 1028 tightly press the floor 1002 between the first plate 1024 and the second plate 1026 to secure the clamping bracket 1018 in position on the floor 1002. In other embodiments, the clamping bracket 1018 includes a single plate (not shown) that is secured to floor 1002.

In the illustrated embodiment, the clamping bracket 1018 includes a first hook end 1030, or "hook," that extends outward from the first side 1020 of the floor 1002 and a second hook end 1032, or "hook," that extends outward from the second side 1022 of the floor 1002. The hook ends 1030, 1032 each define recesses 1034 for receiving at least a portion of the first clamp 1008 and the second clamp 1010 (FIG. 65). In particular, referring to FIG. 68, the recess 1034 receives a latch 1036 of the second clamp 1010. The first clamp 1008 (FIG. 65) also includes a latch (not shown) and is configured to engage the first hook end 1030 (FIG. 67) in substantially the same manner as described herein with respect to the second clamp 1010 and the second hook end 1032.

Figure 68:
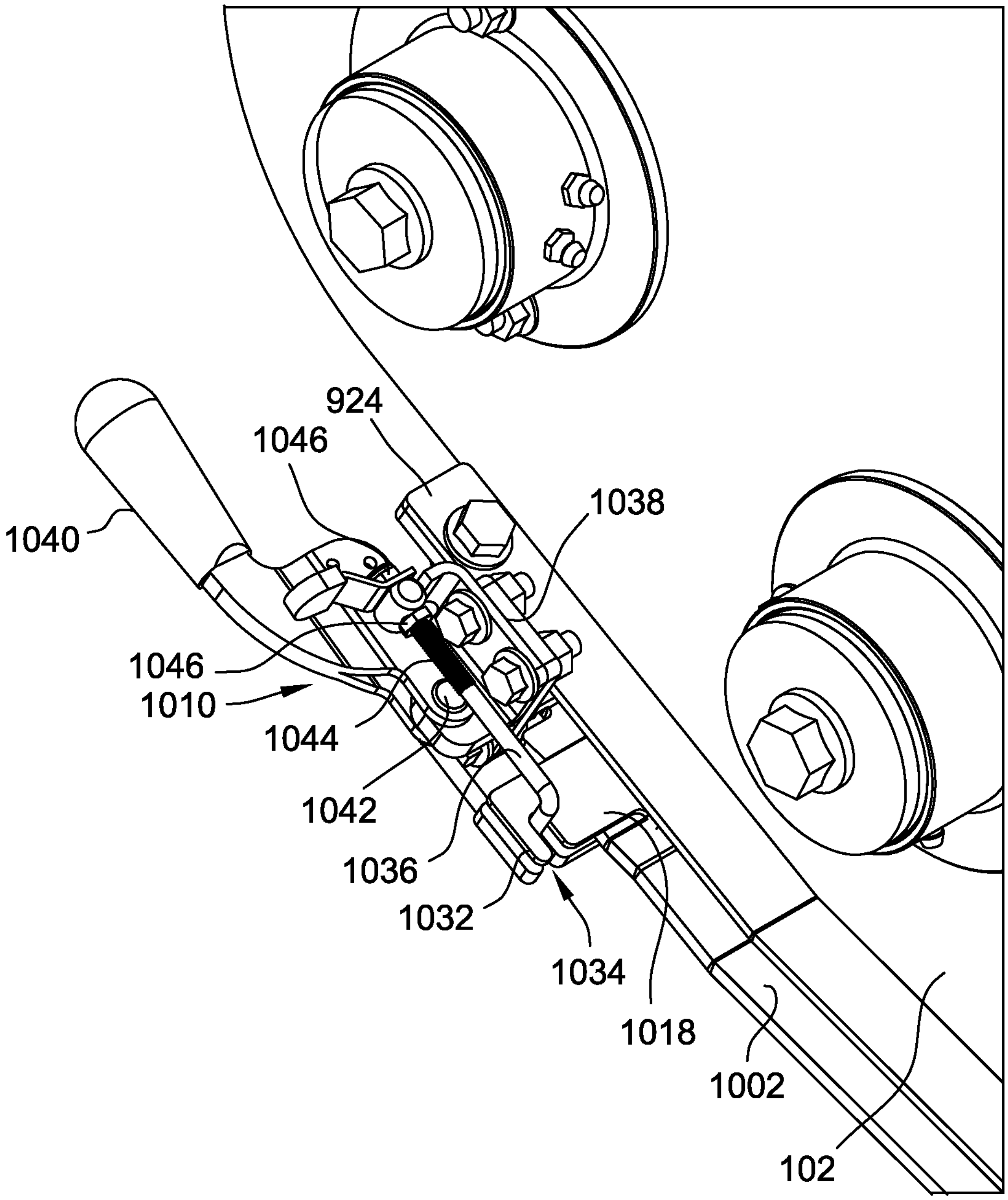
FIG. 68 is a perspective view of a portion of the mixing system.

Referring to FIG. 68, the tensioning force provided by the clamp 1010 seals the floor 1002 against the flange 924 to prevent leakage of spoil material from the mixer housing 102. In the illustrated embodiment, the clamp 1010 is an over center clamping device that includes a bracket 1038, a handle 1040, and the latch 1036. In the illustrated embodiment, the latch 1036 is a U-bolt, though any suitable latch may be used in other embodiments. The bracket 1038 is attached to the flange 924 of the mixer housing 102. The handle 1040 is pivotably connected to the bracket 1038 by a pivot joint 1042 extending through the handle 1040 and the bracket 1038. The handle 1040 is rotatable relative to the bracket 1038 about the pivot joint 1042 and the latch 1036 is threadably attached to the handle 1040 to move within the recess 1034 in response to rotation of the handle 1040. As illustrated in FIG. 68, the clamp 1010 is in a stowed position in which the latch 1036 applies the tensioning force to the clamping bracket 1018. The clamp 1010 may be transitioned to a released position (not shown) by rotation the handle 1040 about the pivot joint 1042 (e.g., in the counterclockwise direction in FIG. 68) to move the latch 1036 out of the recess 1034 and release the second end 1006 (FIG. 67) of the floor 1002 from the mixer housing 102.

In the illustrated embodiment, the latch 1036 includes threads 1044 and fasteners 1046 which adjustably secure the latch 1036 to the handle 1040. In particular, adjustment of the fasteners 1046 on the threads 1044 of the latch 1036 allows for movement of the latch 1036 relative to the handle 1040 to adjust the tensioning force applied on the floor 1002. In some embodiments, the clamp 1010 includes a lock (not shown) for rotationally securing the handle 1040 in position relative to the bracket 1038. In other embodiments, any other suitable clamping device may be used to secure the floor 1002 to the mixer housing 102. In yet further embodiments, the first end 1004 (FIG. 66) of the floor 1002 may be secured to the mixer housing 102 by additional clamps (not shown) in substantially the same manner as described herein with respect to the second end 1006.

Figure 69:
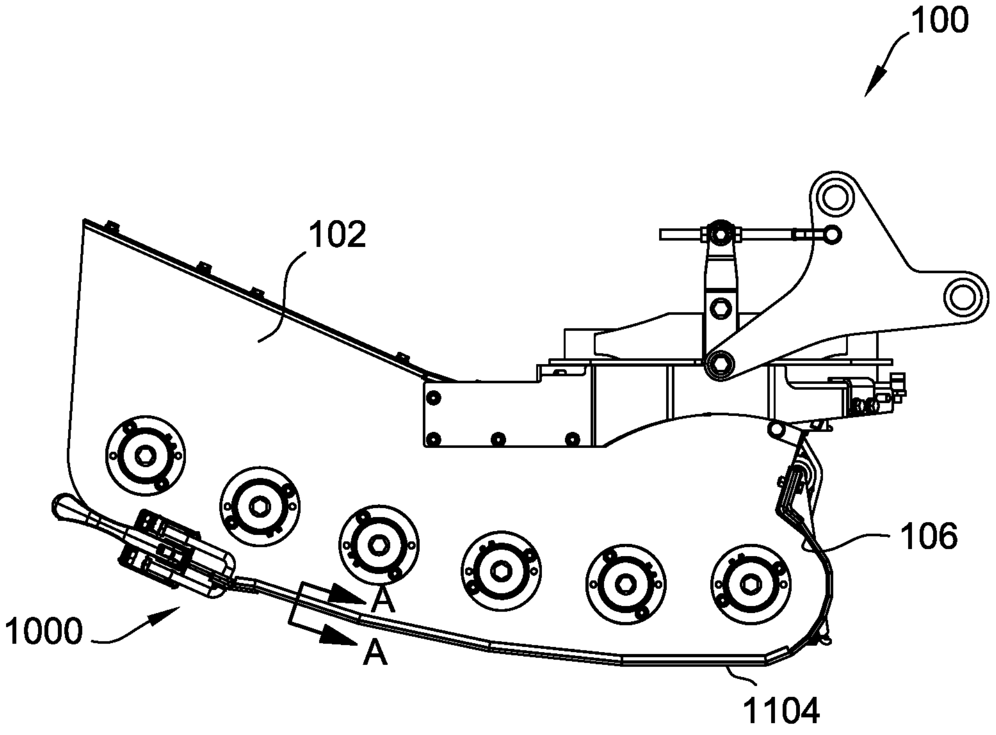
FIG. 69 is a side view of another embodiment of a mixing system.
Figure 70:
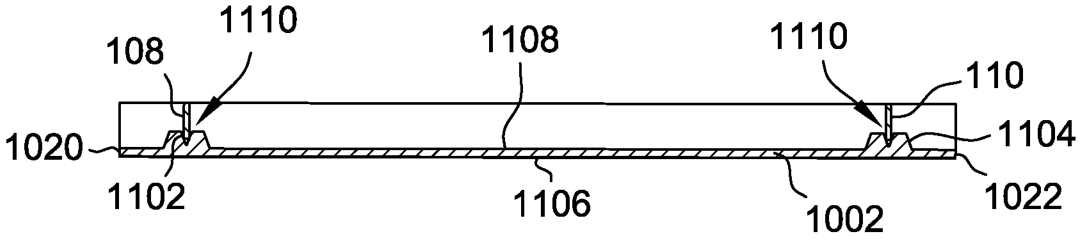
FIG. 70 is a sectional view of a portion of the mixing system taken along the line A-A, shown in FIG. 69.
Figure 71:
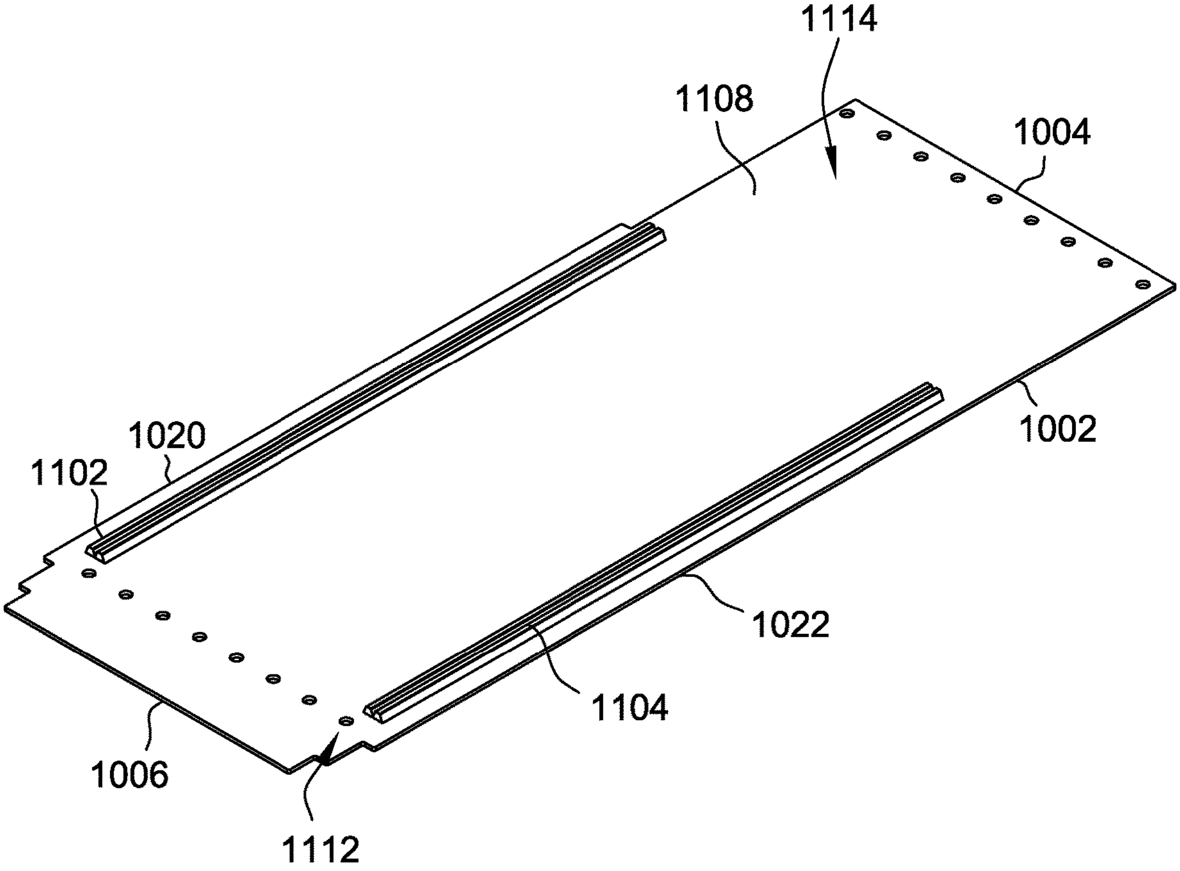
FIG. 71 is a perspective view of a floor of the mixing system.

FIGS. 69-71 show another embodiment of a mixing system 100. The mixing system 100 is substantially the same as the mixing system 100, described above with respect to FIGS. 65-68, except as described below. In particular, referring to FIGS. 69 and 70, in the illustrated embodiment, the mixing system 100 includes a flexible floor assembly 1000 that is substantially the same as the flexible floor assembly 1000 described above with respect to FIGS. 65-68, except that, in the illustrated embodiment, the floor 1002 includes a pair of longitudinally extending ribs 1102, 1104 that engage and seal against the mixer housing 102.

Referring to FIG. 70, in the illustrated embodiment, the ribs 1102, 1104 include a first rib 1102 positioned adjacent to and inward from the first side 1020 of the floor 1002 and a second rib 1104 positioned adjacent to and inward from the second side 1022 of the floor 1002. The floor 1002 includes an outer surface 1106 oriented to face away from the mixer housing 102 (FIG. 69) and an opposed inner surface 1108. The ribs 1102, 1104 each have a trapezoidal profile projecting outwards from the inner surface 1108 that defines a "V-shaped" recess 1110 for receiving portions of the respective sidewalls 108, 110 of the mixer housing 102 (FIG. 69) therein. As a result, the ribs 1102, 1104 of the illustrated embodiment contact the respective sidewalls 108, 110 of the mixer housing and seal against the mixer housing sidewalls 108, 110 when the floor 1002 is tensioned (e.g., via the clamps 1008, 1010 shown and described with respect to FIG. 68) to prevent leakage of spoil material from the mixer housing 102. In some embodiments, as the floor 1002 is tensioned, the ribs 1102, 1104 deflect inwardly on the recesses 1110 and seal around the mixer housing sidewalls 108, 110. In other embodiments, the ribs 1102, 1104 may have any shape that enables the ribs 1102, 1104 to seal against the mixer housing 102 (FIG. 69) as described herein.

In the illustrated embodiment, the mixer housing 102 does not include the flange 924, shown in FIG. 68 and the ribs 1102, 1104 each seal against the first and second mixer housing sidewalls 108, 110. In other embodiments, the mixer housing 102 may include at least one flange 924 (FIG. 68) and the ribs 1102, 1104 may be positioned on the floor 1002 to accommodate the flange. For example, in some such embodiments, flanges (not shown) of the mixer housing 102 (FIG. 69) may also contact the floor 1002 laterally outwards and/or laterally inwards from the ribs 1102, 1104. In other embodiments, the floor 1002 may include only one rib 1102 at one of the sides 1020, 1022. In some such embodiments, the floor 1002 may contact and seal against a flange (similar to flange 924 shown in FIG. 68) at the side of the floor 1002 that does not include a rib 1102.

Referring to FIG. 71, in the illustrated embodiment, the ribs 1102, 1104 each extend longitudinally along the inner surface 1108 between the first and second ends 1004, 1006 of the floor 1002. In particular, the ribs 1102, 1104 from the apertures 1112 proximate the second end 1006 of the floor 1002 to a front portion 1114 of the floor 1002 which extends around the front wall 106 of the mixer housing 102 (FIG. 69). In other embodiments, the ribs 1102, 1104 may each extend continuously from the first end 1004 to the second end 1006 of the floor 1002. In the illustrated embodiment, the ribs 1102, 1104 are bonded to the inner surface 1108 of the floor 1002 and are formed from a flexibly resilient material, such as rubber. In other embodiments, the ribs 1102, 1104 may be attached to the floor 1002 according to any suitable known method. For example, and without limitation, in some embodiments the ribs 1102, 1104 are unitarily formed with the floor 1002.

FIGS. 72-76 show another embodiment of a hydro excavation apparatus 2. The illustrated hydro excavation apparatus 2 is substantially the same as the hydro excavation apparatus 2 described above with respect to FIGS. 1 and 2 except as described below. In particular, the hydro excavation apparatus 2 includes a cab 16 and a truck 18 having a truck body 19. However, in the illustrated embodiment, the hydro excavation apparatus 2 further includes vessel positioning assembly 2000 that is operable to move the feed vessel 122 laterally (i.e., generally perpendicular of the longitudinal axis $A_2$) with respect to the truck body 19. In particular, the vessel positioning assembly 2000 is operable to move the feed vessel 122 between an extended position (shown in FIG. 72) and a retracted, or stowed, position (shown in FIG. 73).

Figure 72:
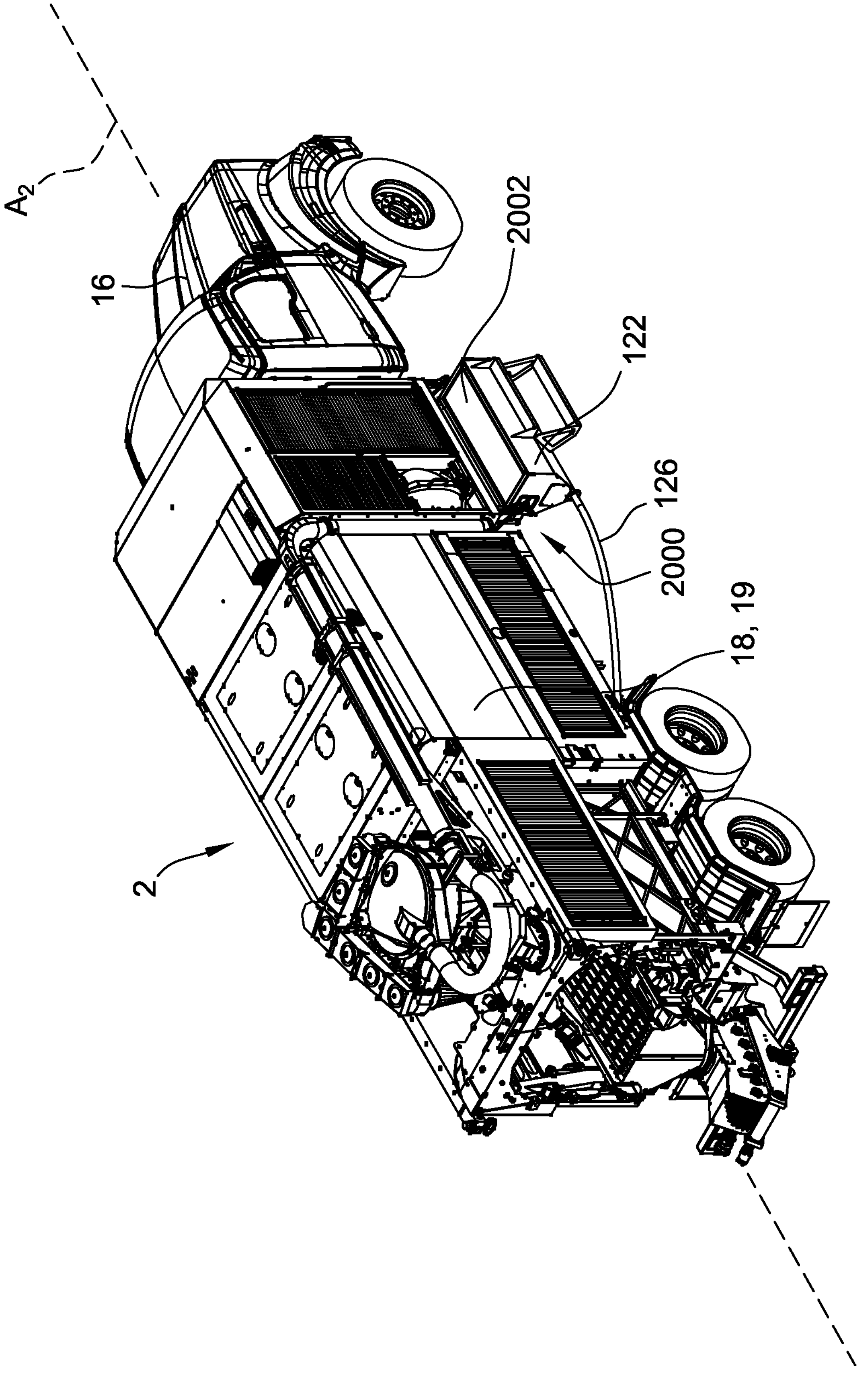
FIG. 72 is a perspective view of another embodiment of a mobile vacuum apparatus that includes a feed vessel of the additive feed system in an extended position.
Figure 73:
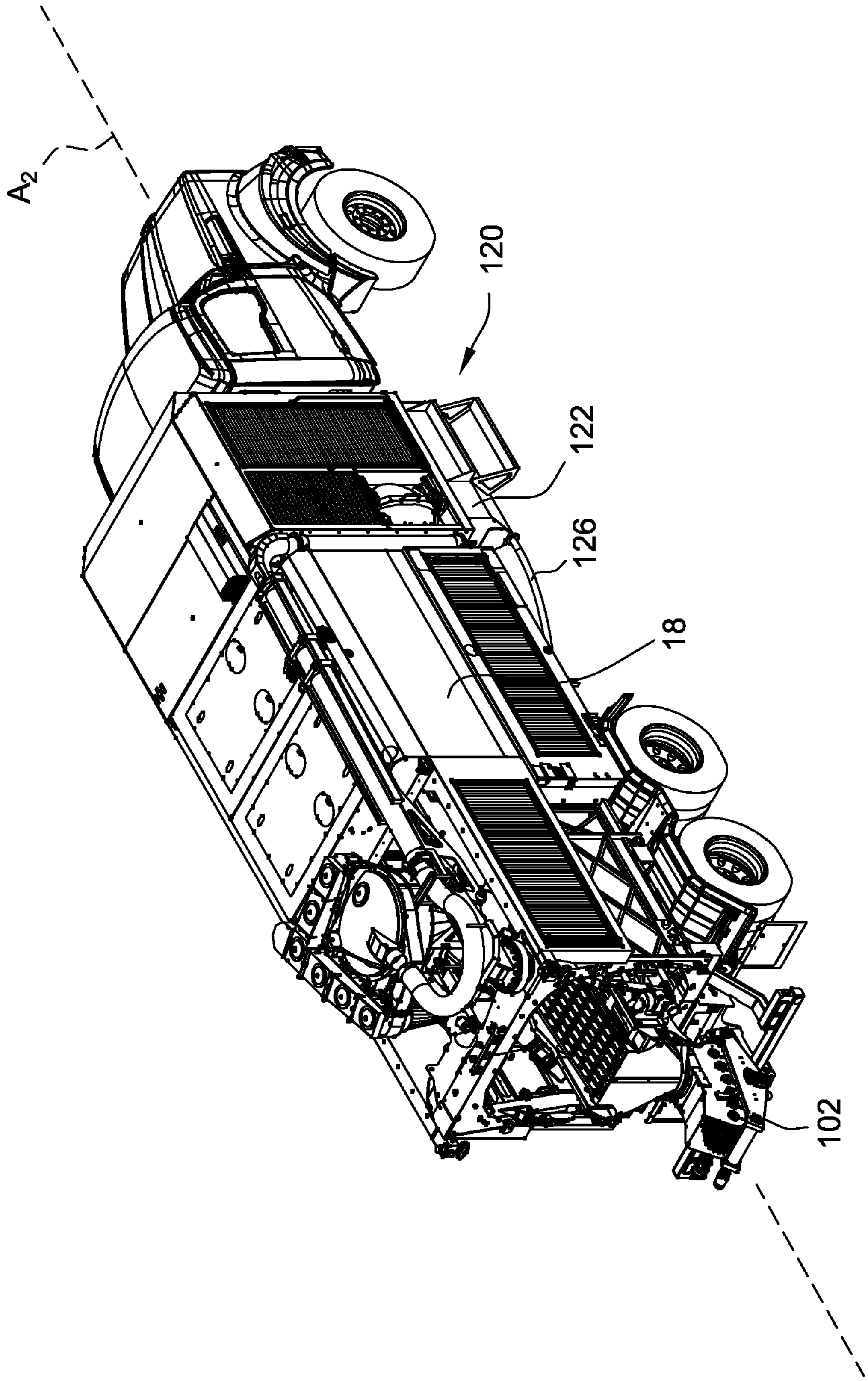
FIG. 73 is a perspective view of the mobile vacuum apparatus with the feed vessel in the stowed position.

Referring to FIG. 72, when the feed vessel 122 is in the extended position, the feed vessel 122 is positioned outside of a lateral profile of the truck body 19 and an upper end 2002 of the feed vessel 122 is exposed to facilitate filling an additive through an opening 2004 (FIG. 74) defined in the upper end 2002. Referring to FIG. 73, when the feed vessel 122 is in the stowed position, the feed vessel 122 is positioned entirely within the lateral profile of the truck 18. That is, no portion of the feed vessel 122 extends laterally beyond the sides of the truck body 19 when the feed vessel 122 is in the stowed position. Accordingly, the vessel positioning assembly 2000 enables filling the feed vessel 122 in the extended position and enables transport of the feed vessel 122 in compliance with common trucking regulations, which often tightly restrict any lateral extensions from the truck 18, when the feed vessel 122 is in the stowed position. Moreover, the flexible tube 126 (shown in FIG. 72) and the flexible auger 128 (shown in FIG. 6) allow the feed vessel 122 to provide the additive to the mixer housing 102 when the feed vessel 122 is in either the extended position or the stowed position.

Figure 74:
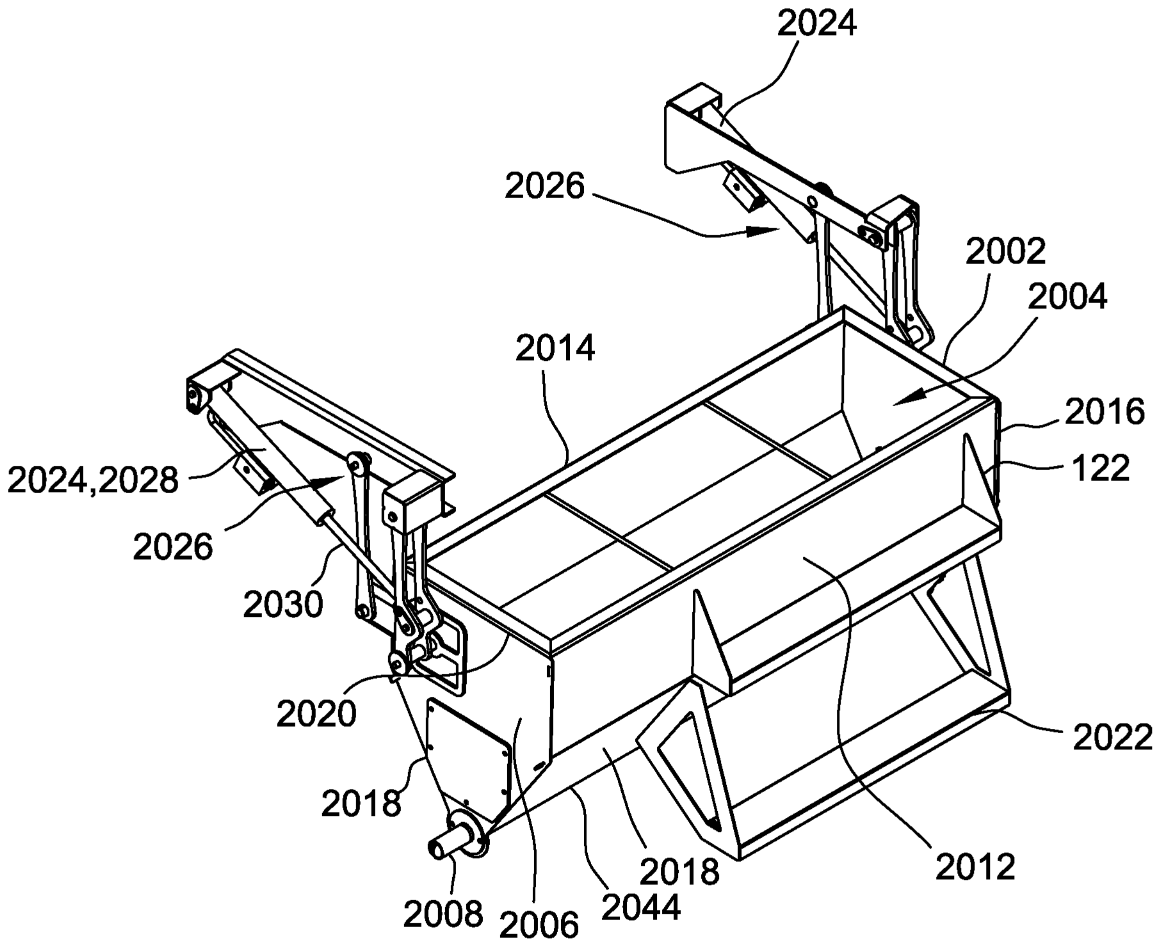
FIG. 74 is a perspective view of a feed vessel positioning assembly for moving the feed vessel between the extended and stowed position.

Referring to FIG. 74, in the illustrated embodiment, feed vessel 122 includes a first end wall 2006 defining an outlet 2008 configured for connection with the tube 126 (FIG. 73). First and second sidewalls 2012, 2014 extend from the first end wall 2006 to a second end wall 2016. The sidewalls 2012, 2014 each include a tapered portion 2018 that tapers inward towards a lower end 2044 of the feed vessel 122. The tapered portions 2018 are configured to direct additive towards the auger 128 (shown in FIG. 6). Steps 2022 extend outward from the first sidewall 2012 to provide access to the truck 18 when the feed vessel 122 is in the stowed position.

The feed vessel 122 further includes a rim 2020 that defines an opening 2004 in the upper end 2002 of the feed vessel 122. The rim 2020 extends between the first and second end walls 2006, 2016 and between the first and second sidewalls 2012, 2014. In the illustrated embodiment, the opening 2004 extends approximately a full length of the feed vessel 122. The size of the opening 2004 in the illustrated embodiment facilitates filling the feed vessel 122 with an additive by various external filling attachments. Referring back to FIG. 72, in the illustrated embodiment the truck 18 includes a lid (now shown) that seals against the rim 2020 and closes the opening 2004 (FIG. 74) of the feed vessel 122 when the vessel positioning assembly 2000 is in the stowed position. In some embodiments, the lid is included in a mounting frame 2036 (FIG. 75) of the vessel positioning assembly 2000. In other embodiments, the lid (not shown) is movably attached to the feed vessel 122 to allow for selectively covering the opening 2004.

Figure 75:
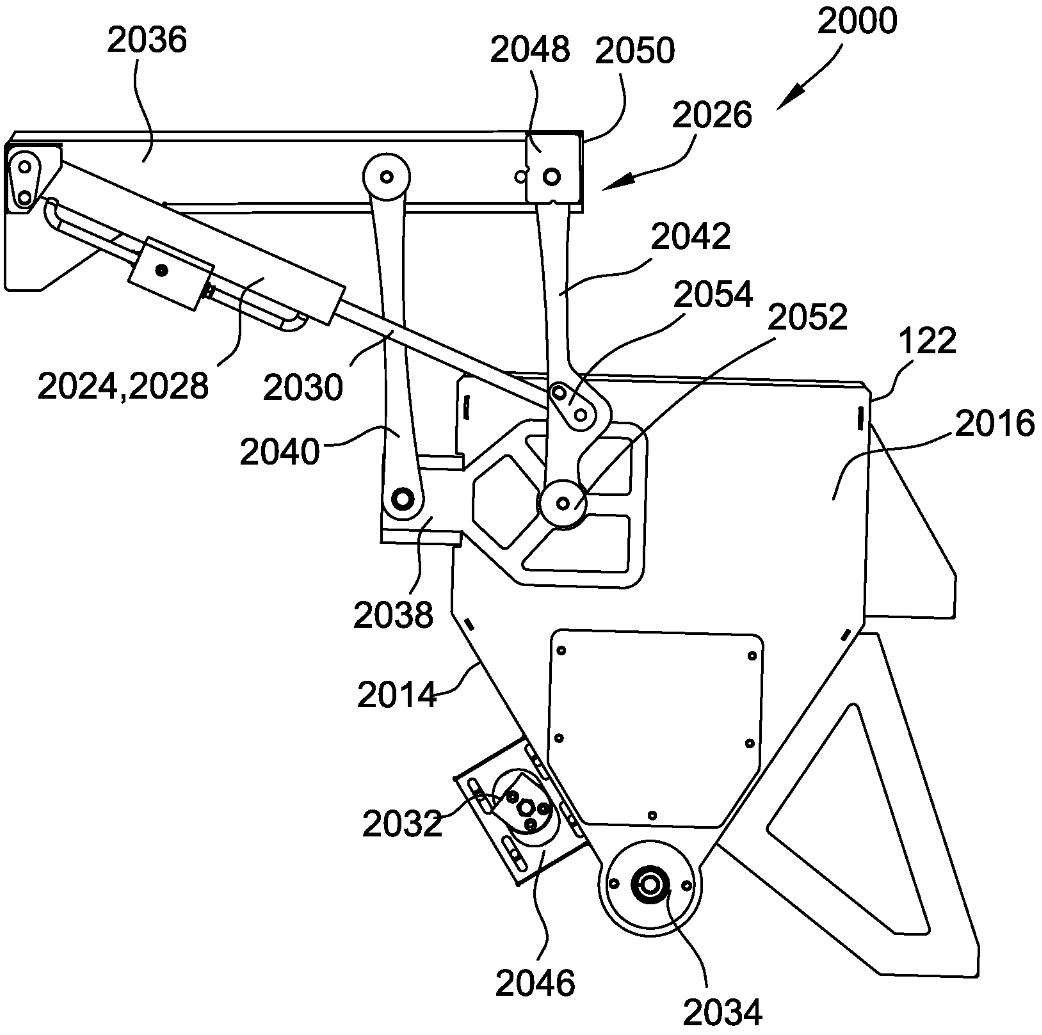
FIG. 75 is a side view of the feed vessel positioning assembly in the extended position.
Figure 76:
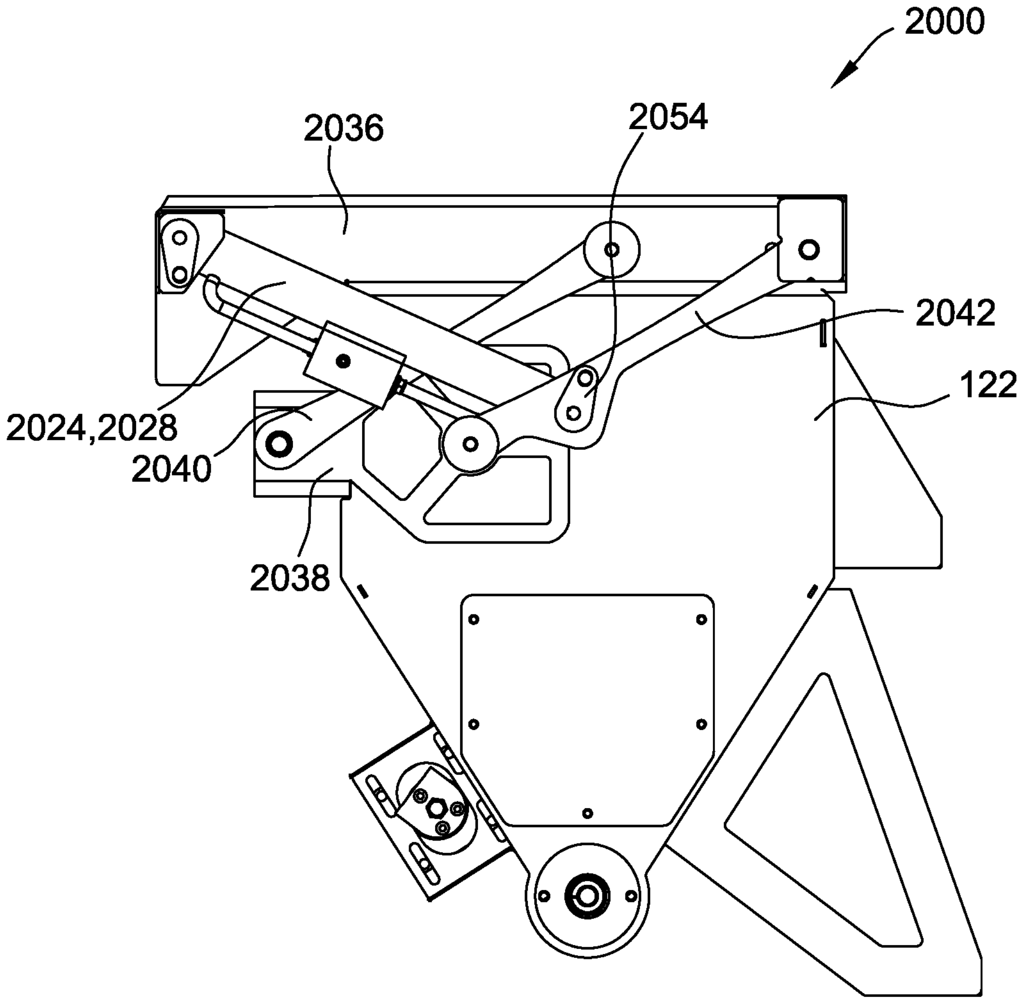
FIG. 76 is a side view of the feed vessel positioning assembly in the stowed position.

In the illustrated embodiment, the vessel positioning assembly 2000 includes a pair of actuators 2024 and a pair of four-bar linkages 2026 that connect the feed vessel 122 to the chassis 10 (shown in FIG. 2). The actuators 2024 are each coupled to at least one of the corresponding linkages 2036, 2038, 2040, 2042 (FIG. 75). The actuators 2024 each include a cylinder 2028 and a piston 2030 that is selectively extendable from the cylinder to move the feed vessel 122 between the extended and stowed positions. In the illustrated embodiment the actuators 2024 are hydraulic actuators, though in other embodiments pneumatic, electromechanical, or any other suitable actuators may be used. The actuators 2024 may be controllable via an operator control panel (not shown). Referring back to FIG. 72, in some embodiments, the operator control panel is positioned on the truck 18 at a location near the feed vessel 122. For example, in some such embodiments the operator control panel is positioned immediately adjacent to the hopper. In another embodiment, the operator control panel is provided in the cab 16 to enable a driver to selectively control the position of the feed vessel 122. One or more audible and/or visual indicators (not shown) may also be provided in the cab 16 or on the truck 18 to indicate whether the feed vessel 122 is in the extended position or stowed position. For example, and without limitation, in some embodiments, a warning light and/or an audible alarm may be triggered in the cab 16 when the feed vessel 122 is in the extended position.

Referring to FIG. 75, in the illustrated embodiment the feed vessel 122 includes a feed motor 2032 attached to the second sidewall 2014 by a motor mount 2046. The feed motor 2032 is configured to operably connect to an auger drive shaft 2034 via one or more drive chains (not shown). The auger drive shaft 2034 rotates the flexible auger 128 such that a metered amount of solidifying additive is conveyed from the feed vessel 122 along the tube 126.

In the illustrated embodiment, the four-bar linkage 2026 includes a mounting frame 2036, a bracket 2038 attached to the second end wall 2016, and first and second linkages 2040, 2042 each pivotably connected to the mounting frame 2036 and the bracket 2038. The mounting frame 2036 is configured for attachment to the chassis 10 (FIG. 2). In other embodiments, the mounting frame 2036 may be integrally formed with the chassis 10. In the illustrated embodiment, the mounting bracket 2038 extends laterally from the second end wall 2016 and outward (i.e., to the left of the page in FIG. 75) of the second sidewall 2012. The second linkage 2042 extends between first end 2048 positioned at a distal end 2050 of the mounting frame 2036, and a second end 2052 pivotably connected to the bracket 2038. The cylinder 2028 is pivotably mounted on the mounting frame 2036 and a distal end 2054 of the piston 2030 is pivotably attached to the second linkage 2042 between the first and second ends 2048, 2052. In other embodiments, the piston 2030 may be pivotably attached to the bracket 2038 or the first linkage 2040.

During operation, to move the feed vessel 122 from the extended position (shown in FIG. 75) to the stowed position (shown in FIG. 76), the piston 2030 is retracted into the cylinder 2028, thereby rotating the first and second linkages 2040, 2042 (e.g., in a clockwise direction as shown in FIG. 75) and pivoting the feed vessel 122 laterally inward and upwards towards the mounting frame 2036. The illustrated configuration of the actuator 2024 and the four-bar linkages 2026 facilitates maintaining the orientation of the feed vessel 122 as the feed vessel 122 is moved between the extended and stowed positions. In some embodiments, the vessel positioning assembly 2000 also includes a locking mechanism (not shown) for securing the feed vessel 122 in the stowed position. For example, and without limitation, in some embodiments, the locking mechanism includes a pin connector that secures the feed vessel 122 in position on the mounting frame 2036.

Compared to conventional mixing systems for processing spoil material, the mixing system of the present disclosure has several advantages. In embodiments wherein the mixing system is supported by a mobile vacuum apparatus, the mixing system processes spoils onboard of the mobile vacuum apparatus and the spoils do not need to be transported from the mobile vacuum apparatus to a separate system for further processing. The mixing system processes the spoil material to transform the slurry into a material having a consistency such that the material may hold its shape and may be classified as a solid. In embodiments wherein the mixing system includes a first section and a second section, the mixing system is capable of thoroughly mixing a solidifying additive with the spoil material and conveying the earthen material to a discharge end of the mixing system. The earthen material discharged from the mixing system includes a material that may be categorized as a solid for disposal purposes. In embodiments wherein an additive discharge is disposed forward of a spoil material discharge, the solidifying additive is introduced onto the first disk assembly in front of the spoil material which allows the solidifying additive to fall toward the floor of the housing where more fluidic material is disposed. In embodiments wherein the mixing system includes a diffuser (e.g., vanes) or distribution assembly (e.g., screw auger), the diffuser or distribution assembly more evenly distributes the additive on the disk assembly. In embodiments wherein the mixing system includes the swivel assembly, the mixer housing may be selectively rotated about a swivel axis, such that the discharge end of the mixing system may be selectively positioned to control the location of material discharged from the mixing system or the mixing system may be moved to a "stowed" or travel position. In embodiments wherein the mixing system includes a tilting assembly, the mixer housing may be selectively tilted relative to the ground to adjust the angle of the mixer housing floor. In embodiments wherein the mixing system includes an adjustable floor assembly, the floor may be selectively moved vertically to position the floor towards and/or away from the disk assembly. In embodiments wherein the adjustable floor assembly includes a linkage system to lower the floor, a single actuator may be used to move the floor. In embodiments wherein the mixing system includes lobed disks, different spoil materials, such as clay for example, may be more easily processed. In embodiments wherein the mixing system includes a conveyor assembly, the conveyor may be used to remove various debris during clean out and process fine grain spoil material, such as sand for example. In embodiments where the mixing system includes a flexible floor, the flexible resilience of the floor may resist denting or other deformations when processing hardened spoil material or other hardened debris, such as large rocks or stones. In embodiments where the flexible floor includes ribs, the ribs may provide a tight seal against sidewalls of the mixer housing to prevent leakage of spoil material. In embodiments wherein the hydro excavation assembly includes a feed vessel positioning assembly, the additive feed vessel may be moved within a lateral profile of a vehicle for transport and out to an extended position for filling the feed vessel.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A mixing system comprising:

a mixer housing having a closed floor, front wall and first and second sidewalls, the mixer housing having a longitudinal axis that extends through the front wall and a discharge end of the mixer housing;

an inlet for introducing material into the mixer housing, the inlet being disposed toward the front wall of the mixer housing;

a plurality of disk assemblies disposed within the mixer housing, each disk assembly comprising:

a rotatable shaft that extends from the first sidewall to the second sidewall; and a plurality of disks connected to the rotatable shaft that rotate with the shaft, wherein each disk comprises a central portion and plurality of fingers that extend radially outward from the central portion;

an additive feed system comprising:

a feed vessel for holding a solidifying additive; and an additive discharge connecting the feed vessel to the mixer housing for adding the solidifying additive to the mixer housing; and a discharge for discharging material from the mixer housing, the discharge being disposed toward the discharge end of the mixer housing.

2. The mixing system as set forth in claim 1 comprising a spoil material feed system for adding spoil material to the mixer housing, the spoil material feed system comprising a spoil material discharge at which spoil material is added to the mixer housing, the additive discharge being disposed forward of the spoil material discharge relative to the longitudinal axis.

3. The mixing system as set forth claim 1 wherein:

the mixing housing is divided into a first section and a second section that angles upward relative to the first section; and the disk assembly is divided into a first set of disk assemblies disposed within the first section and a second set of disk assemblies disposed in the second section.

4. The mixing system as set forth in claim 3 wherein:

the first set of disk assemblies comprises at least one, at least two or at least three rotatable shafts that extend from the first sidewall to the second sidewall with at least three, at least four or at least five disks being connected to each of the shafts; and the second set of disk assemblies comprises at least one, at least two or at least three rotatable shafts that extend from the first sidewall to the second sidewall with at least three, at least four or at least five disks being connected to each of the shafts.

5. The mixing system as set forth in claim 3 wherein the second section angles upward relative to the first section at an angle from 5° to 60°.

6. The mixing system as set forth in claim 1 wherein the disks are aligned such that a common plane runs through the shafts of the disk assemblies.

7. The mixing system as set forth in claim 1 wherein the discharge is the only outlet of the mixing system through which material is discharged.

8. The mixing system as set forth in claim 1 comprising a distribution assembly for distributing solidifying additive across a width of the mixing system.

9. The mixing system as set forth in claim 8 wherein the distribution assembly is a screw auger.

10. The mixing system as set forth in claim 1 comprising an adjustable floor assembly for adjusting the distance between the closed floor and the plurality of disks.

11. The mixing system as set forth in claim 1 wherein the closed floor is pivotably connected to the mixer housing.

12. The mixing system as set forth in claim 1 comprising a conveyor assembly for moving material within the mixer housing, wherein the closed floor is a belt of the conveyor assembly.

13. The mixing system as set forth in claim 12 wherein the conveyor assembly is pivotably connected to the mixer housing.

14. The mixing system as set forth in claim 1 wherein the closed floor is formed from a flexibly resilient material and is releasably attached to the mixer housing.

15. The mixing system as set forth in claim 14 further comprising at least one clamp attached to the mixer housing, the at least one clamp configured to apply tension to the floor and secure the floor to the mixer housing.

16. A mobile vacuum apparatus for removing a slurry from a site, the mobile vacuum apparatus comprising:

a mixing system comprising:

a mixer housing having a closed floor, front wall and first and second sidewalls, the mixer housing having a longitudinal axis that extends through the front wall and a discharge end of the mixer housing;

an inlet for introducing material into the mixer housing, the inlet being disposed toward the front wall of the mixer housing;

a plurality of disk assemblies disposed within the mixer housing, each disk assembly comprising:

a rotatable shaft that extends from the first sidewall to the second sidewall; and a plurality of disks connected to the rotatable shaft that rotate with the shaft; and a discharge for discharging material from the mixer housing, the discharge being disposed toward the discharge end of the mixer housing;

a chassis which supports the mixing system;

a truck body mounted on the chassis;

wheels connected to the chassis to transport the mobile vacuum apparatus;

a boom that removes material from the site by vacuum; and a vacuum pump downstream of the boom for generating a vacuum in the boom.

17. The mobile vacuum apparatus as set forth in claim 16 further comprising:

a feed vessel for adding solidifying additive to the mixer housing, the feed vessel defining an opening for introducing solidifying additive into the feed vessel; and a feed vessel positioning system for moving the feed vessel between an extended position in which the feed vessel is at least partially positioned outside of lateral profile of the truck body and a stowed position in which the feed vessel is positioned within the lateral profile of the truck body.

18. The mobile vacuum apparatus as set forth in claim 17, wherein the feed vessel is positioned entirely within the lateral profile of the truck body in the stowed position.

19. The mobile vacuum apparatus as set forth in claim 16 wherein the mixing system comprises a swivel assembly that enables the mixing system to swivel about a swivel axis, the swivel assembly being connected to the chassis.

20. The mobile vacuum apparatus as set forth in claim 19 wherein the swivel assembly comprises a lower frame, upper frame and one or more bearings that enable the lower frame to move relative to the upper frame, the upper frame being connected to the chassis.

21. The mobile vacuum apparatus as set forth in claim 16 comprising a tilt assembly connected to the chassis that enables the mixing system to rotate about a tilt axis.

22. The mobile vacuum apparatus as set forth in claim 21 wherein the tilt assembly comprises an actuator that tilts the mixing system.

23. The mobile vacuum apparatus as set forth in claim 16 wherein the mobile vacuum apparatus comprises a wand for directing pressurized water toward an excavation site to excavate earthen material from the site.

24. The mobile vacuum apparatus as set forth in claim 16 wherein the mobile vacuum apparatus supports an additive feed system for adding solidifying additive to the mixer housing.

25. A mixing system comprising:

a mixer housing having a closed floor, front wall and first and second sidewalls, the mixer housing having a longitudinal axis that extends through the front wall and a discharge end of the mixer housing;

an inlet for introducing material into the mixer housing, the inlet being disposed toward the front wall of the mixer housing;

a plurality of disk assemblies disposed within the mixer housing, each disk assembly comprising:

a rotatable shaft that extends from the first sidewall to the second sidewall; and a plurality of disks connected to the rotatable shaft that rotate with the shaft, wherein each disk comprises a rim defining two or more lobes;

an additive feed system comprising:

a feed vessel for holding a solidifying additive; and an additive discharge connecting the feed vessel to the mixer housing for adding the solidifying additive to the mixer housing; and a discharge for discharging material from the mixer housing, the discharge being disposed toward the discharge end of the mixer housing.

26. The mixing system as set forth in claim 25 wherein:

the rims each define two lobes and the disks have an oval profile; or the rims each define three lobes and the disks are each shaped as a Reuleaux triangle.

27. The mixing system as set forth in claim 25 wherein at least some disks of each disk assembly are angularly offset from other disks of the disk assembly.

28. The mixing system as set forth in claim 25 comprising a spoil material feed system for adding spoil material to the mixer housing, the spoil material feed system comprising a spoil material discharge at which spoil material is added to the mixer housing, the additive discharge being disposed forward of the spoil material discharge relative to the longitudinal axis.

29. The mixing system as set forth claim 25 wherein:

the mixing housing is divided into a first section and a second section that angles upward relative to the first section; and the disk assembly is divided into a first set of disk assemblies disposed within the first section and a second set of disk assemblies disposed in the second section.

30. The mixing system as set forth in claim 25 comprising a distribution assembly for distributing solidifying additive across a width of the mixing system.

31. The mixing system as set forth in claim 25 comprising an adjustable floor assembly for adjusting the distance between the closed floor and the plurality of disks.

32. The mixing system as set forth in claim 25 wherein the closed floor is pivotably connected to the mixer housing.

33. The mixing system as set forth in claim 25 comprising a conveyor assembly for moving material within the mixer housing, wherein the closed floor is a belt of the conveyor assembly.

34. The mixing system as set forth in claim 25 wherein the closed floor is formed from a flexibly resilient material and is releasably attached to the mixer housing.

* * * * *